(12) United States Patent
Takahashi et al.

(10) Patent No.: US 6,934,091 B2
(45) Date of Patent: Aug. 23, 2005

(54) IMAGE-FORMATION LENS SYSTEM, AND IMAGING SYSTEM USING THE SAME

(75) Inventors: Toshio Takahashi, Hachioji (JP); Kazuteru Kawamura, Hachioji (JP); Masashi Hankawa, Hachioji (JP); Eiji Shirota, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/704,654

(22) Filed: Nov. 12, 2003

(65) Prior Publication Data

US 2004/0136089 A1 Jul. 15, 2004

(30) Foreign Application Priority Data

Nov. 20, 2002 (JP) ........................................ 2002-336141

(51) Int. Cl.[7] ............................................. G02B 15/14
(52) U.S. Cl. ....................................... 359/689; 359/676
(58) Field of Search .......................... 359/676, 686–690

(56) References Cited

U.S. PATENT DOCUMENTS

| | | | |
|---|---|---|---|
| 5,777,800 A | | 7/1998 | Yamaguchi et al. ........ 359/692 |
| 6,043,939 A | * | 3/2000 | Toyama ...................... 359/689 |
| 6,075,654 A | | 6/2000 | Toyama ...................... 359/689 |
| 6,392,818 B1 | * | 5/2002 | Sato ............................ 359/689 |

FOREIGN PATENT DOCUMENTS

| | | |
|---|---|---|
| JP | 2000-275524 | 10/2000 |
| JP | 2001-021802 | 1/2001 |

* cited by examiner

*Primary Examiner*—Georgia Epps
*Assistant Examiner*—William Choi
(74) *Attorney, Agent, or Firm*—Kenyon & Kenyon

(57) ABSTRACT

The invention relates to an image-formation lens system well balanced among cost reductions, size reductions and performance improvements and an imaging system incorporating that lens system. The image-formation lens system in the imaging system is a zoom lens system that comprises at least three lens groups including a first lens group G1 of positive power, a second lens group G2 of positive power and a third lens group G3 of negative power, wherein zooming is carried out by varying the spacing between adjacent lens groups. The zoom lens system comprises a total of up to 8 lenses, and satisfies the following conditions:

$$0.07 < \delta_g/IH < 0.23 \quad (1)$$

$$1.8 < TeleFno/WideFno < 3 \quad (2)$$

$$-8\% < DTL_w < 8\% \quad (3)$$

Here $\delta_g$ is a difference between the rear focal positions at d- and g-lines of the zoom lens system at the telephoto end, IH is the maximum image height at the image plane, WideFno and TeleFno are the F-numbers at d-line of the zoom lens system at wide-angle end and telephoto end, respectively, and $DTL_w$ is an amount of d-line distortion at an angle of view of 28.0° at the wide-angle end.

15 Claims, 35 Drawing Sheets

IMAGE-FORMATION LENS SYSTEM, AND IMAGING SYSTEM USING THE SAME

This application claims benefit of Japanese Application No. 2002-336141 filed in Japan on Nov. 20, 2002, the contents of which are incorporated by this reference.

BACKGROUND OF THE INVENTION

The present invention relates generally to an image-formation lens, and an imaging system incorporating the same, and particularly to a zoom lens system having a zooming action. More particularly, the present invention is concerned with an inexpensive, small-format, high-zoom-ratio zoom lens system that is well fit for phototaking lenses for, e.g., lens shutter cameras or digital cameras.

Various arrangements such as two-group arrangements comprising a positive front group and a negative rear group, and three-group arrangements comprising a positive first lens group, a positive second lens group and a negative third lens group have so far been proposed for inexpensive, small-format, high-zoom-ratio zoom lenses used on lens shutter cameras.

For instance, Patent Publication 1 proposes a two-group zoom lens of +− construction, and Patent Publications 2–4 put forward a three-group zoom lens of ++− construction, which comprises up to 10 lenses. All these zoom lenses are relatively inexpensive and have a high zoom ratio.

Patent Publication 1

JP-A 9-90220

Patent Publication 2

JP-A 2000-21802

Patent Publication 3

JP-A 2000-275524

Patent Publication 4

JP-A 2000-19399

In such conventional zoom lenses, however, there is still much left to be desired in terms of performance, size and cost.

SUMMARY OF THE INVENTION

In view of such prior art problems as mentioned above, the present invention has for its main object to provide an image-formation lens system well balanced among cost reductions, size reductions and performance improvements, and an imaging system using the same.

According to one aspect of the invention, this object is accomplished by the provision of an imaging system comprising an image-formation lens system and a means located on the image side thereof for defining an image pickup area, characterized in that:

said image-formation lens system is a zoom lens system comprising at least three lens groups including a lens group of positive power and a lens group of negative power, wherein zooming is carried out by varying the spacing between adjacent lens groups, and said zoom lens system comprises a total of up to 8 lenses, and satisfies the following conditions:

$$0.07 < \delta_g/IH < 0.23 \quad (1)$$

$$1.8 < TeleFno/WideFno < 3 \quad (2)$$

$$-8\% < DTL_w < 8\% \quad (3)$$

where $\delta_g$ is a difference between the rear focal positions at d- and g-lines of said zoom lens system at the telephoto end, IH is the maximum image height at an image plane, WideFno and TeleFno are the F-numbers at d-line of said zoom lens system at the wide-angle end and telephoto ends, respectively, and $DTL_w$ is the amount of d-line distortion at an angle of view of 28.0° at the wide-angle end.

The actions and advantages of the imaging system according to the above first aspect are now explained.

For the purpose of reducing the size and cost of an optical system, it is effective to decrease the total number of lenses included therein, and so one premise of the invention is to bring the number of lenses forming part of the image-lens system to up to 8. As the lenses outnumber eight, there are cost rises, with the size becoming huge because of the need of ensuring that each lens has some thickness at the middle and the edge, as required for fabrication reasons, making it difficult to provide an attractive lens system.

However, as the number of lenses decreases, it is difficult to make satisfactory correction for aberrations of a zoom lens system that forms an image-formation lens system from its wide-angle end to its telephoto end.

Thus, the imaging system of the invention is constructed as having a zoom lens comprising three or more lens groups, wherein axial chromatic aberration is positively produced at the telephoto end of the zoom lens where the F-number increases, with a view to giving weight on correction of distortion that becomes noticeable at the wide-angle end opposite to the telephoto end.

When it comes to a zoom lens, axial chromatic aberration is apt to increase at the telephoto end as it decreases at the wide-angle end, and vice versa. It is thus common to keep the aberration satisfactory in the vicinity of an intermediate focal distance. According to the imaging system of the invention, image degradation due to axial chromatic aberration at the telephoto end can be prevented by allowing the axial chromatic aberration to come within the range of condition (1) and the ratio of the F-number at the telephoto end relative to the wide-angle end to fall within the range of condition (2).

It is here noted that the d-line is light of 587.562 nm wavelength and the g-line is light of 435.835 nm wavelength, and the maximum image height IH at the image plane is defined by ½ of the diagonal length L of the (substantially rectangular) effective image pickup area of an image pickup device.

As the lower limit of 0.07 to condition (1) is not reached, it is difficult to obtain any satisfactory image-formation performance at the wide-angle end with a reduced number of lenses. As the upper limit of 0.23 is exceeded, on the other hand, the zoom lens system is readily affected by camera shakes, etc., because the influence of axial chromatic aberration at the telephoto end becomes large; it is required to overly increase the F-number at the telephoto end so as to prevent image degradation.

As the lower limit of 1.8 to condition (2) is not reached, the F-number at the telephoto end becomes small, and so the influence of axial chromatic aberration on pictures cannot be ignored. As the upper limit of 3 is exceeded, on the other hand, the F-number at the telephoto end becomes too large, rendering the zoom lens system susceptible to camera shakes, etc.

Any deviation from the upper limit of 8% and the lower limit of −8% to condition 3 makes distortion too large to obtain a lens system having preferable performance.

When a film is used as the image pickup recording medium, the means for defining the image pickup area is provided by a field frame located just in front thereof, and when an electronic image pickup device such as a CCD is used, that means is provided by the electronic image pickup device itself, which includes an image pickup area that can be used for reproduction of phototaken images. Where the image pickup range is arbitrarily variable, the maximum image height IH on the image plane is defined by the maximum value in the widest range practicable, with the provision that an area not available for reproduction of phototaken images is excluded from the image plane.

In accordance with the second aspect of the invention, the imaging system of the above first aspect is further characterized in that the maximum image height IH at the image plane satisfies the following condition:

$$20 \text{ mm} < \text{IH} < 25 \text{ mm} \tag{8}$$

The actions and advantages of this imaging system are now explained.

A simple way of making an imaging system compact is to make the size of an image plane small and, with this, reduce the size of an image-formation lens system. Only by reducing the size of the image-formation lens system, however, the thickness of the lens becomes thin, ending up with poor processability. As the size of the image plane decreases, the amount of light received thereon decreases, again resulting in a phototaken image being likely to degrade.

Condition (8) is provided to cut down fabrication cost and obtain a sensible tradeoff between compactness and high performance. As the lower limit of 20 mm to condition (8) is not reached, the size of the image plane becomes small and so does the thickness of the lenses used, resulting in poor processability. As the upper limit of 25 mm is exceeded, on the other hand, it is difficult to render the overall size of the imaging system compact.

In accordance with the third aspect of the invention, the imaging system of the above first or second aspect is further characterized in that at least one of said lens groups having negative power consists of a plurality of negative lenses whose power turns negative on an optical axis, wherein at least one of said plurality of negative lenses is an aspheric lens whose power turns from negative to positive farther off a center thereof, and at least one negative lens included in said plurality of negative lenses and different from said aspheric lens maintains negative power all the way from a center to a periphery thereof.

The actions and advantages of the above third imaging system of the invention are now explained.

For lens groups having negative power, it is common that various aberrations are corrected by using positive and negative lenses having different powers. To achieve high zoom ratios with a small-format arrangement, however, each lens group must have strong power. With cost reductions in mind, it is desired to set up the lens groups with fewer lenses, and when strong negative power is imparted to the lens groups with fewer lenses, it is preferable that negative lenses are used for all lenses, because sharp bending of light rays in the vicinity of the optical axis is avoided to reduce adverse influences due to decentration of the lenses. In accordance with the third aspect of the invention, therefore, all lenses in any of the negative lens groups are made up of negative lenses, so that aberrations that cannot be corrected by the negative lenses alone, for instance, spherical aberrations, can be canceled out with other positive lens group. Regarding off-axis light beams, the aspheric surface whose power turns positive at its periphery is used in the negative lens group to make correction for various aberrations therein under the actions of positive and negative powers therein.

With the arrangement of the third aspect of the invention, the negative power of the lens group located on the optical axis is allocated to a plurality of lenses, so that the concentration of negative power on one single lens is avoidable, achieving high zoom ratios and diminishing the influences of decentration. In addition, at least one of the plurality of negative lenses is defined by an aspheric lens whose refracting power turns positive nearer to the periphery, i.e., an aspheric surface that has a positive lens action on the farthest off-axis chief ray at any of zooming zones, whereby off-axis aberrations (especially distortion and chromatic aberration of magnification at the wide-angle end) can be well corrected.

In accordance with the fourth aspect of the invention, the imaging system of the above third aspect is further characterized in that said aspheric lens satisfies following condition:

$$10 < f_{asp}/f_N < 100 \tag{4}$$

where $f_{asp}$ is the focal length of the aspheric lens on the optical axis, and $f_N$ is the focal length on the optical axis of the lens group of negative power including the aspheric lens.

The actions and advantages of the above fourth aspect of the invention are now explained.

The above condition (4) is provided to define the profile of the axial negative power of the aspheric lens whose power turns positive nearer to the periphery. As the lower limit of 10 to condition (4) is not reached, it is difficult to construct the aspheric surface with high accuracy, contrary to cost reductions. As the upper limit of 100 is exceeded, on the other hand, the proportion of axial negative power of the aspheric lens becomes too small, and so the aspheric lens is susceptible of influences by the decentration of other negative lens in the same lens group.

In accordance with the fifth aspect of the invention, any one of the above first to fourth imaging systems is further characterized in that said image-formation lens system is a three-group zoom lens comprising, in order from an object side thereof, a lens group of positive power, a lens group of positive power and a lens group of negative power wherein zooming is performed by varying the spacing between adjacent lens groups, and satisfies the following condition:

$$0.55 < L_t/f_t < 0.715 \tag{5}$$

where $L_t$ is a real distance at the telephoto end of the image-formation lens system from a plane located nearest the object side to the image plane, and $f_t$ is the composite focal length at the telephoto end of the image-formation lens system.

The actions and advantages of the imaging system according to the above fifth aspect of the invention are now explained.

A zoom lens comprising four or more lens groups has a complicated construction, and is hard to achieve cost reductions. On the other hand, a zoom lens composed of two lens groups is difficult to achieve any high zoom ratios. Thus, the invention is preferably applied to reducing the size of a three-group zoom lens of the ++− type that is favorable for achieving compactness and high zoom ratios. When the size and cost of the three-group zoom lens of the ++− type are reduced, for instance, when the entire lens length at the telephoto end is shortened relative to the focal length at the telephoto end, the power of each lens group tends to become strong. By exploitation of the inventive idea according to the first aspect of the invention, however, it is possible to obtain a zoom lens that is kept compact in its entirety while ensuring high zoom ratios.

Condition (5) provides a definition of how much the size of the thus defined lens system is diminished. As the lower limit of 0.55 to this condition is not reached, each aberration itself becomes too large to ensure sufficient image-formation capability. Exceeding the upper limit of 0.715 may be favorable for ensuring image-formation capability and lessening the influences of fabrication errors, but this makes it difficult to diminish the size of a phototaking device.

In accordance with the sixth aspect of the invention, there is provided an image-formation lens system comprising a plurality of lenses with aspheric lenses, characterized in that:

any one of said aspheric lenses has an aspheric surface on an entrance side or an exit side thereof, and satisfies the following conditions:

$$0.4 > (\Delta Z_{max} - \Delta Z_{half})/Y_{max} > 0.18 \qquad (6)$$

$$0.05 > \Delta Z_{half}/Y_{max} \geq 0 \qquad (7)$$

where $Y_{max}$ is the maximum value of a distance of said aspheric lens surface from an optical axis, $\Delta Z_{max}$ is the absolute value of a distance from a plane vertical to the optical axis including a lens surface apex at $Y_{max}$, and $\Delta Z_{half}$ is the absolute value of a distance from a plane vertical to the optical axis including a lens surface apex at a distance half of said maximum value $Y_{max}$, provided that the lens surface refers to an entire area wherein a surface shape inclusive of an effective diameter exists continuously, indicative of a boundary between that area and an area where the surface shape becomes discontinuous.

The actions and advantages of the image-formation lens system according to the above sixth aspect of the invention are now explained.

To reduce the size and cost and enhance the performance of a lens system, it is required to rely on an aspheric lens thereby decreasing the number of lenses and increasing the degree of flexibility in correction of aberrations.

As the size of a lens system such as a zoom lens becomes small, the refraction of each lens tends to become strong, and with this there are degradations in axial aberrations represented generally by spherical aberration and off-axis aberrations represented by distortion and field curvature. To make correction for both such aberrations, it is required to use an aspheric lens that has such an effect as to correct spherical aberration mainly around its center and distortion and field curvature mainly at its periphery.

Accordingly, if a lens system is made up using an aspheric lens that satisfies conditions (6) and (7), it is then possible to achieve compactness and high performance with a reduced number of lenses.

Condition (6) is provided to define a difference between the quantities of asphericity around the center and at the periphery of the aspheric lens. As the upper limit of 0.4 to condition (6) is exceeded, some compactness is achievable because the aspheric lens has some considerable effect on correction of aberrations around its center and at its periphery; however, loads of the lens surface on correction of aberrations become too large to achieve satisfactory performance because of an increased performance degradation due to surface decentration. In addition, steep surface shape changes render it difficult to ensure surface accuracy. As the lower limit of 0.18 is not reached, the aspheric surface fails to obtain any sufficient effect on correction of aberrations; attempts to obtain satisfactory performance would cause the number of lenses or the size of the lens system to increase.

Condition (7) is combined with condition (6) to provide a definition of how the effect of the aspheric surface is much more enhanced. As the upper limit of 0.05 is exceeded, some compactness is achievable on condition that there is obtained the difference, as defined by condition (6), between the quantities of asphericity around the center and at the periphery, because the effect on correction of aberrations around the center and at the periphery is enhanced as described above; however, loads of the lens surface on correction of aberrations become too large to achieve mass fabrication in high yields because of an increased performance degradation due to surface decentration. In addition, steep surface shape changes render it difficult to ensure surface accuracy. On the other hand, there is no real chance of condition (7) having less than zero value.

In accordance with the seventh aspect of the invention, the image-formation lens system of the above sixth aspect is further characterized by satisfying either one of the following conditions (6') and (7'):

$$0.4 > (\Delta Z_{max} - \Delta Z_{half})/Y_{max} > 0.20 \qquad (6')$$

$$0.0322 \, \Delta Z_{half}/Y_{max} \geq 0 \qquad (7')$$

In accordance with the eighth aspect of the invention, there is provided an imaging system, characterized by comprising an image-formation lens system as recited in the above sixth or seventh aspect and a means located on an image side thereof for defining an image pickup area, wherein:

said image-formation lens system comprises a plurality of lens groups including a lens group of positive power and a lens group of negative power, wherein zooming is performed by varying the spacing between adjacent lens groups, and said aspheric lens is located within a lens group wherein a chief ray having the largest image height at an image plane is farthest off an optical axis in a zooming zone.

The actions and advantages of the imaging system according to the above eighth aspect of the invention are now explained.

The aspheric lens in the image-formation lens system according to the sixth or seventh aspect of the invention has the greatest effect when it is used where an axial light beam is farthest off an ambient light beam. It is thus preferable to locate that aspheric lens within a lens group wherein a center light beam is farthest off the ambient light beam, so that an imaging system of smaller size and higher performance can be provided.

In accordance with the ninth aspect of the invention, the imaging system of the above eighth aspect is further characterized in that said aspheric lens is located in a lens group nearest to the image side, with satisfaction of the following condition (9):

$$8.522 \, f_t/IH > 5.8 \qquad (9)$$

where $f_t$ is the composite focal length of the image-formation lens system at the telephoto end, and IH is the maximum image height at the image plane.

Generally in an image-formation lens system represented by a silver-halide film compact camera wherein image-formation size is somewhat larger than the effective diameter of the lens system, it is in a lens group nearest to the image side of the lens system that a center light beam is farthest off an ambient light beam. Accordingly, it is preferable to use an aspheric lens in this lens group.

Condition (9) is provided to define the focal length of the image-formation lens system at the telephoto end. Falling short of the lower limit of 5.8 to condition (9) ends up with cameras unattractive to users, because of too low a zoom ratio. Exceeding the upper limit of 8.5 makes it difficult to attain a proper balance among aberrations all over the zooming zone while compactness and low cost are maintained, because the zoom ratio is high. This is true even when an aspheric surface is used.

In accordance with the tenth aspect of the invention, the image-formation lens system of the above sixth aspect is further characterized by comprising an aperture stop, wherein said aspheric lens is such that a normal to said aspheric surface at a position spaced away from an optical axis on said aspheric surface along a lens surface by 70% of $Y_{max}$ is inclined toward the optical axis side in a direction in which said aperture stop is located, and a lens having an effective diameter larger than that of said aspheric lens is located on a side of said aspheric lens opposite to said aperture stop and adjacent to said aspheric lens on the optical axis with only an air gap therebetween.

The actions and advantages of the image-formation lens system according to the above tenth aspect of the invention are now explained.

An aspheric lens has higher performance when used in combination with other lens than when used alone. When further size reductions are desired, it is advantageous to decrease the thickness of the lens system along the optical axis. Thus, an arrangement wherein the peripheral portion of the aspheric lens is configured in such a way as to be concave in opposition to the stop is advantageous for decreasing the thickness of the lens system along the optical axis.

In accordance with the eleventh aspect of the invention, the image-formation lens system of the above tenth aspect is further characterized in that the lens located adjacent to said aspheric lens is a meniscus lens having a concave surface on an aperture stop side, wherein said concave surface and said aspheric surface are opposite to each other with an air gap therebetween and said aspheric surface and said concave surface are close to each other around peripheral positions thereof.

The actions and advantages of the image-formation lens system according to the above eleventh aspect of the invention are now explained.

The optical lens located adjacent to the aspheric lens is configured into a concave meniscus shape with respect to the aperture stop, and is positioned in contact with a peripheral convex portion of the aspheric surface of the aspheric lens while the concave surface of that optical lens facing the aspheric lens is located in opposition to that aspheric surface with a radius of curvature R deeper than that of the aspheric surface. This arrangement is very advantageous for reducing the thickness of the lens system in the optical axis direction. Preferably in this case, the adjoining lens having a deeper radius of curvature R should be made up of glass in favor of fabrication.

By allowing those lenses to be concave with respect to the aperture stop, it is also possible to make easy correction for field curvature and distortion and, hence, achieve compactness and high performance.

In accordance with the twelfth aspect of the invention, the image-formation lens system of the above tenth or eleventh aspect is further characterized in that said aspheric lens has a meniscus shape concave with respect to said aperture stop.

The actions and advantages of the image-formation lens system according the above twelfth aspect of the invention are now explained.

Correction of aberrations due to axial and off-axis light beams determined in dependence on the aperture stop is made by the aspheric surface in a separated fashion, facilitating that correction. If, in this case, the aspheric surface is such configured as to have a concave surface on the aperture stop side, it is then possible to make the angle of incidence of an off-axis light beam on the aspheric lens so gentle that off-axis aberrations can be substantially reduced.

In accordance with the thirteenth aspect of the invention, the image-formation lens system of the above twelfth aspect is further characterized in that the lens adjacent to the aspheric lens is configured in a meniscus form having a concave surface on the aperture stop side and negative power.

The actions and advantages of the image-formation lens system according to the above $13^{th}$ aspect of the invention are now explained.

An optical system including an aspheric surface is most preferably located at a position where a center light beam is farthest off an ambient light beam. With the arrangement wherein the negative meniscus form is applied to the lens located adjacent to the convex surface side of the meniscus aspheric lens, however, it is possible to make easy correction of aberrations even with respect to a larger image or object height.

In accordance with the fourteenth aspect of the invention, the imaging system of the above $8^{th}$ aspect of the invention is further characterized in that:

a lens group wherein said chief ray is farthest off the optical axis in a zooming zone is a lens group located nearest to the image side of said zoom lens system, said lens group located adjacent to the image side has negative power and consists of a plurality of negative lenses whose power turns negative on the optical axis, said aspheric lens is any one of said plurality of negative lenses, wherein power turns from negative to positive farther off the center thereof, and at least one of said plurality of negative lenses, different from said aspheric lens, is a negative lens that maintains negative power all the way from the center to the periphery thereof.

The actions and advantages of the imaging system according to the above $14^{th}$ aspect of the invention are now explained.

When the imaging system is used with a film-specific compact camera or the like, the whole length of the lens system at the telephoto end can be shortened by using a negative lens group as the lens group nearest to the image plane side. Because the axial negative power of this lens group is allocated to a plurality of lenses having negative power, it is possible to avoid the concentration of negative power on one single lens, thereby achieving high zoom performance and relieving the influences of decentration. In addition, at least one of the plurality of negative lenses is made up of an aspheric lens whose power turns positive farther off its center, i.e., an aspheric lens that behaves as a positive lens with respect to the farthest off-axis chief ray somewhere in the zooming zone. This ensures satisfactory correction of off-axis aberrations (especially distortion and chromatic aberration of magnification at the wide-angle end).

In accordance with the $15^{th}$ aspect of the invention, the imaging system according to the above $8^{th}$ aspect is further characterized in that:

a lens group wherein said chief ray is farthest off the optical axis in a zooming zone is a lens group located nearest to the object side of said zoom lens system, said lens group located nearest to the object side is a lens group having negative power and comprising a plurality of lenses, each having power turning negative on the optical axis, a lens having an aspheric surface is provided somewhere other than the side nearest to the object side, wherein said aspheric lens is any one of said plurality of lenses, which has gradually increasing positive power farther off the center thereof, and at least one of said plurality of lenses, different from said aspheric lens, is a negative lens that maintains negative power all the way from the center to the periphery thereof.

The actions and advantages of the imaging system according to the above 15$^{th}$ aspect of the invention are now explained.

When the imaging system is used on a CCD-incorporating digital camera or the like, the diameter of the zoom lens can be diminished while ensuring a wide-angle arrangement by using a negative lens group as the lens group nearest to the object side. In this aspect, at least one of the plurality of lenses is built up of an aspheric lens whose power turns gradually increasing positive farther off its center, i.e., an aspheric lens that behaves as a positive lens with respect to the farthest off-axis chief ray somewhere in the zooming zone. This ensures satisfactory correction of off-axis aberrations (especially distortion and chromatic aberration of magnification at the wide-angle end).

In accordance with the 16$^{th}$ aspect of the invention, the imaging system according to the above 8$^{th}$, 14$^{th}$ or 15$^{th}$ aspect is further characterized in that said zoom lens comprises up to 8 lenses in all.

In the imaging system according to the above 16$^{th}$ aspect of the invention, the number of lenses used is specified. The combined use of the aforesaid aspheric lens ensures that the number of lenses is much more reduced with the result that cost reductions as well as compactness are achievable.

In accordance with the 17$^{th}$ aspect of the invention, there is provided another image-formation lens system, characterized by comprising, in order from an object side thereof, a first lens group having positive power, a second lens group having positive power and a third lens group having negative power, wherein zooming from the wide-angle end to the telephoto end of the image-formation lens system is performed by allowing the spacing between the first lens group and the second lens group to become wide and the spacing between the second lens group and the third lens group to become narrow, and the third lens group consists of two negative lenses having negative power on an optical axis and satisfies the following conditions (10) and (5):

$$0.821 \, d_1/D_{air} < 2.0 \tag{10}$$

$$0.5521 \, L_t/f_t < 0.715 \tag{5}$$

where $d_1$ is the thickness on the optical axis of an object side-negative lens in the third lens group, $D_{air}$ is the air gap between the two negative lenses in the third lens group, $L_t$ is the real distance of the image-formation lens system from the surface located nearest to the object side to an image plane as measured at the telephoto end, and $f_t$ is the composite focal length of the image-formation lens system at the telephoto end.

When the size and cost of a three-group zoom lens of the ++− type are reduced by, for instance, shortening the length of the zoom lens at the telephoto end relative to the focal length, the power of each group is likely to become strong. In favor of low cost, it is preferable that as few lenses as possible be used. When it comes to a three-group zoom lens of ++− construction, generally, the effective diameter of the third lens group tends to become large. In other words, reducing the number of lenses in the third lens group is favorable for cost reductions. However, when the third lens group is composed of one negative lens, it is difficult to make sure of sufficient zoom ratios and performance, because the load to be carried by the third lens group in correction of aberrations is all applied to the one single negative lens. When the third lens group is composed of more than three lenses, on the other hand, the number of lenses at a large aperture site increases, leading to cost increases. In addition, each lens must have such thickness at the middle and edge as needed in view of fabrication, making the third lens group exceedingly thick and, hence, rendering it difficult to reduce the size of the image-formation lens system itself.

In the invention, the third lens group is made up of two lenses, each of which has negative power. Size reductions cause the power of the third lens group to become strong. If this power is shared by two negative-power lenses, it is then possible to ensure high zoom ratios and satisfactory performance at the same time.

Condition (10) is provided to define the air gap within the third lens group. As the upper limit of 2.0 to condition (10) is exceeded, the axial air gap between the object side-negative lens and the image side-negative lens in the third lens group becomes too narrow, rendering it difficult to make a difference between the radii of curvature of the image side-surface of the object side-negative lens and the object side-surface of the image side-negative lens, ending up with a failure in making sure of a certain air gap between the object side-negative lens and the image side-negative lens around their ends. Any failure in making a difference between the radii of curvature may possibly offset the ability to correct aberrations of an air lens sandwiched between both lenses.

Falling short of the lower limit of 0.8 to condition (10) is unfavorable for size reductions because the third lens group becomes large in the optical axis direction.

Condition (5) is provided to define to what degree the size of the lens system is reduced when the third lens group is defined as described above. As the lower limit of 0.55 is not reached, correction of each aberration at the third lens group becomes difficult when it is composed of two lenses, and it is difficult to make sure of fabrication accuracy as well. Exceeding the upper limit of 0.715, on the other hand, is favorable for performance and fabrication, but is detrimental to slimming down the image-formation lens system.

In accordance with the 18$^{th}$ aspect of the invention, the imaging system of any one of the above 1$^{st}$ to 5$^{th}$, 8$^{th}$ and 9$^{th}$ aspects is further characterized in that:

said image-formation lens system comprises, in order from an object side thereof, a first lens group having positive power, a second lens group having positive power and a third lens group having negative power, wherein zooming from the wide-angle end to the telephoto end thereof is performed with a zoom ratio of at least 3.3 by allowing the spacing between the first lens group and the second lens group to become wide and the spacing between the second lens group and the third lens group to become narrow.

In accordance with the 19$^{th}$ aspect of the invention, the image-formation lens system of any one of the above 6$^{th}$, 7$^{th}$ and 10$^{th}$ to 13$^{th}$ aspects is further characterized by comprising, in order from an object side thereof, a first lens group having positive power, a second lens group having positive power and a third lens group having negative power, wherein zooming from the wide-angle end to the telephoto end thereof is performed with a zoom ratio of at least 3.3 by allowing the spacing between the first lens group and the second lens group to become wide and the spacing between the second lens group and the third lens group to become narrow.

The actions and advantages of the imaging system of the above 18$^{th}$ aspect and the image-formation lens system of the above 19$^{th}$ aspect of the are now explained.

Such a lens group arrangement makes it easy to correct off-axis aberrations at the wide-angle end of the lens system and increase the focal length of the zoom lens at the telephoto end. It is thus preferable that the image-formation lens system is constructed of a lens system having a zoom ratio of 3.3 or more.

In accordance with the 20$^{th}$ aspect of the invention, the imaging system of the above 3$^{rd}$ or 4$^{th}$ aspect is further characterized in that said negative power lens group including an aspheric lens is a lens group located nearest to the image side thereof, and consists of two negative lenses.

In accordance with the 21$^{st}$ aspect of the invention, the image-formation lens system of any one of the above 6$^{th}$, 7$^{th}$ and 10$^{th}$–13$^{th}$ aspects is further characterized by comprising at least three lens groups including a lens group having positive power and a lens group having negative power wherein the spacing between adjacent lenses is varied for zooming, wherein:

at least one lens group having negative power includes said aspheric lens, is located nearest to the image side thereof, and consists of two negative lenses.

The actions and advantages of the imaging system according to the above 20$^{th}$ aspect and the image-formation lens system according to the above 21$^{st}$ aspect of the invention are now explained. The aspheric surfaces are so capable of making satisfactory correction of axial and off-axis aberrations that the number of lenses in each lens group can be reduced.

In accordance with the 22$^{nd}$ aspect of the invention, the imaging system of the above 20$^{th}$ aspect is further characterized in that one of said two negative lenses is a plastic aspheric lens having a d-line refracting index of up to 1.6 and the other is a glass lens having a d-line refractive index of at least 1.6.

In accordance with the 23$^{rd}$ aspect of the invention, the image-formation lens system of the 21$^{st}$ above aspect is further characterized in that at least one of said two negative lenses is a plastic aspheric lens having a d-line refracting index of up to 1.6 and another is a glass lens having a d-line refractive index of at least 1.6.

The imaging system of the above 22$^{nd}$ aspect and the image-formation lens system of the above 23$^{rd}$ aspect of the invention are now explained.

An aspheric lens should preferably be formed of a plastic material with its configuration in mind. An aspheric lens having a refracting index exceeding 1.6 must be formed of a glass material with which an aspheric surface is hard to obtain. In this case, it is preferable to use Zeonex (trade name) of low hygroscopicity. Another negative lens in the negative lens group including an aspheric lens should then preferably be a glass lens having a high refractive index in favor of correction of field curvature. A glass lens having a refracting index less than 1.6 renders correction of field curvature difficult.

In accordance with the 24$^{th}$ aspect of the invention, the imaging system of the above 5$^{th}$ or 18$^{th}$ aspect is further characterized in that said second lens group is configured at a surface located nearest to the object side in such a way as to be concave on the object side, and comprises a doublet that consists of a positive lens and a negative lens and satisfies the following conditions:

$$1.85 > n_d > 1.7 \tag{11}$$

$$60 > v_d > 40 \tag{12}$$

where $n_d$ and $v_d$ are the d-line refractive index and Abbe number of the negative lens in the doublet, respectively.

In accordance with the 25$^{th}$ aspect of the invention, the image-formation lens system of the above 17$^{th}$ or 19$^{th}$ aspect is further characterized in that said second lens group is configured at a surface located nearest to the object side in such a way as to be concave on the object side, and comprises at least one doublet that consists of a positive lens and a negative lens and satisfies the following conditions (11) and (12):

$$1.85 > n_d > 1.7 \tag{11}$$

$$60 > v_d > 40 \tag{12}$$

where $n_d$ and $v_d$ are the d-line refractive index and Abbe number of the negative lens in the doublet, respectively.

The actions and advantages of the imaging system according to the above 24$^{th}$ aspect and the image-formation lens system according to the above 25$^{th}$ aspect of the invention are now explained.

With this arrangement, field curvature and chromatic aberrations are corrected at the second lens group. By setting the refractive index of the negative lens in the doublet a little stronger, field curvature is corrected. As the lower limit of 1.7 to condition (11) is not reached, correction of field curvature becomes difficult, and as the upper limit of 1.85 is exceeded, lens materials cost much, rendering cost reductions difficult. Condition (12) is concerned with correction of chromatic aberrations. As the lower limit of 40 is not reached, axial chromatic aberration at the telephoto end is likely to become noticeable. As the upper limit of 60 is exceeded, meanwhile, axial chromatic aberration at the wide-angle end is likely to become noticeable.

In accordance with the 26$^{th}$ aspect of the invention, the imaging system of the above 5$^{th}$, 18$^{th}$ or 24$^{th}$ aspect is further characterized in that in said first lens group or said third lens group there is located a flare stop that is similar in shape to the image plane and differs in length in long and short side directions, thereby cutting off at least a part of harmful light beams in the long and short side directions.

The actions and advantages of the above 26$^{th}$ imaging system according to the invention are now explained. As the size of the lens system becomes small, the air gap between the two negative lenses in the third lens group is likely to emit ghost light at a zooming zone in the vicinity of the wide-angle to standard state. This ghost light occurs at a position remote from the optical axis of the third lens group, and is effectively removed by configuring the stop in the third lens group to a rectangular shape that can cut off non-effective light beams as much as possible. The ghost light also passes near to the farthest off-axis site of the first lens group, and so the use of a similar rectangular stop in the first lens group is effective for removal of the ghost light as well.

It is noted that the present invention may further be embodied by suitable combinations of some of the above arrangements. For instance, if the aspheric lens recited in the third aspect of the invention is allowed to satisfy both conditions (6) and (7) recited in the 6$^{th}$ aspect or used in combination with the arrangement recited in the 17$^{th}$ aspect of the invention, the advantages of the invention can be more enhanced.

The advantages of the invention can be much more enhanced if the scope of each condition is defined as follows (in terms of the upper and lower limits).

| Condition | Lower Limit | Upper Limit |
|---|---|---|
| (1) | 0.08 | 0.19 |
| (2) | 2.0 | 2.7 |
| (3) | −4.2% | 4.2% |
| (4) | 18 | 50 |
| (5) | 0.6 | 0.68 |
| (6) | 0.4 | 0.20 |
| (7) | 0.03 | 0 |
| (8) | 21 mm | 23 mm |
| (9) | 6.3 | 7.5 |
| (10) | 0.9 | 1.8 |
| (11) | 1.75 | 1.82 |
| (12) | 44 | 50 |

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

DESCRIPTION OF THE PREFERRED EMBODIMENTS

The zoom lens used on the imaging system of the invention is now explained with reference to Examples 1 to 14. FIGS. 1 to 14 are illustrative in section of the lens arrangements of Examples 1 to 14 at the wide-angle end (a), in an intermediate state (b) and at the telephoto end (c) upon focused on an object point at infinity. In these figures, G1 represents a first lens group, S a stop, G2 a second lens group, G3 a third lens group, FS a flare stop, F a filter such as an infrared cut absorption filter and a low-pass filter, CG a cover glass for an electronic image pickup device, and I an image plane.

Figure 1A:
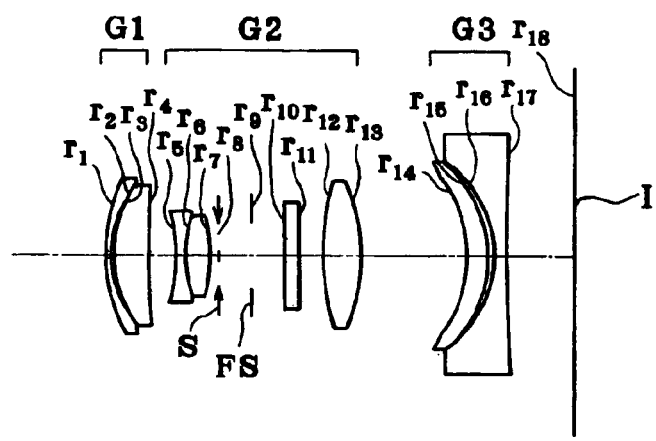
FIGS. 1(a), 1(b) and 1(c) are illustrative in section of Example 1 of the zoom lens used on the imaging system of the invention at the wide-angle end (a), in an intermediate state (b) and at the telephoto end (c), respectively, when the zoom lens is focused on an object point at infinity.
Figure 1B:
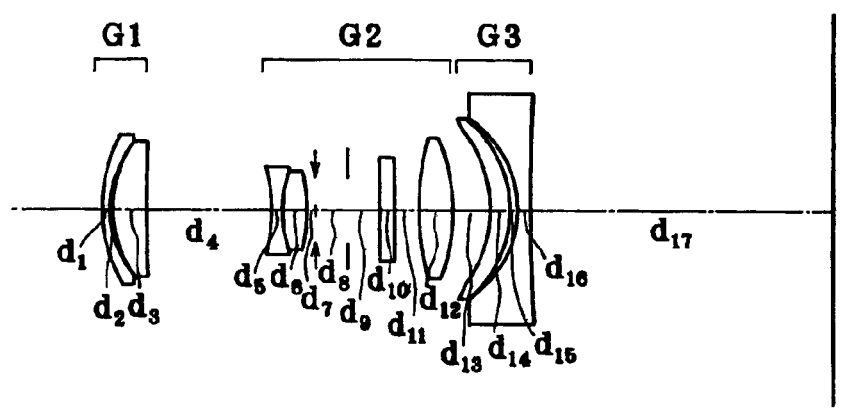
Figure 1C:
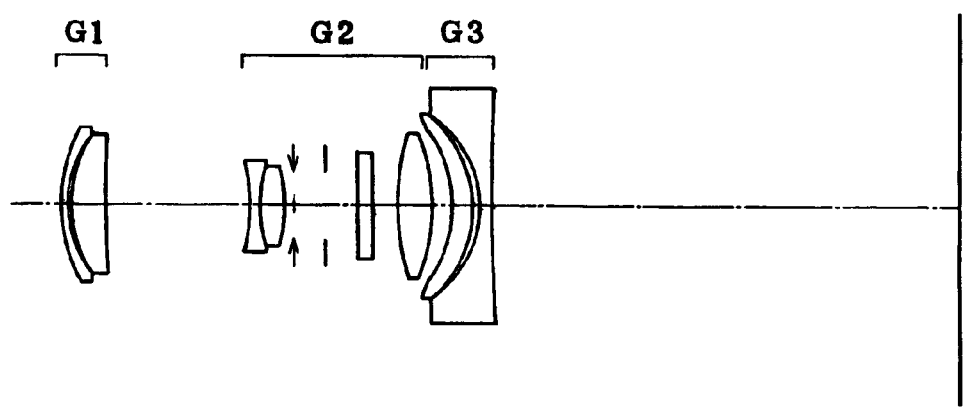

Example 1 is directed to a zoom lens that, as shown in FIG. 1, consists of a first lens group G1 that has positive refracting power and consists up of a negative meniscus lens convex on its object side and a positive meniscus lens convex on its object side, a second lens group G2 that has positive refracting power and consists of a doublet made of a double-concave negative lens and a double-convex positive lens, an aperture stop S, a flare stop FS, a positive meniscus lens convex on its image plane side and a double-convex positive lens and a third lens group G3 that has negative refracting power and consists of a negative meniscus lens convex on its image side and a double-concave negative lens. Upon zooming from the wide-angle end to the telephoto end, all the lens groups move toward the object side while the spacing between the first lens group G1 and the second lens group G2 becomes wide and the spacing between the second lens group G2 and the third lens group G3 becomes narrow.

Four aspheric surfaces are used; two at both surfaces of the positive meniscus lens in the second lens group G2 and two at both surfaces of the negative meniscus lens in the third lens group G3.

The lens on the object side of the third lens group G3 is a plastic lens.

Figure 2A:
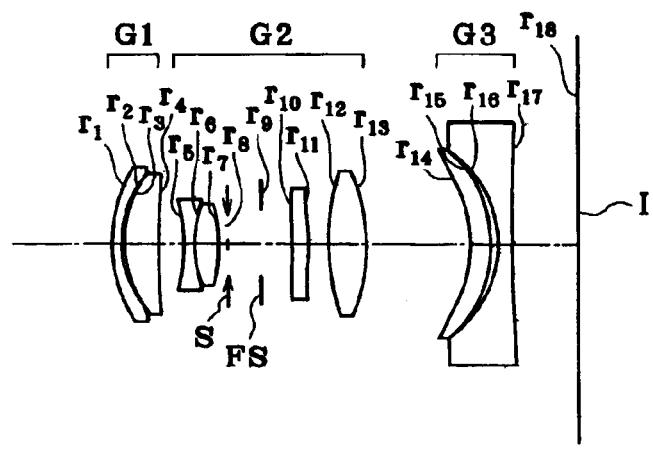
FIGS. 2(a), 2(b) and 2(c) are illustrative in section of Example 2 of the zoom lens, similar to FIGS. 1(a) to 1(c).
Figure 2B:
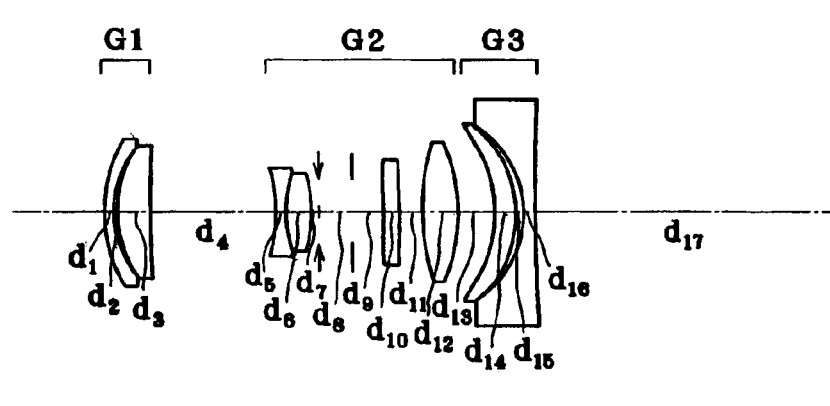
Figure 2C:
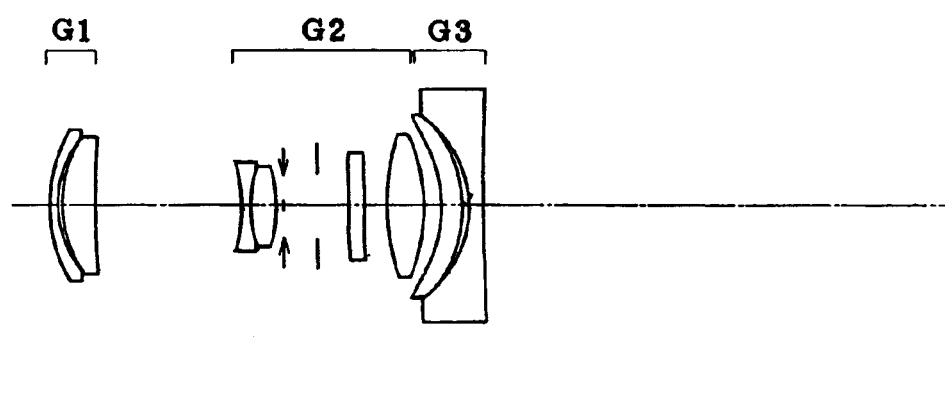

Example 2 is directed to a zoom lens that, as shown in FIG. 2, consists of a first lens group G1 that has positive refracting power and consists of a negative meniscus lens convex on its object side and a positive meniscus lens convex on its object side, a second lens group G2 that has positive refracting power and consists of a doublet made up of a double-concave negative lens and a double-convex positive lens, an aperture stop S, a flare stop FS, a positive meniscus lens convex on its image plane side and a double-convex positive lens and a third lens group G3 that has negative refracting power and consists of a negative meniscus lens convex on its image plane side and a double-concave negative lens. Upon zooming from the wide-angle end to the telephoto end, all the lens groups move toward the object side while the spacing between the first lens group G1 and the second lens group G2 becomes wide and the spacing between the second lens group G2 and the third lens group G3 becomes narrow.

Four aspheric surfaces are used; two at both surfaces of the positive meniscus lens in the second lens group G2 and two at both surfaces of the negative meniscus lens in the third lens group G3.

The lens on the object side of the third lens group G3 is a plastic lens.

Figure 3A:
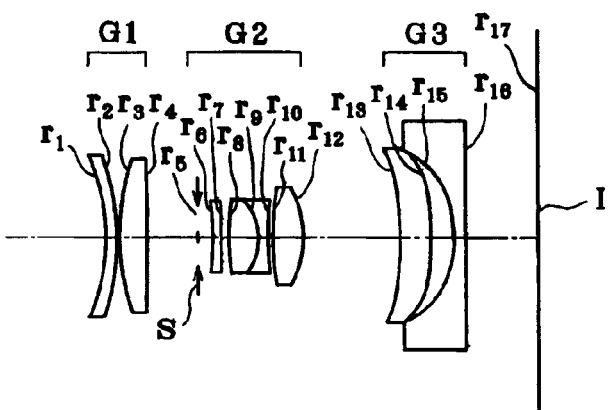
FIGS. 3(a), 3(b) and 3(c) are illustrative in section of Example 3 of the zoom lens, similar to FIGS. 1(a) to 1(c).
Figure 3B:
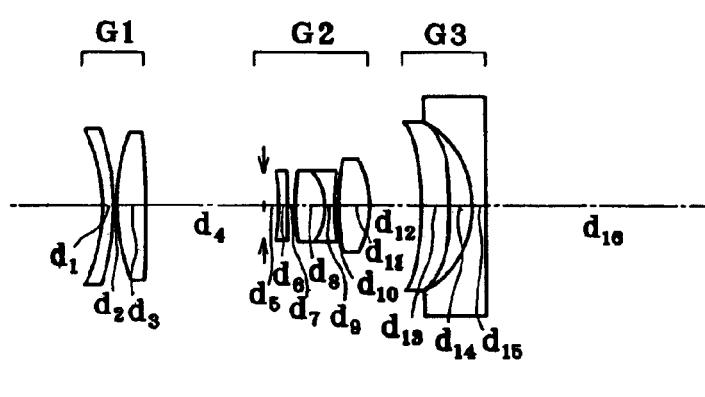
Figure 3C:
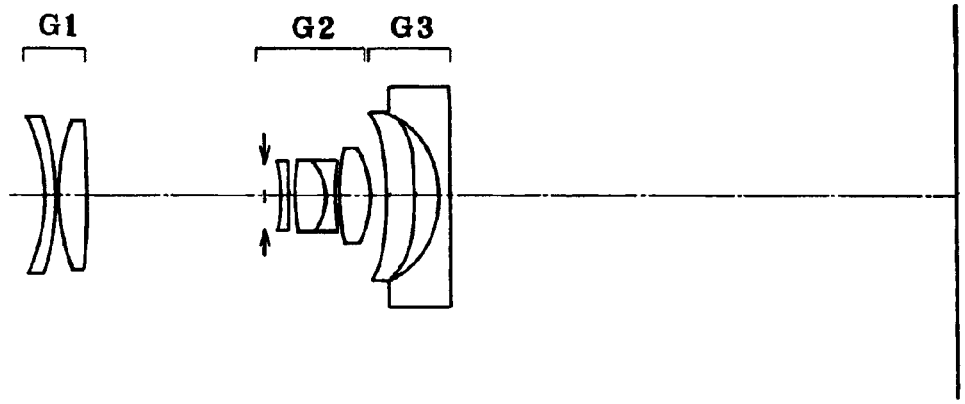

Example 3 is directed to a zoom lens that, as shown in FIG. 3, consists of a first lens group G1 that has positive refracting power and consists of a negative meniscus lens convex on its image plane side and a double-convex positive lens, a second lens group G2 that has positive refracting power and consists of an aperture stop S, a negative meniscus lens convex on its image plane side, a doublet made up of a double-convex positive lens and a double-concave negative lens and a double-convex positive lens and a third lens group G3 that has negative refracting power and consists of a negative meniscus lens convex on its image plane side and a negative meniscus lens convex on its image plane side. Upon zooming from the wide-angle end to the telephoto end, all the lens groups move toward the object side while the spacing between the first lens group G1 and the second lens group G2 becomes wide and the spacing between the second lens group G2 and the third lens group G3 becomes narrow.

Four aspheric surfaces are used; two at both surfaces of the double-convex positive lens located nearest to the image plane side of the second lens group G2 and two at both surfaces of the object-side negative meniscus lens in the third lens group G3.

The lens on the object side of the third lens group G3 is a plastic lens.

Figure 4A:
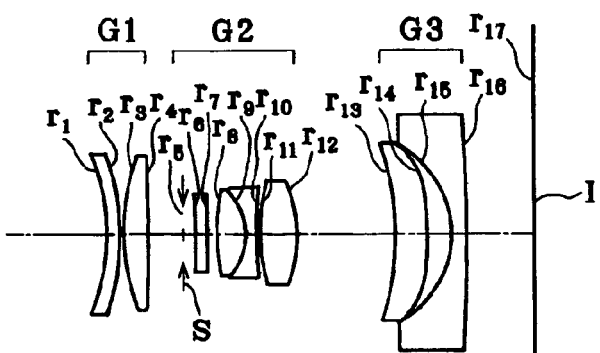
FIGS. 4(a), 4(b) and 4(c) are illustrative in section of Example 4 of the zoom lens, similar to FIGS. 1(a) to 1(c).
Figure 4B:
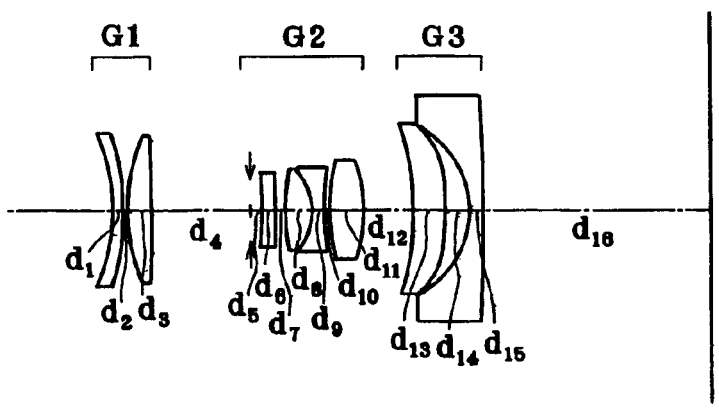
Figure 4C:
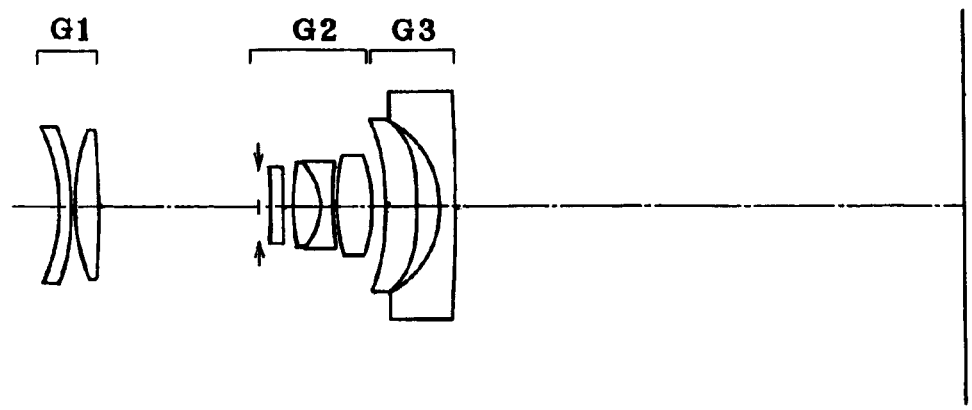

Example 4 is directed to a zoom lens that, as shown in FIG. 4, consists of a first lens group G1 that has positive refracting power and consists of a negative meniscus lens convex on its image plane side and a double-convex positive lens, a second lens group G2 that has positive refracting power and consists of an aperture stop S, a double-concave negative lens, a doublet made up of a double-convex positive lens and a double-concave negative lens and a double-convex positive lens and a third lens group G3 that has negative refracting power and consists of a negative meniscus lens convex on its image plane side and a negative meniscus lens convex on its image plane side. Upon zooming from the wide-angle end to the telephoto end, all the lens groups move toward the object side while the spacing between the first lens group G1 and the second lens group G2 becomes wide and the spacing between the second lens group G2 and the third lens group G3 becomes narrow.

Four aspheric surfaces are used; two at both surfaces of the double-convex positive lens located nearest to the image plane side of the second lens group G2 and two at both surfaces of the object-side negative meniscus lens in the third lens group G3.

The lens on the object side of the third lens group G3 is a plastic lens.

Figure 5A:
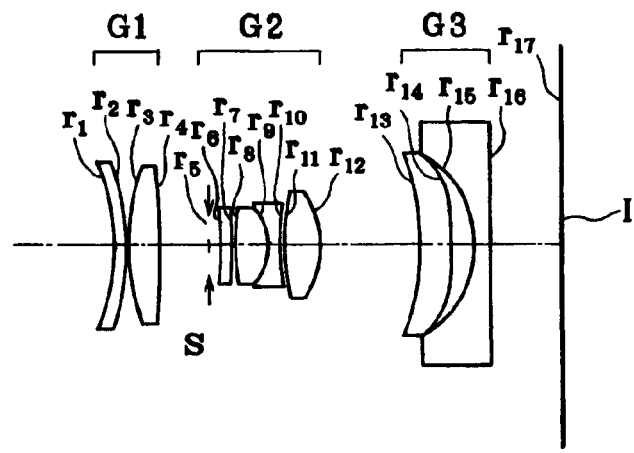
FIGS. 5(a), 5(b) and 5(c) are illustrative in section of Example 5 of the zoom lens, similar to FIGS. 1(a) to 1(c).
Figure 5B:
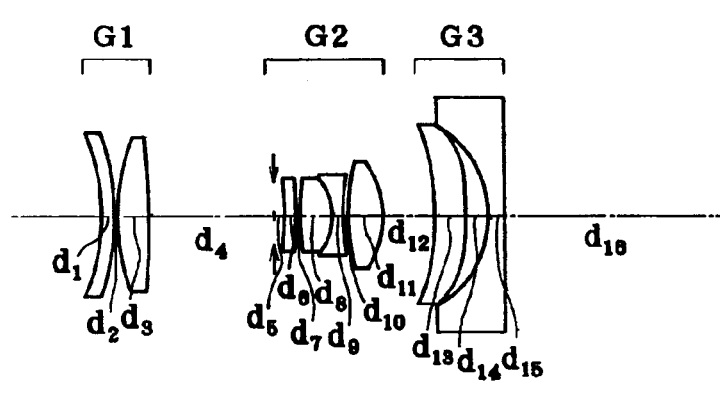
Figure 5C:
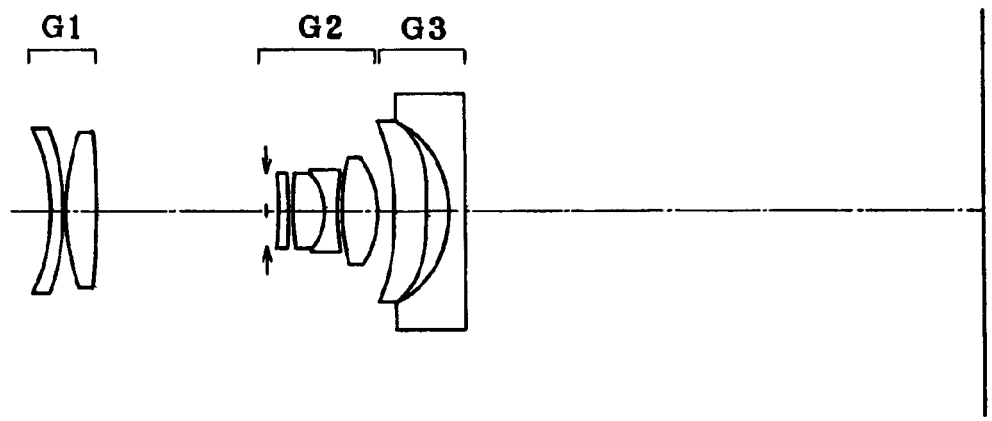

Example 5 is directed to a zoom lens that, as shown in FIG. 5, consists of a first lens group G1 that has positive refracting power and consists of a negative meniscus lens convex on its image plane side and a double-convex positive lens, a second lens group G2 that has positive refracting power and consists of an aperture stop S, a negative meniscus lens convex on its image plane side, a doublet made up of a double-convex positive lens and a double-concave negative lens and a double-convex positive lens and a third lens group G3 that has negative refracting power and consists of a negative meniscus lens convex on its image plane side and a double-concave negative lens. Upon zooming from the wide-angle end to the telephoto end, all the lens groups move toward the object side while the spacing between the first lens group G1 and the second lens group G2 becomes wide and the spacing between the second lens group G2 and the third lens group G3 becomes narrow.

Four aspheric surfaces are used; two at both surfaces of the double-convex positive lens located nearest to the image plane side of the second lens group G2 and two at both surfaces of the negative meniscus lens in the third lens group G3.

The lens on the object side of the third lens group G3 is a plastic lens.

Figure 6A:
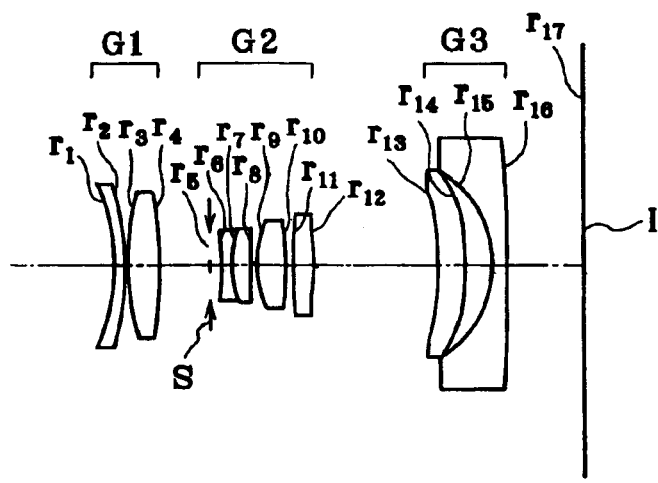
FIGS. 6(a), 6(b) and 6(c) are illustrative in section of Example 6 of the zoom lens, similar to FIGS. 1(a) to 1(c).
Figure 6B:
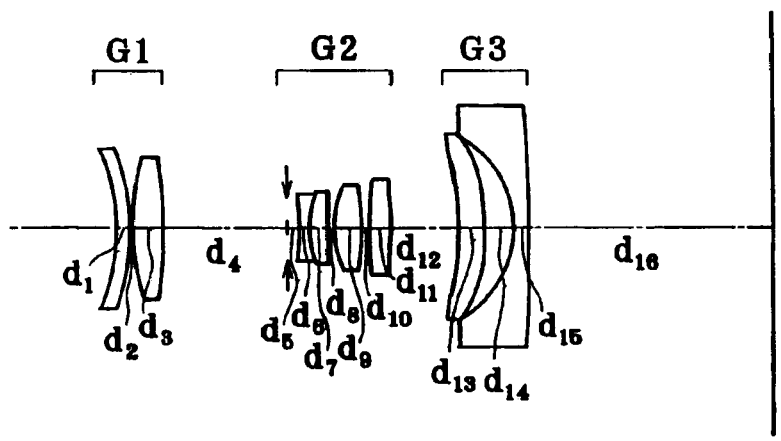
Figure 6C:
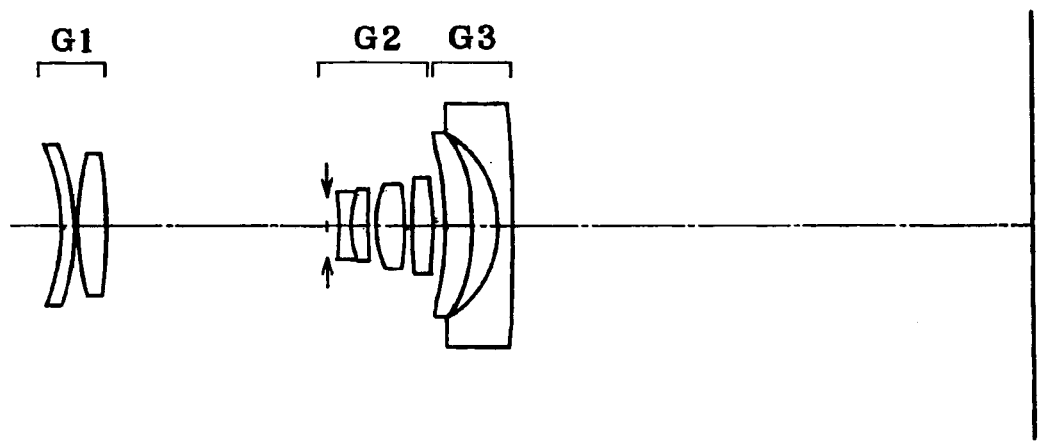

Example 6 is directed to a zoom lens that, as shown in FIG. 6, consists of a first lens group G1 that has positive refracting power and consists of a negative meniscus lens convex on its image plane side and a double-convex positive lens, a second lens group G2 that has positive refracting power and consists of an aperture stop S, a doublet made up of a double-concave negative lens and a double-convex positive lens, a double-convex positive lens and a positive meniscus lens convex on its image plane side and a third lens group G3 that has negative refracting power and consists of a negative meniscus lens convex on its image plane side and a negative meniscus lens convex on its image plane side. Upon zooming from the wide-angle end to the telephoto end, all the lens groups move toward the object side while the spacing between the first lens group G1 and the second lens group G2 becomes wide and the spacing between the second lens group G2 and the third lens group G3 becomes narrow.

Four aspheric surfaces are used; two at both surfaces of the positive meniscus lens located nearest to the image plane side of the second lens group G2 and two at both surfaces of the object side-negative meniscus lens in the third lens group G3.

The lens on the object side of the third lens group G3 is a plastic lens.

Figure 7A:
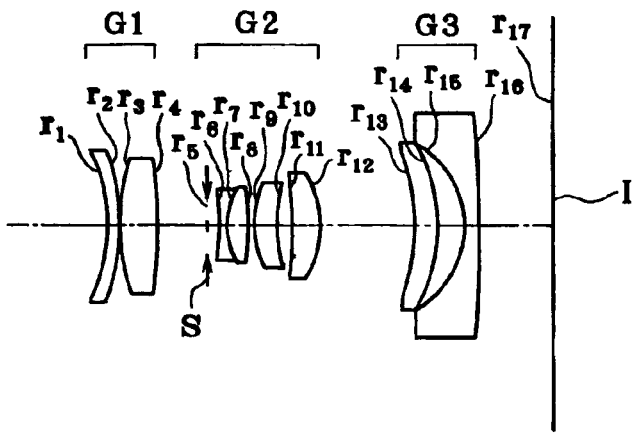
FIGS. 7(a), 7(b) and 7(c) are illustrative in section of Example 7 of the zoom lens, similar to FIGS. 1(a) to 1(c).
Figure 7B:
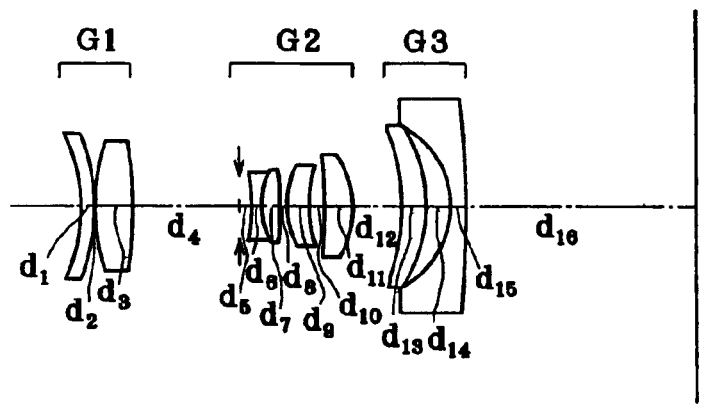
Figure 7C:
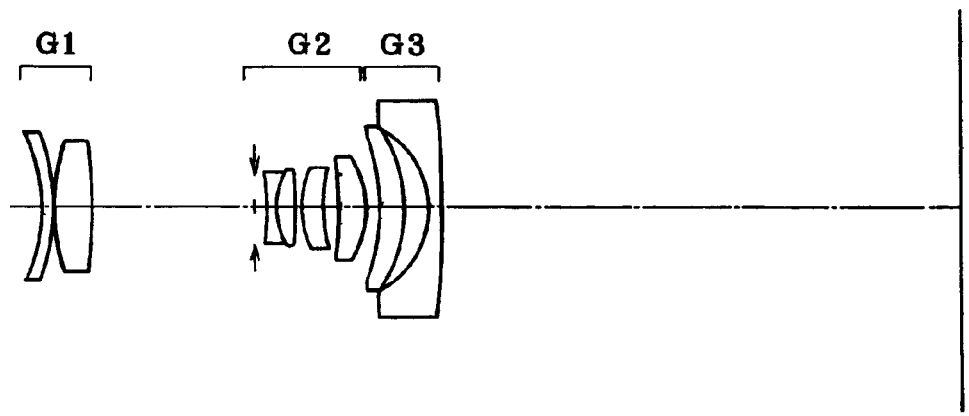

Example 7 is directed to a zoom lens that, as shown in FIG. 7, consists of a first lens group G1 that has positive refracting power and consists of a negative meniscus lens convex on its image plane side and a double-convex positive lens, a second lens group G2 that has positive refracting power and consists of an aperture stop S, a doublet made up of a double-concave negative lens and a double-convex positive lens, a positive meniscus lens convex on its object side and a positive meniscus lens convex on its image plane side and a third lens group G3 that has negative refracting power and consists of a negative meniscus lens convex on its image plane side and a negative meniscus lens convex on its image plane side. Upon zooming from the wide-angle end to the telephoto end, all the lens groups move toward the object side while the spacing between the first lens group G1 and the second lens group G2 becomes wide and the spacing between the second lens group G2 and the third lens group G3 becomes narrow.

Four aspheric surfaces are used; two at both surfaces of the positive meniscus lens convex on its object side in the second lens group G2 and two at both surfaces of the object side-negative meniscus lens in the third lens group G3.

The lens on the object side of the third lens group G3 is a plastic lens.

Figure 8A:
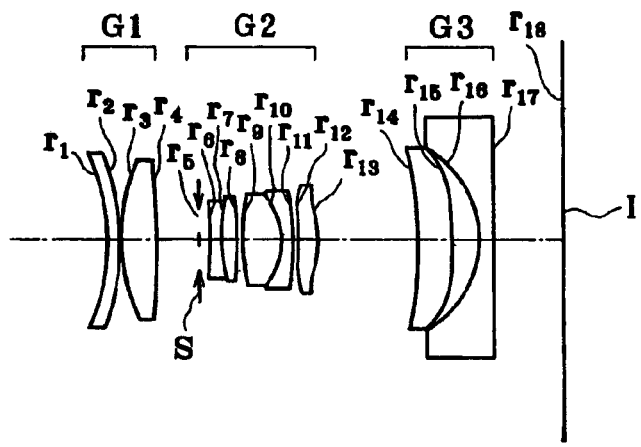
FIGS. 8(a), 8(b) and 8(c) are illustrative in section of Example 8 of the zoom lens, similar to FIGS. 1(a) to 1(c).
Figure 8B:
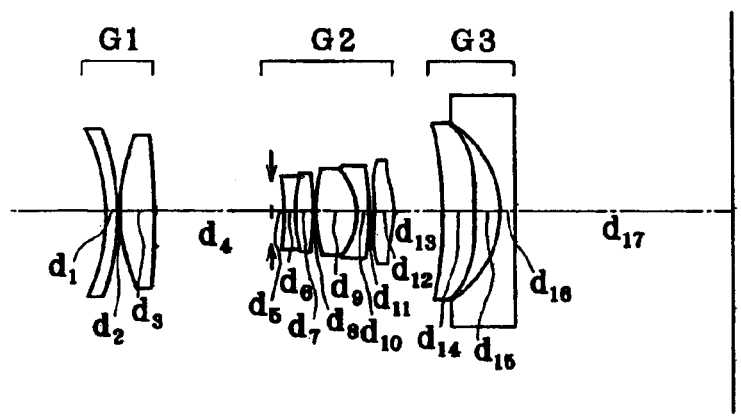
Figure 8C:
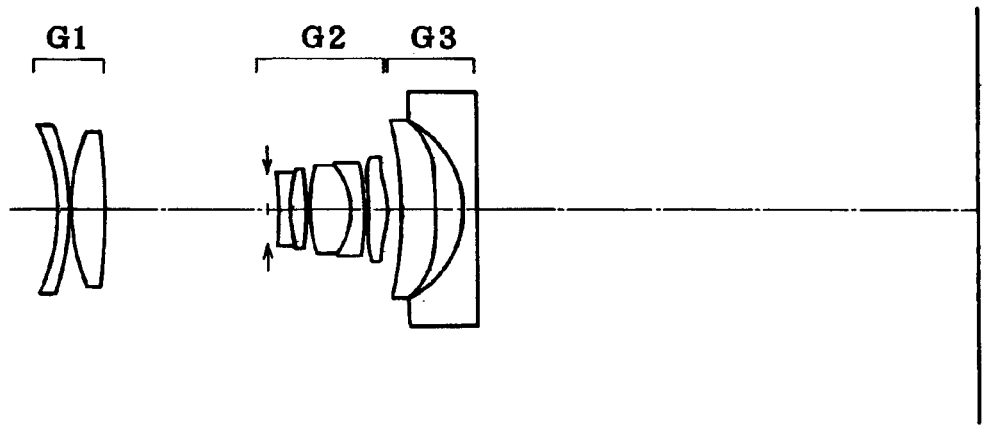

Example 8 is directed to a zoom lens that, as shown in FIG. 8, consists of a first lens group G1 that has positive refracting power and consists of a negative meniscus lens convex on its image plane side and a double-convex positive lens, a second lens group G2 that has positive refracting power and consists of an aperture stop S, a doublet made up of a double-concave negative lens and a double-convex positive lens, a doublet made up of a double-convex positive lens and a negative meniscus lens convex on its image plane side and a third lens group G3 that has negative refracting power and consists of a negative meniscus lens convex on its image plane side and a double-concave negative lens. Upon zooming from the wide-angle end to the telephoto end, all the lens groups move toward the object side while the spacing between the first lens group G1 and the second lens group G2 becomes wide and the spacing between the second lens group G2 and the third lens group G3 becomes narrow.

Four aspheric surfaces are used; two at both surfaces of the positive meniscus lens located nearest to the image plane side of the second lens group G2 and two at both surfaces of the negative meniscus lens in the third lens group G3.

The lens on the object side of the third lens group G3 is a plastic lens.

Figure 9A:
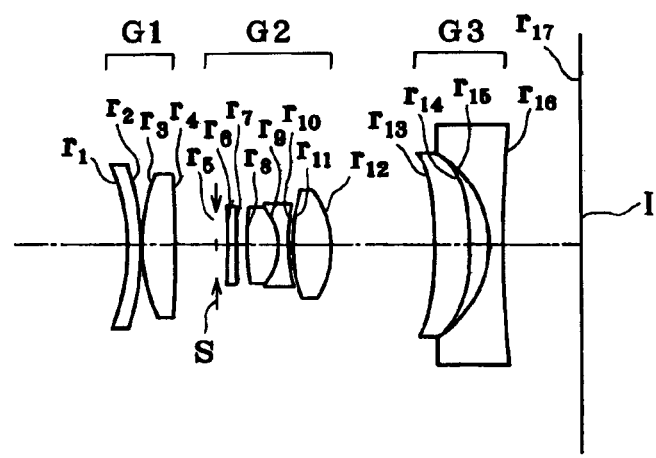
FIGS. 9(a), 9(b) and 9(c) are illustrative in section of Example 9 of the zoom lens, similar to FIGS. 1(a) to 1(c).
Figure 9B:
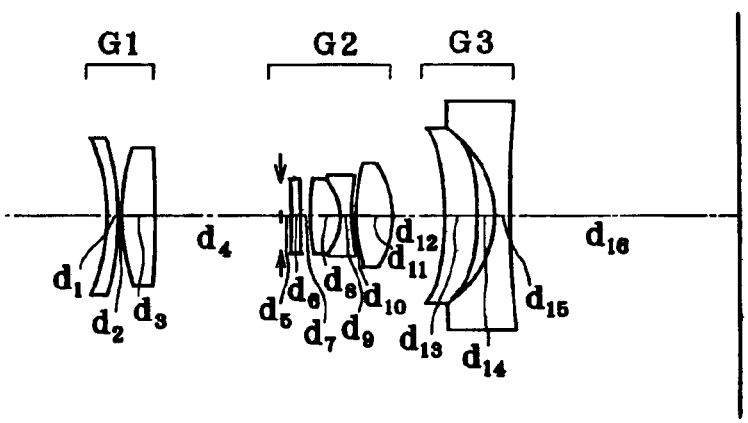
Figure 9C:
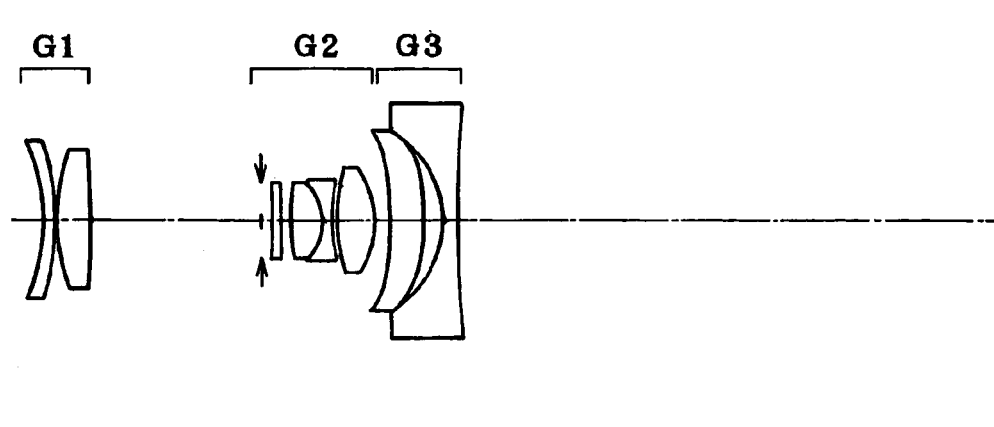

Example 9 is directed to a zoom lens that, as shown in FIG. 9, consists of a first lens group G1 that has positive refracting power and consists of a negative meniscus lens convex on its image plane side and a double-convex positive lens, a second lens group G2 that has positive refracting power and consists of an aperture stop S, a double-concave negative lens, a doublet made up of a double-convex positive lens and a double-concave negative lens and a double-convex positive lens and a third lens group G3 that has negative refracting power and consists of a negative meniscus lens convex on its image plane side and a double-concave negative lens. Upon zooming from the wide-angle end to the telephoto end, all the lens groups move toward the object side while the spacing between the first lens group G1 and the second lens group G2 becomes wide and the spacing between the second lens group G2 and the third lens group G3 becomes narrow.

Four aspheric surfaces are used; two at both surfaces of the double-convex positive lens located nearest to the image plane side of the second lens group G2 and two at both surfaces of the negative meniscus lens in the third lens group G3.

The lens on the object side of the third lens group G3 is a plastic lens.

Figure 10A:
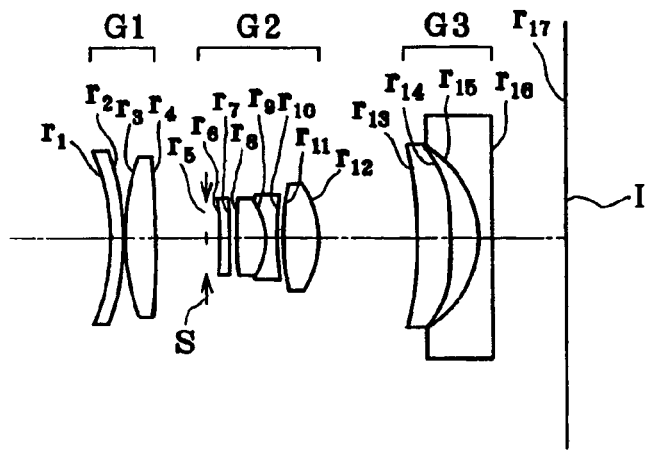
FIGS. 10(a), 10(b) and 10(c) are illustrative in section of Example 10 of the zoom lens, similar to FIGS. 1(a) to 1(c).
Figure 10B:
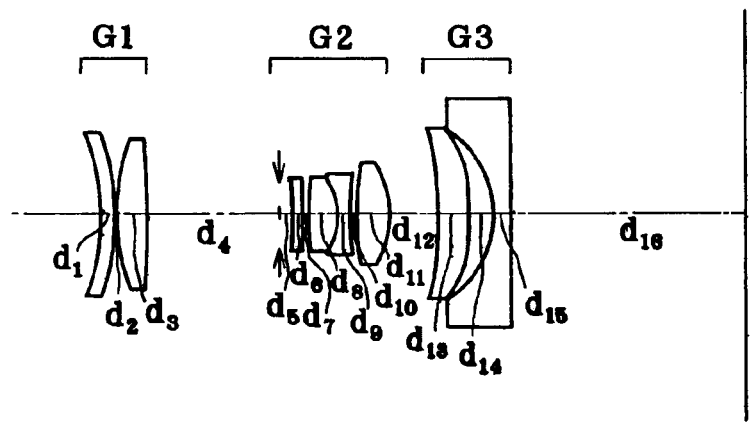
Figure 10C:
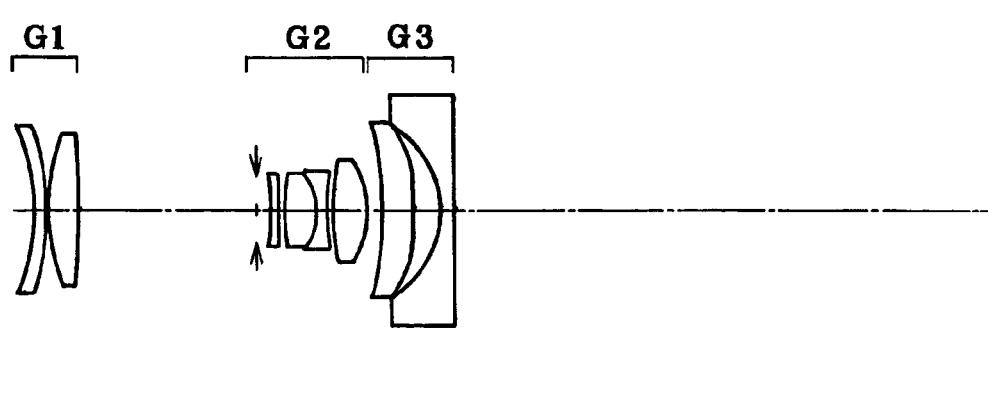

Example 10 is directed to a zoom lens that, as shown in FIG. 10, a first lens group G1 that has positive refracting power and consists of a negative meniscus lens convex on its image plane side and a double-convex positive lens, a second lens group G2 that has positive refracting power and consists of an aperture stop S, a negative meniscus lens convex on its image plane side, a doublet made up of a double-convex positive lens and a double-concave negative lens and a double-convex positive lens and a third lens group G3 that has negative refracting power and consists of a negative meniscus lens convex on its image plane side and a negative meniscus lens convex on its image plane side. Upon zooming from the wide-angle end to the telephoto end, all the lens groups move toward the object side while the spacing between the first lens group G1 and the second lens group G2 becomes wide and the spacing between the second lens group G2 and the third lens group G3 becomes narrow.

Four aspheric surfaces are used; two at both surfaces of the double-convex positive lens located nearest to the image plane side of the second lens group G2 and two at both surfaces of the object side-negative meniscus lens in the third lens group G3.

The lens on the object side of the third lens group G3 is a plastic lens.

Figure 11A:
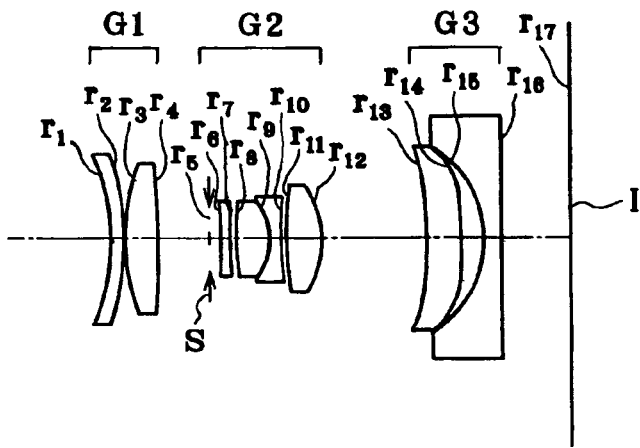
FIGS. 11(a), 11(b) and 11(c) are illustrative in section of Example 11 of the zoom lens, similar to FIGS. 1(a) to 1(c).
Figure 11B:
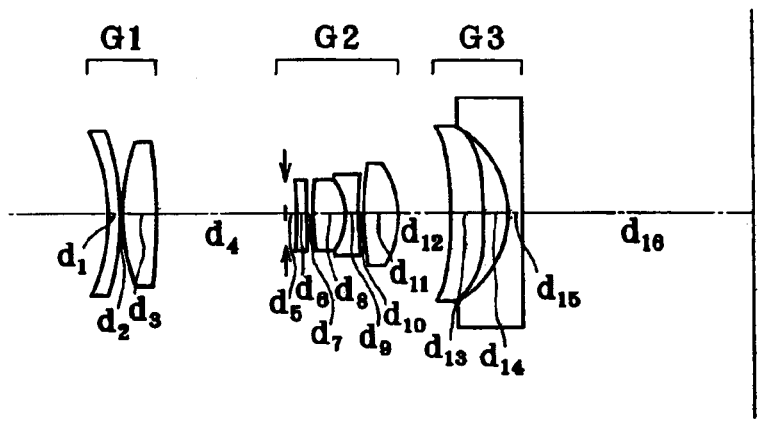
Figure 11C:
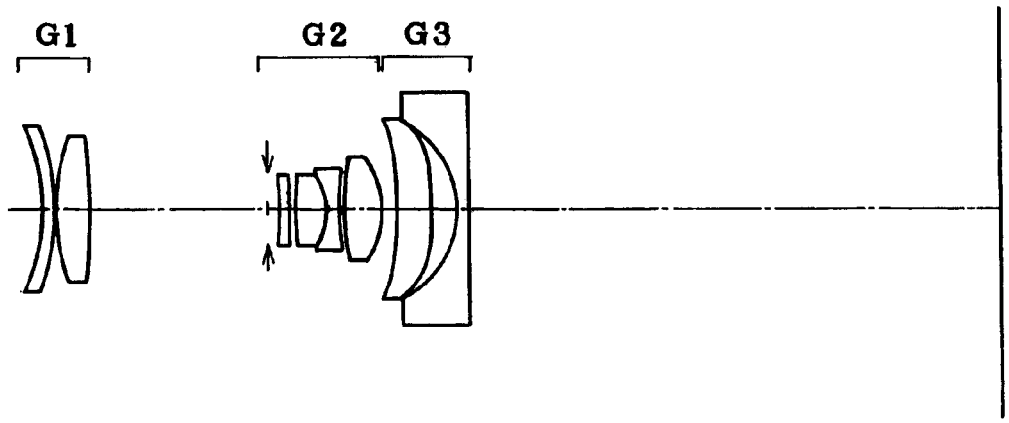

Example 11 is directed to a zoom lens that, as shown in FIG. 11, consists of a first lens group G1 that has positive refracting power and consists of a negative meniscus lens convex on its image plane side and a double-convex positive lens, a second lens group G2 that has positive refracting power and consists of an aperture stop S, a negative meniscus lens convex on its image plane side, a doublet made up of a double-convex positive lens and a double-concave negative lens and a double-convex positive lens and a third lens group G3 that has negative refracting power and consists of a negative meniscus lens convex on its image plane side and a double-concave negative lens. Upon zooming from the wide-angle end to the telephoto end, all the lens groups move toward the object side while the spacing between the first lens group G1 and the second lens group G2 becomes wide and the spacing between the second lens group G2 and the third lens group G3 becomes narrow.

Four aspheric surfaces are used; two at both surfaces of the double-convex positive lens located nearest to the image plane side of the second lens group G2 and two at both surfaces of the negative meniscus lens in the third lens group G3.

The lens on the object side of the third lens group G3 is a plastic lens.

Figure 12A:
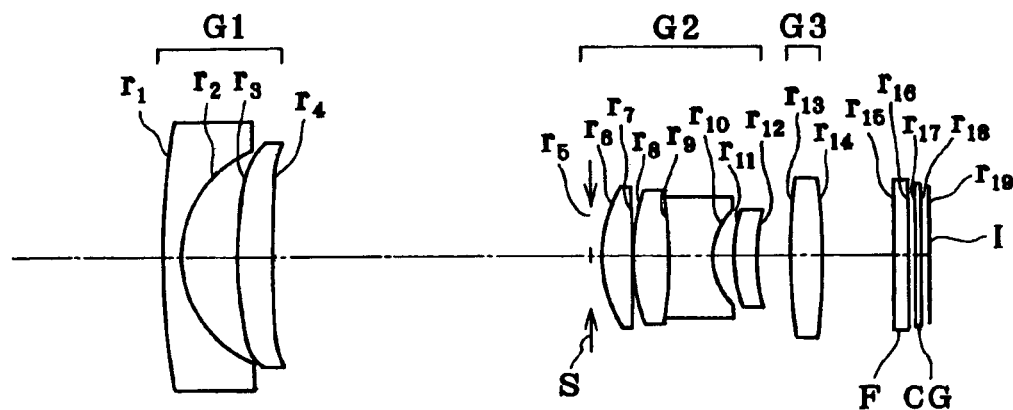
FIGS. 12(a), 12(b) and 12(c) are illustrative in section of Example 12 of the zoom lens, similar to FIGS. 1(a) to 1(c).
Figure 12B:
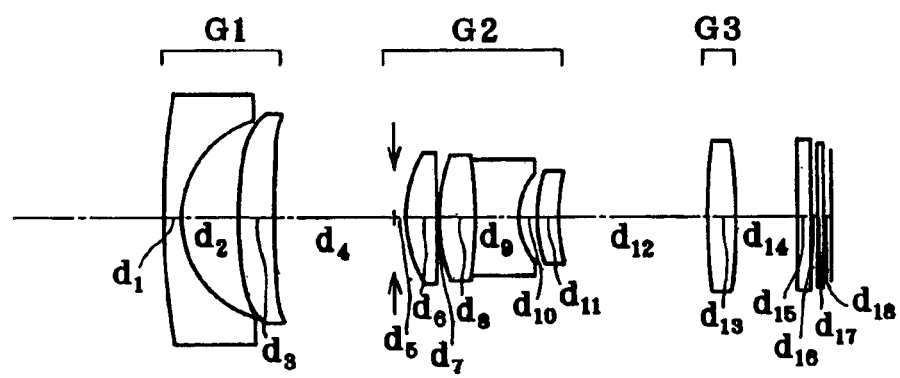
Figure 12C:
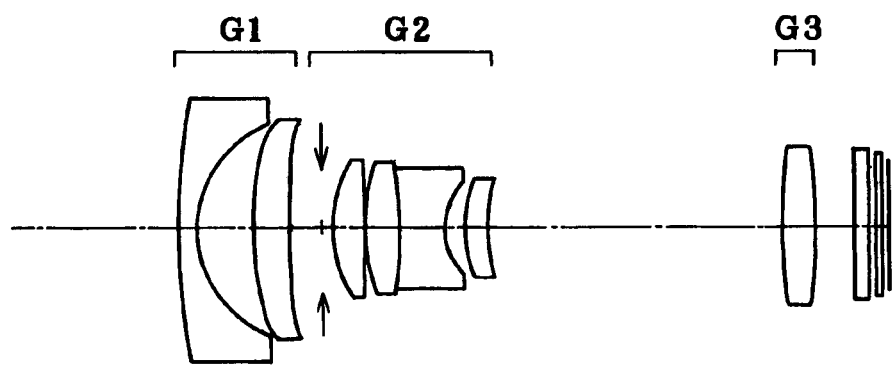

Example 12 is directed to a zoom lens that, as shown in FIG. 12, consists of a first lens group G1 that has negative refracting power and consists of a negative meniscus lens convex on its object side and a positive meniscus lens convex on its object side, a second lens group G2 that has positive refracting power and consists of an aperture stop S, a double-convex positive lens, a doublet made up of a double-convex positive lens and a double-concave negative lens and a positive meniscus lens convex on its object side and a third lens group G3 that has positive refracting power and consists of one double-convex positive lens. Upon zooming from the wide-angle end to the telephoto end, the first lens group G1 moves toward the object side in a concave locus, arriving at a position closer to the image plane side at the telephoto end than at the wide-angle end. The second lens group G2 moves monotonously toward the object side while the third lens group G3 moves slightly toward the image plane side.

Four aspheric surfaces are used; two at both surfaces of the positive meniscus lens in the first lens group G1 and two at both surfaces of the double-convex positive lens located nearest to the object side of the second lens group G2.

No plastic lens is used.

Figure 13A:
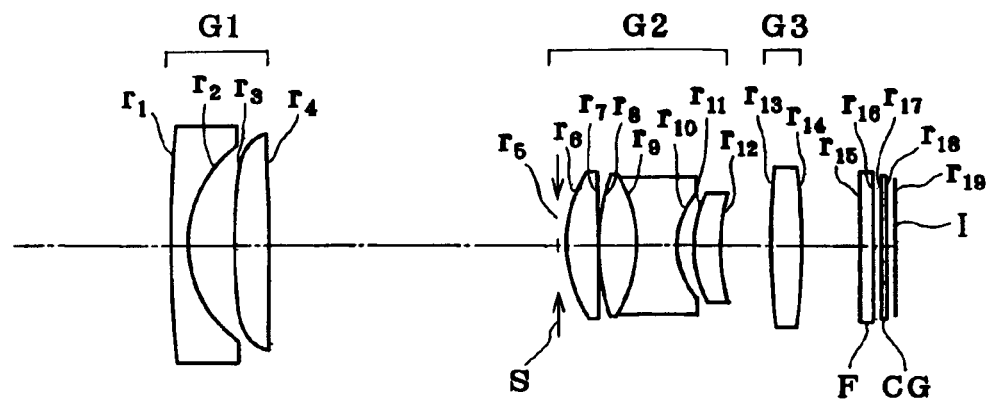
FIGS. 13(a), 13(b) and 13(c) are illustrative in section of Example 13 of the zoom lens, similar to FIGS. 1(a) to 1(c).
Figure 13B:
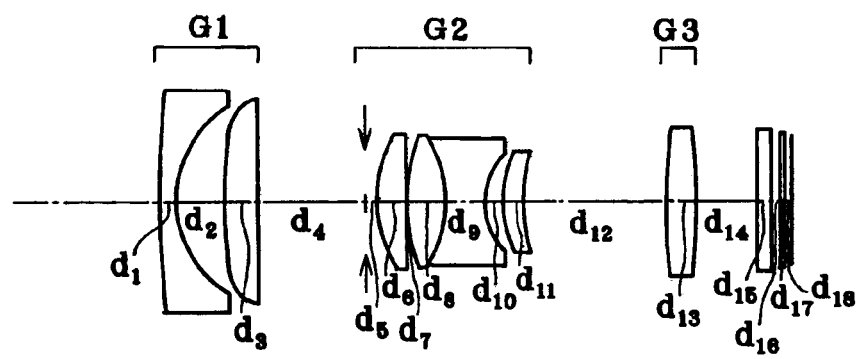
Figure 13C:
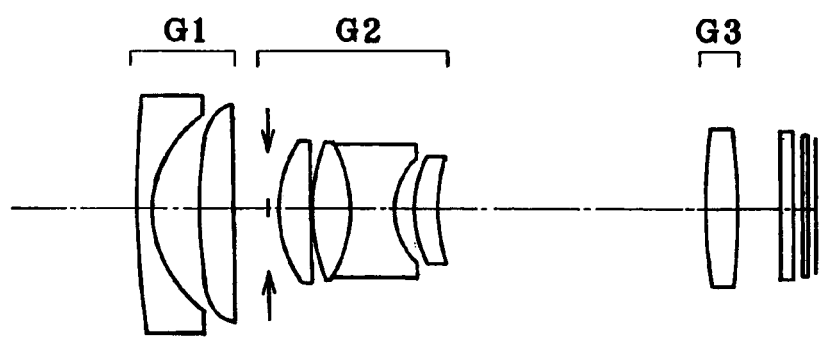

Example 13 is directed to a zoom lens that, as shown in FIG. 13, consists of a first lens group G1 that has negative refracting power and consists of a negative meniscus lens convex on its object side and a positive meniscus lens convex on its object side, a second lens group G2 that has positive refracting power and consists of an aperture stop S, a positive meniscus lens convex on its object side, a doublet made up of a double-convex positive lens and a double-concave negative lens and a positive meniscus lens convex on its object side and a third lens group G3 that has positive refracting power and consists of one double-convex positive lens. Upon zooming from the wide-angle end to the telephoto end, the first lens group G1 moves toward the object side in a concave locus, arriving at a position closer to the image plane side at the telephoto end than at the wide-angle end. The second lens group G2 moves monotonously toward the object side, while the third lens group G3 moves toward the image plane side in a concave locus, arriving at a position closer to the image plane side at the telephoto end than at the wide-angle end.

Four aspheric surfaces are used; two at both surfaces of the positive meniscus lens in the first lens group G1 and two at both surfaces of the positive meniscus lens located nearest to the object side of the second lens group G2.

No plastic lens is used.

Figure 14A:
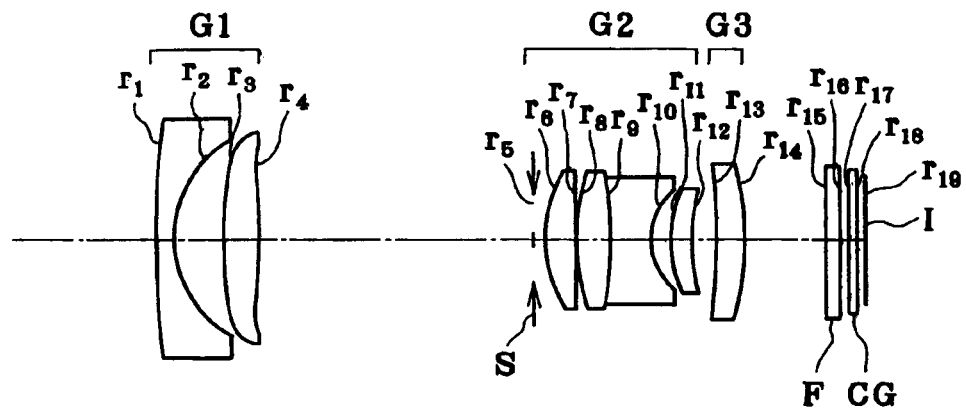
FIGS. 14(a), 14(b) and 14(c) are illustrative in section of Example 14 of the zoom lens, similar to FIGS. 1(a) to 1(c).
Figure 14B:
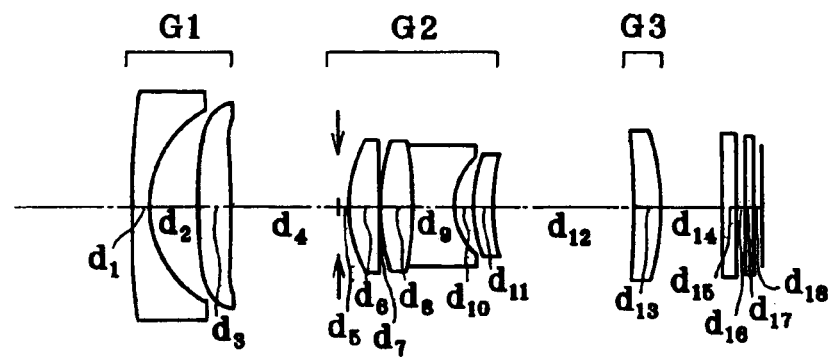
Figure 14C:
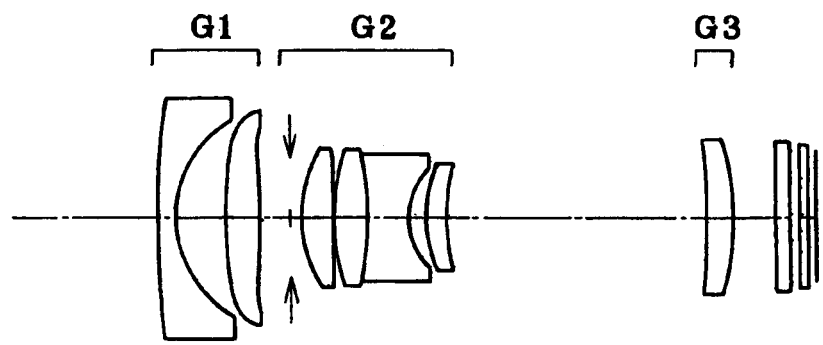
Figure 15A:
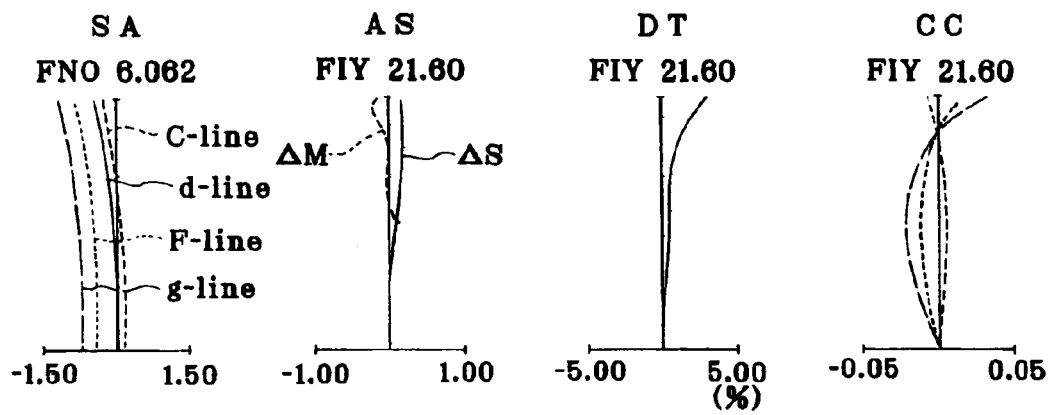
FIGS. 15(a), 15(b) and 15(c) are aberration diagrams for Example 1 upon focused on an object point at infinity.
Figure 15B:
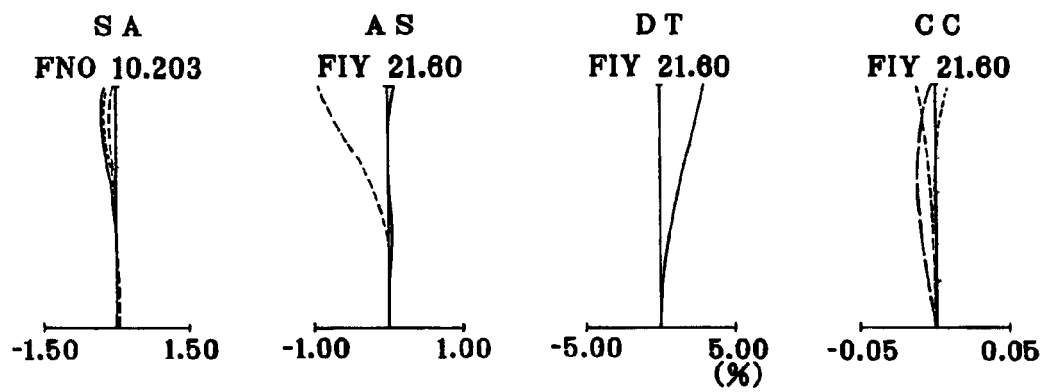
Figure 15C:
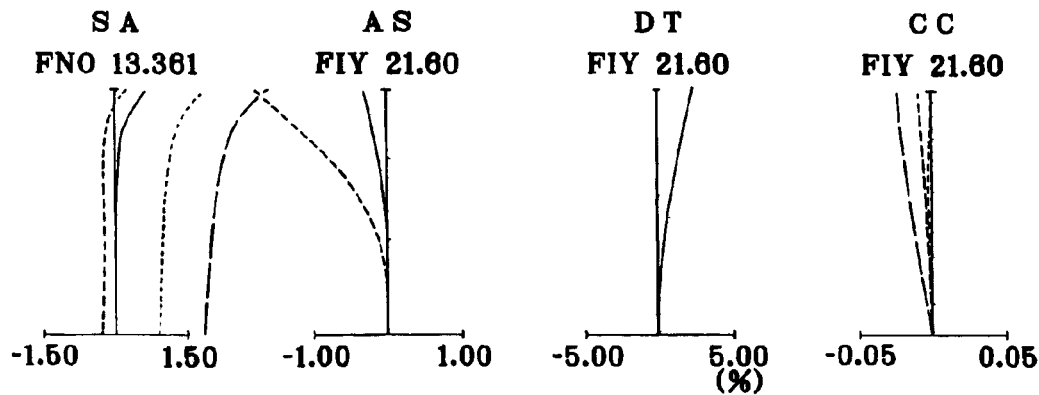
Figure 16A:
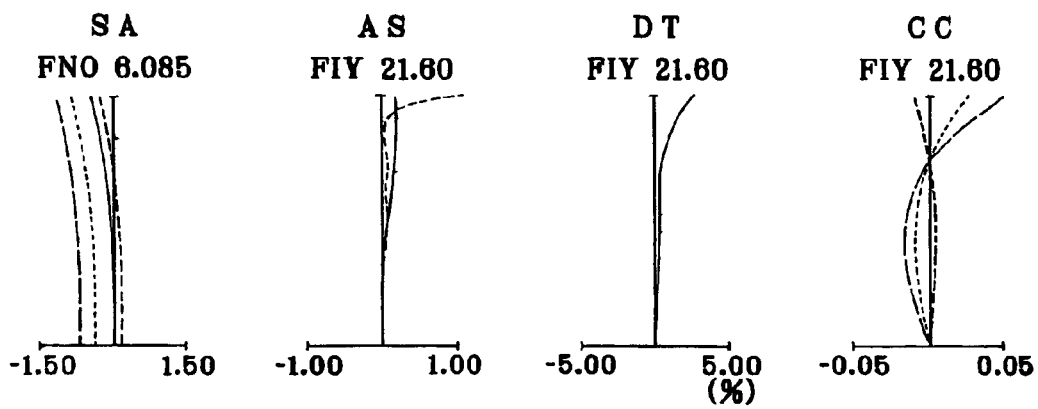
FIGS. 16(a), 16(b) and 16(c) are aberration diagrams for Example 2 upon focused on an object point at infinity.
Figure 16B:
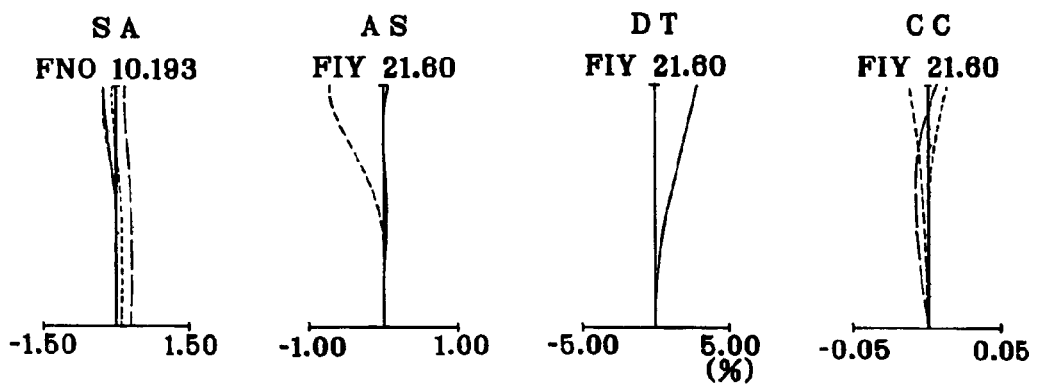
Figure 16C:
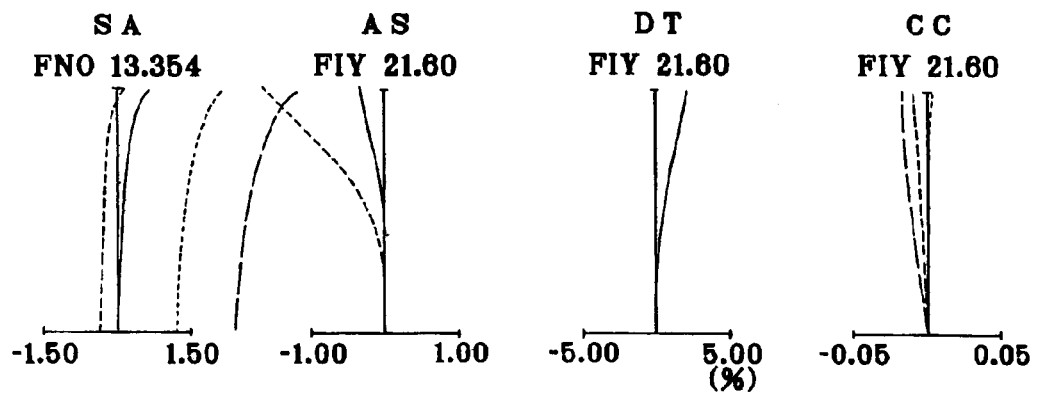
Figure 17A:
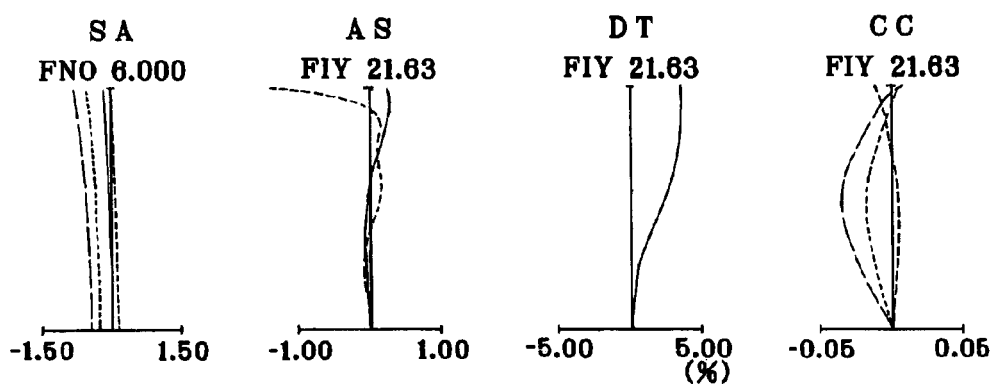
FIGS. 17(a), 17(b) and 17(c) are aberration diagrams for Example 3 upon focused on an object point at infinity.
Figure 17B:
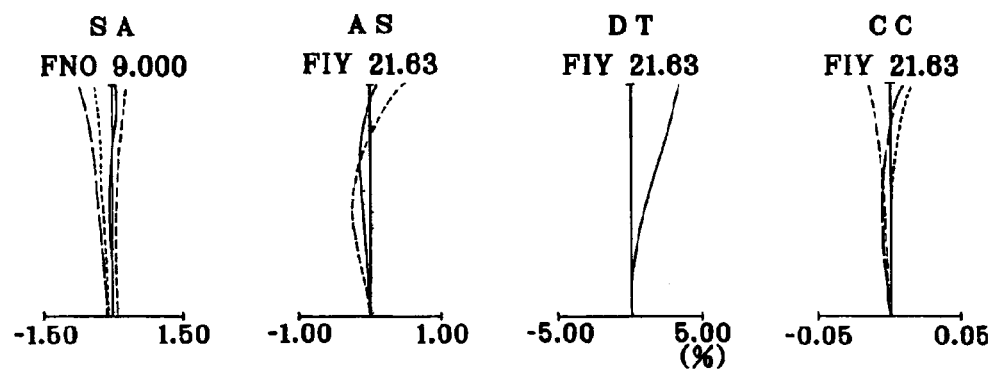
Figure 17C:
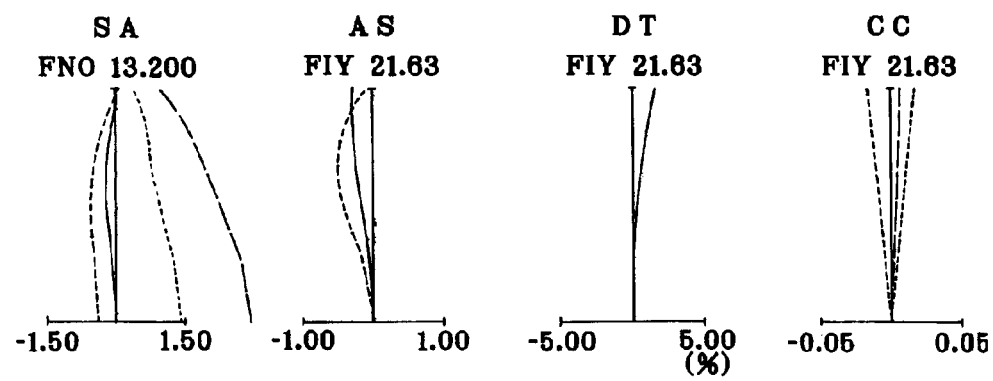
Figure 18A:
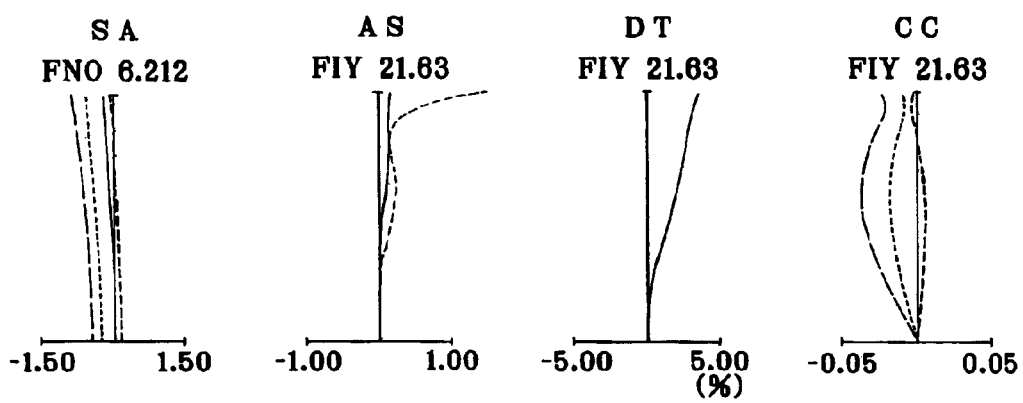
FIGS. 18(a), 18(b) and 18(c) are aberration diagrams for Example 4 upon focused on an object point at infinity.
Figure 18B:
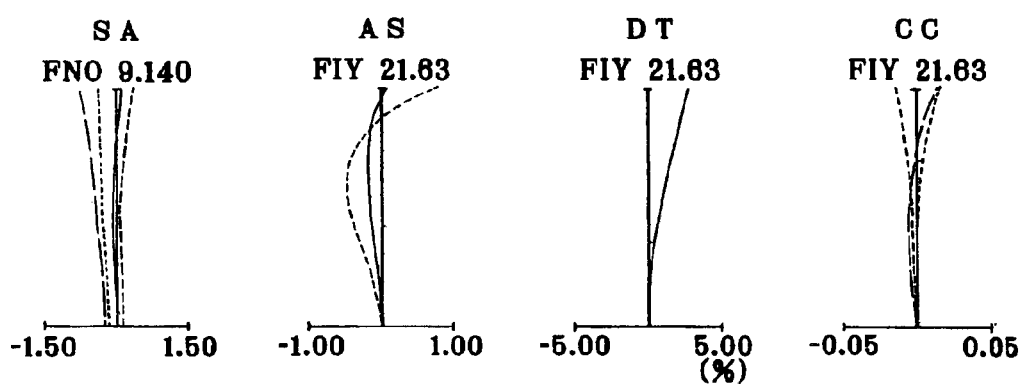
Figure 18C:
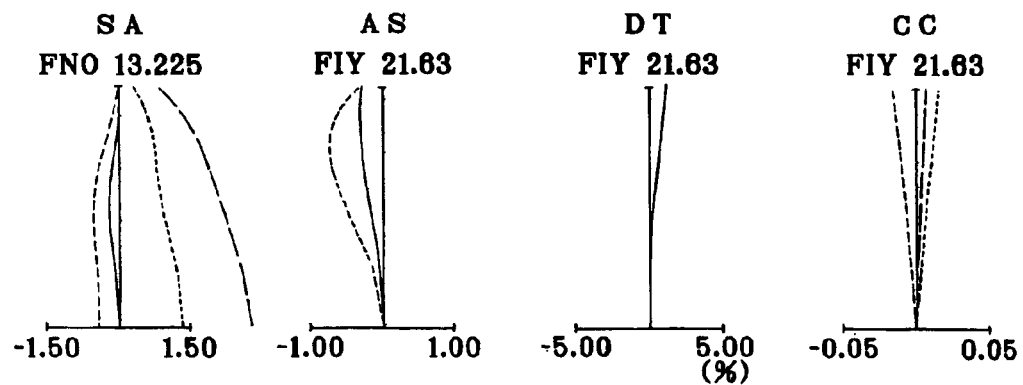
Figure 19A:
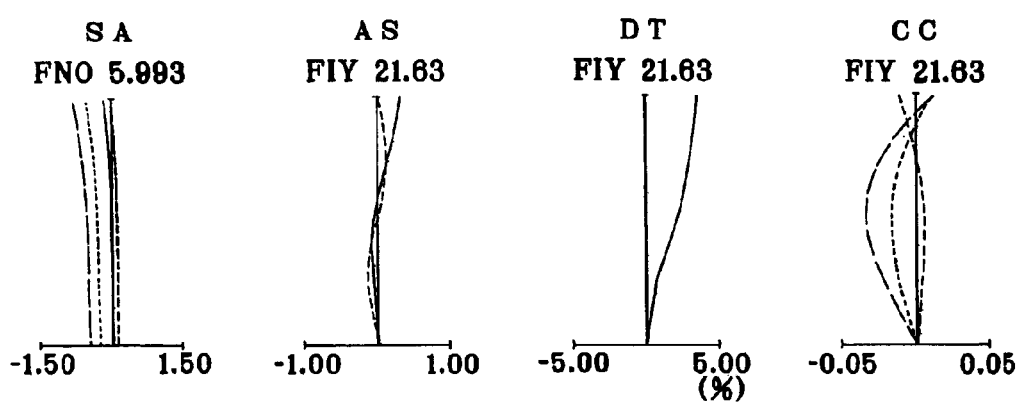
FIGS. 19(a), 19(b) and 19(c) are aberration diagrams for Example 5 upon focused on an object point at infinity.
Figure 19B:
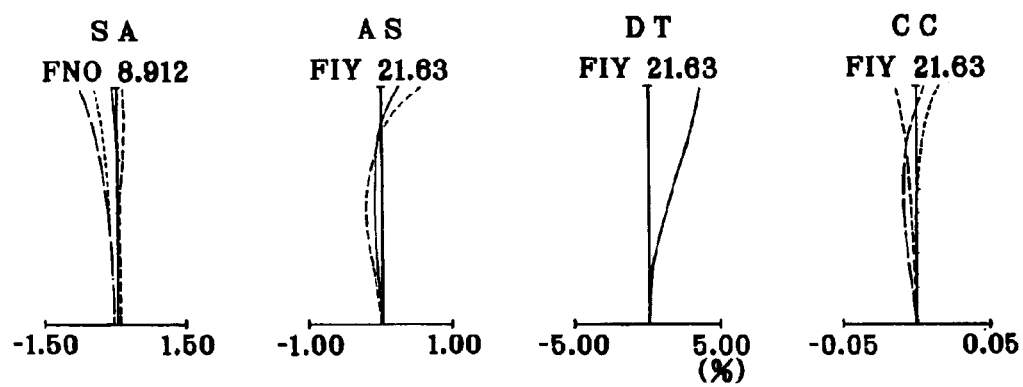
Figure 19C:
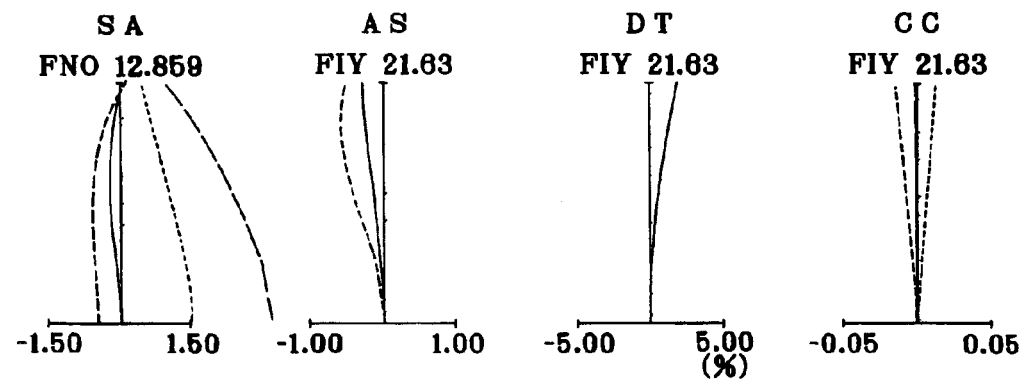
Figure 20A:
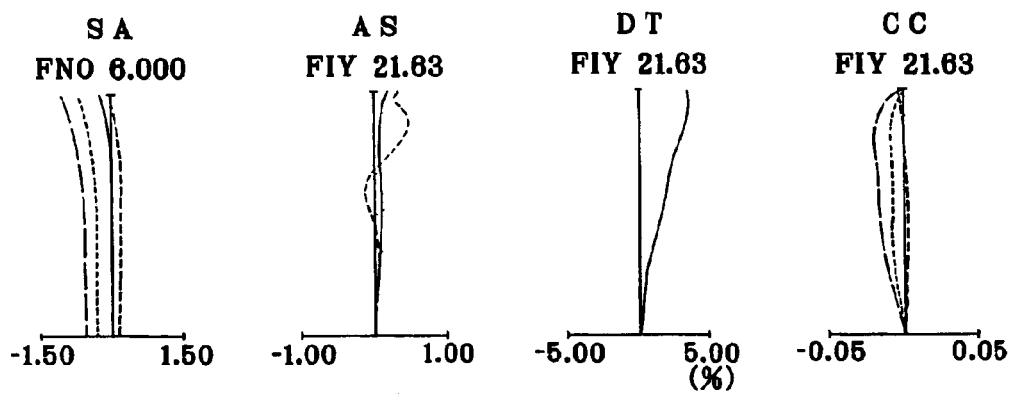
FIGS. 20(a), 20(b) and 20(c) are aberration diagrams for Example 6 upon focused on an object point at infinity.
Figure 20B:
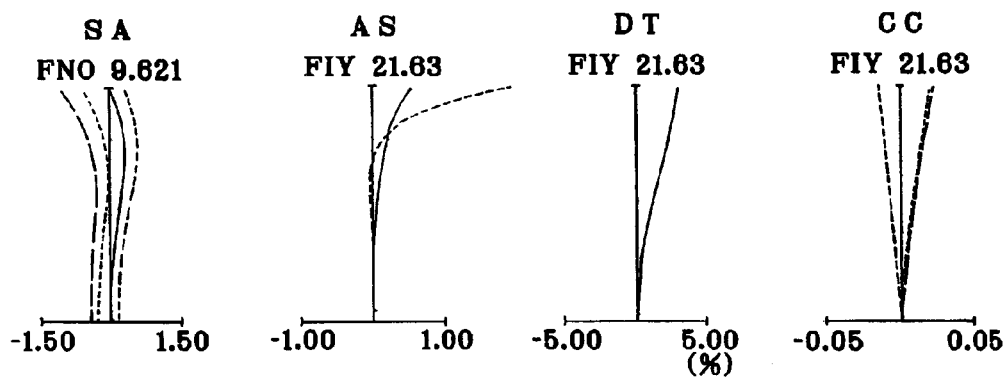
Figure 20C:
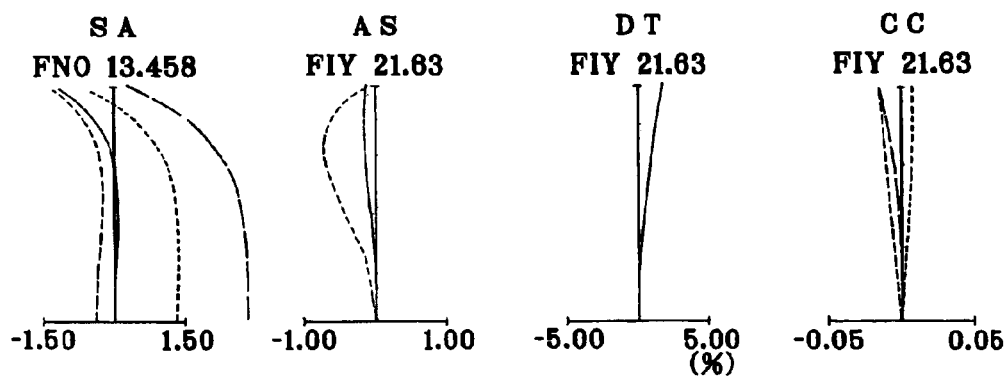
Figure 21A:
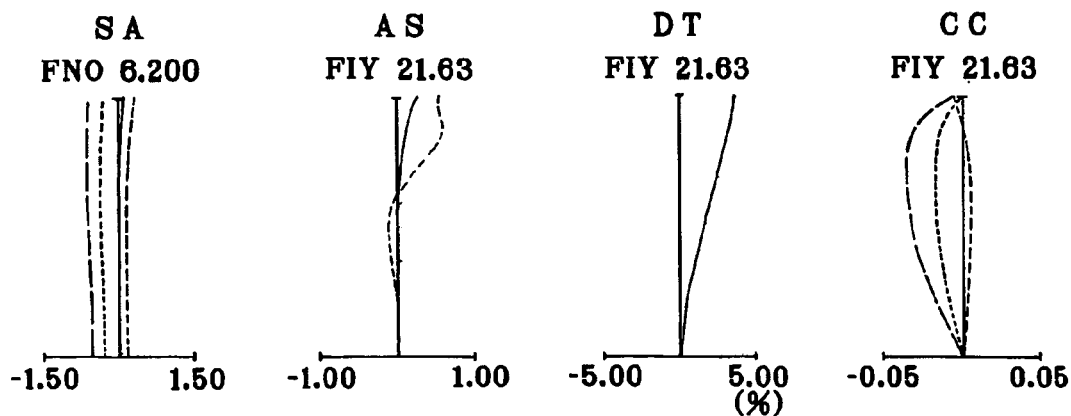
FIGS. 21(a), 21(b) and 21(c) are aberration diagrams for Example 7 upon focused on an object point at infinity.
Figure 21B:
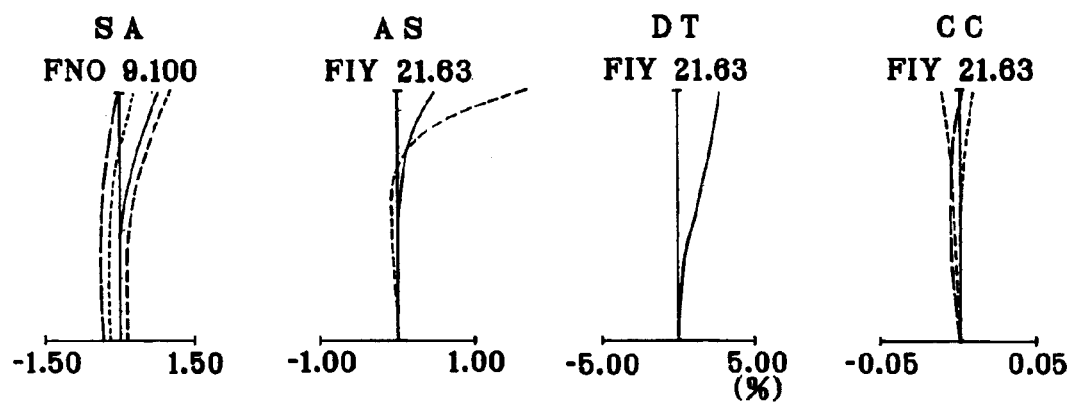
Figure 21C:
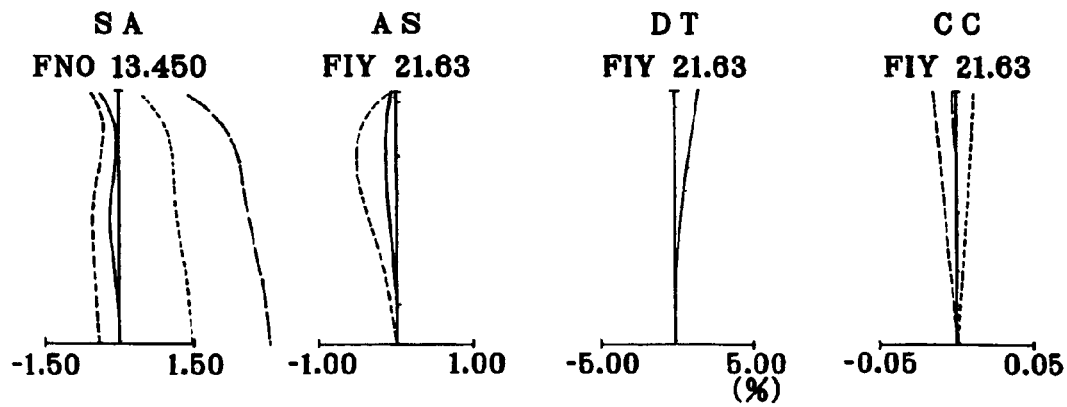
Figure 22A:
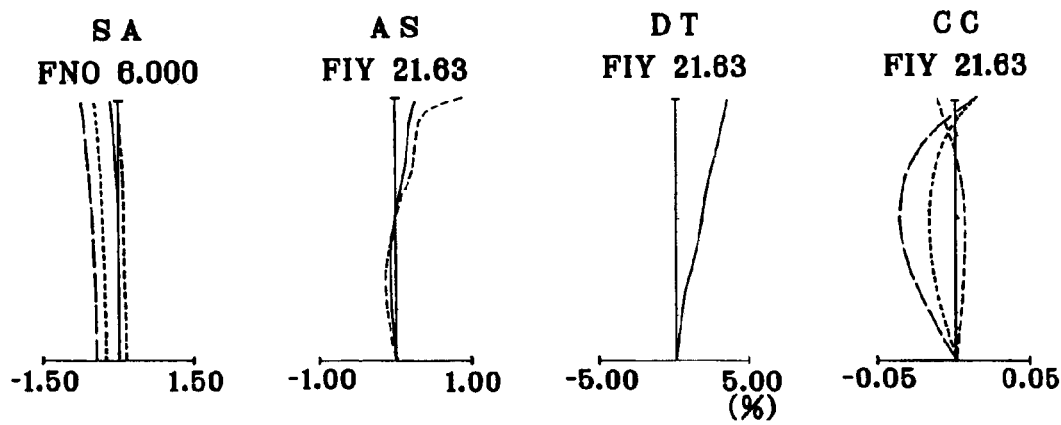
FIGS. 22(a), 22(b) and 22(c) are aberration diagrams for Example 8 upon focused on an object point at infinity.
Figure 22B:
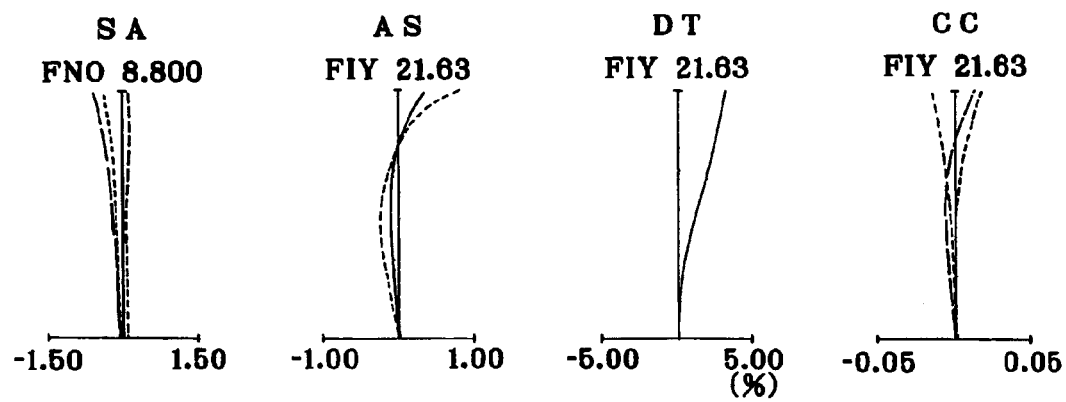
Figure 22C:
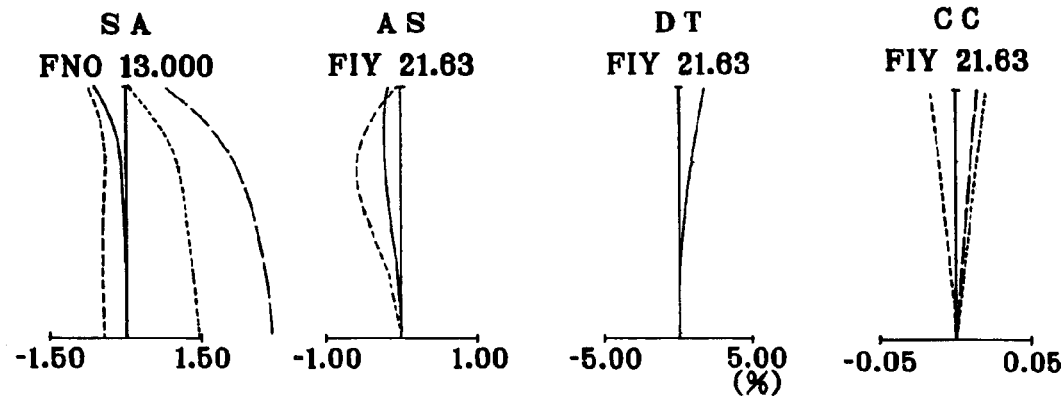
Figure 23A:
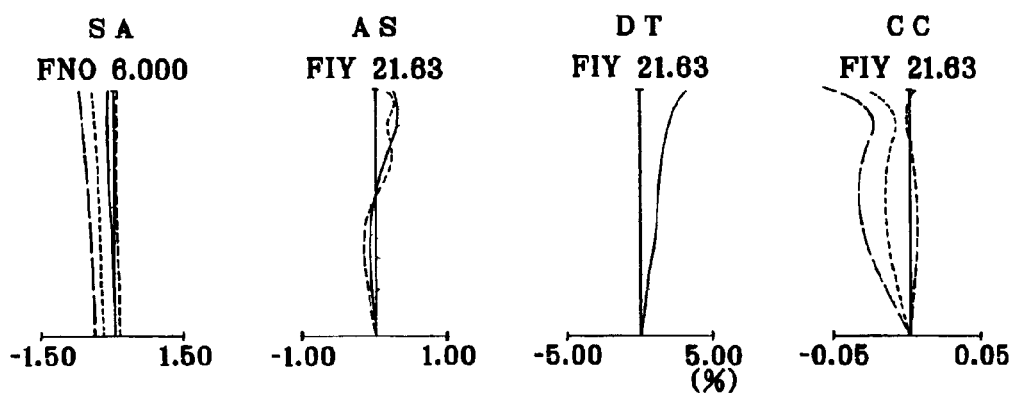
FIGS. 23(a), 23(b) and 23(c) are aberration diagrams for Example 9 upon focused on an object point at infinity.
Figure 23B:
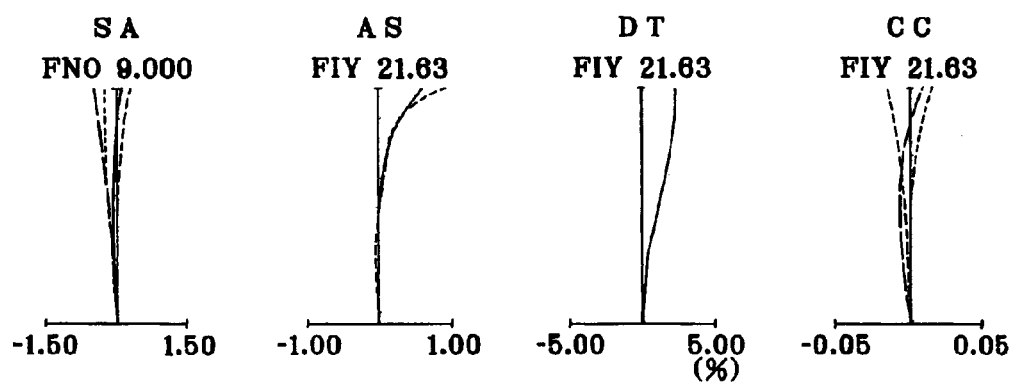
Figure 23C:
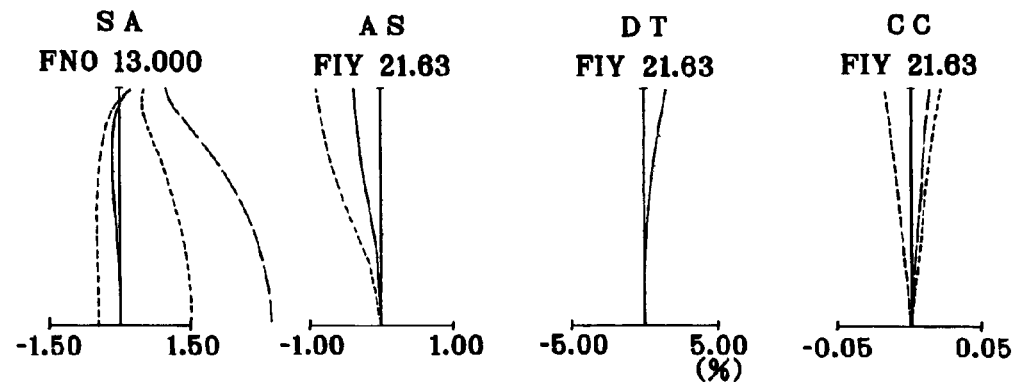
Figure 24A:
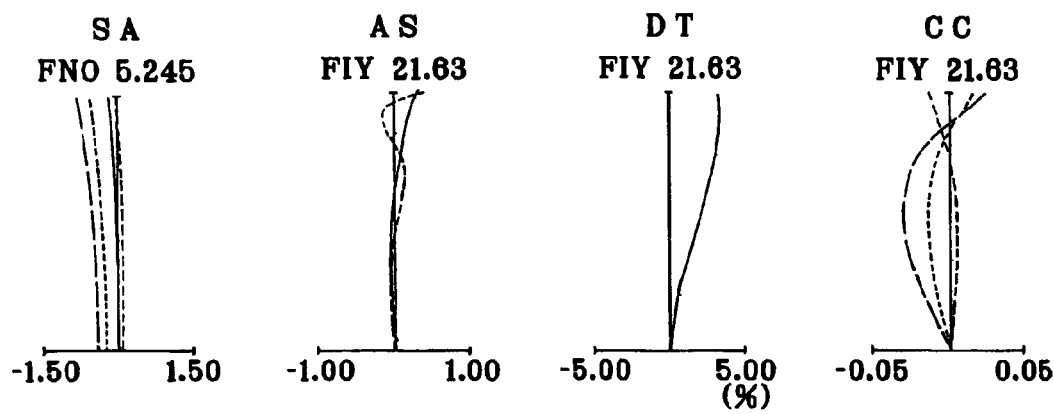
FIGS. 24(a), 24(b) and 24(c) are aberration diagrams for Example 10 upon focused on an object point at infinity.
Figure 24B:
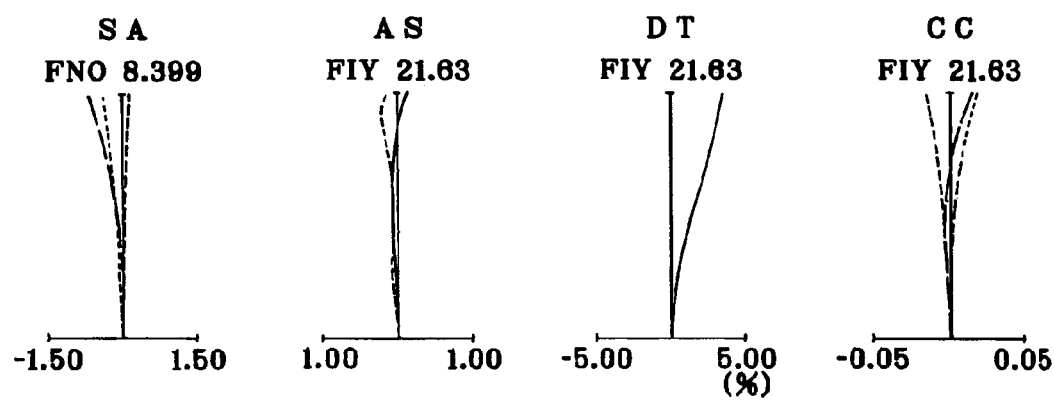
Figure 24C:
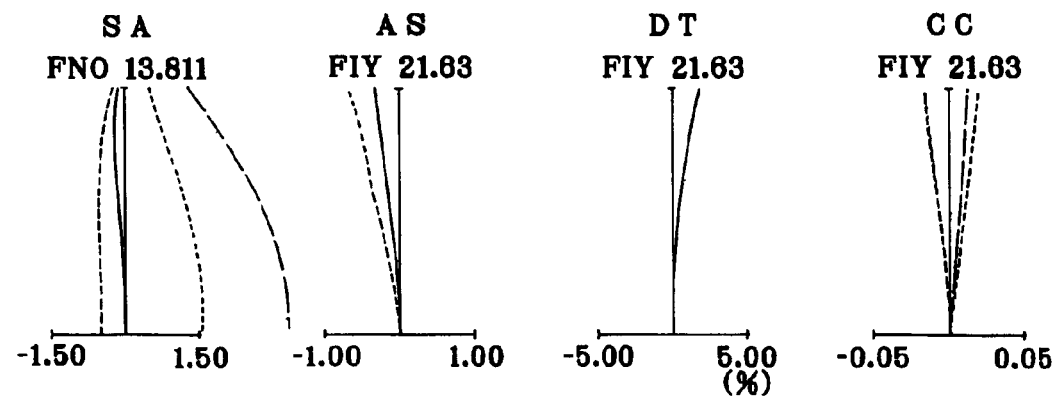
Figure 25A:
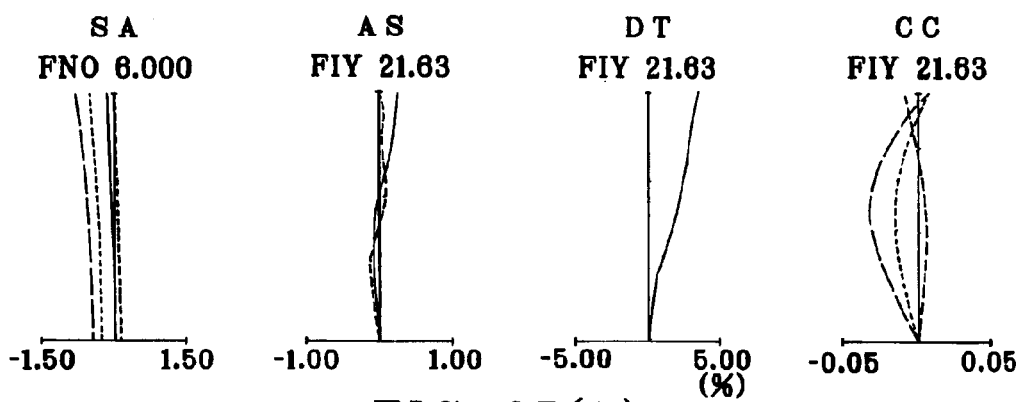
FIGS. 25(a), 25(b) and 25(c) are aberration diagrams for Example 11 upon focused on an object point at infinity.
Figure 25B:
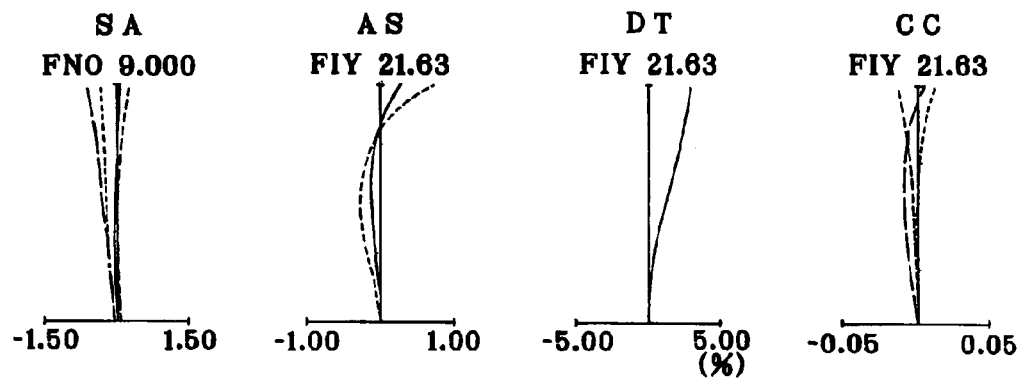
Figure 25C:
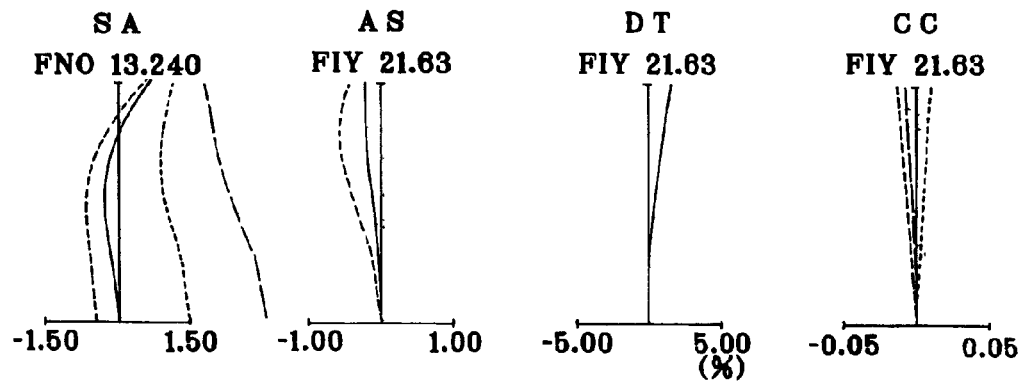
Figure 26A:
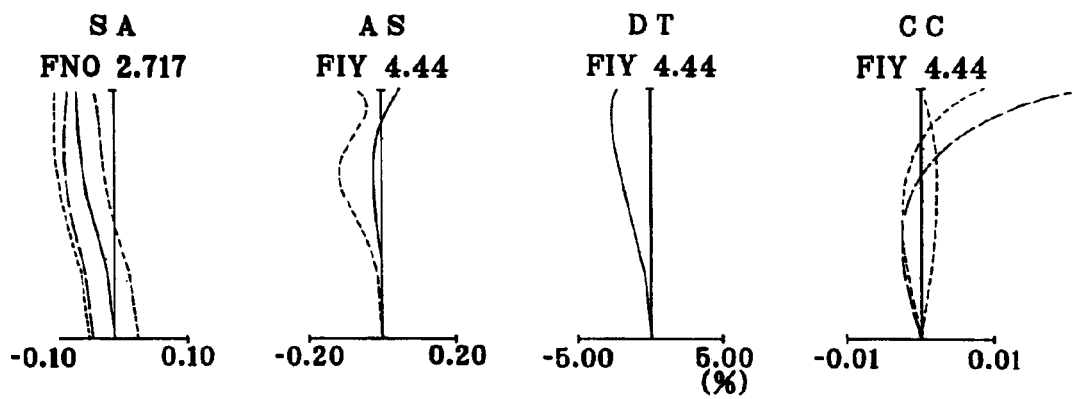
FIGS. 26(a), 26(b) and 26(c) are aberration diagrams for Example 12 upon focused on an object point at infinity.
Figure 26B:
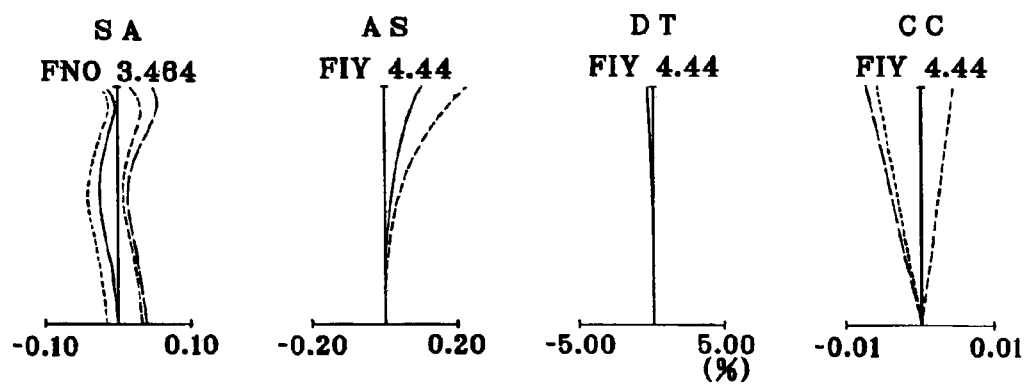
Figure 26C:
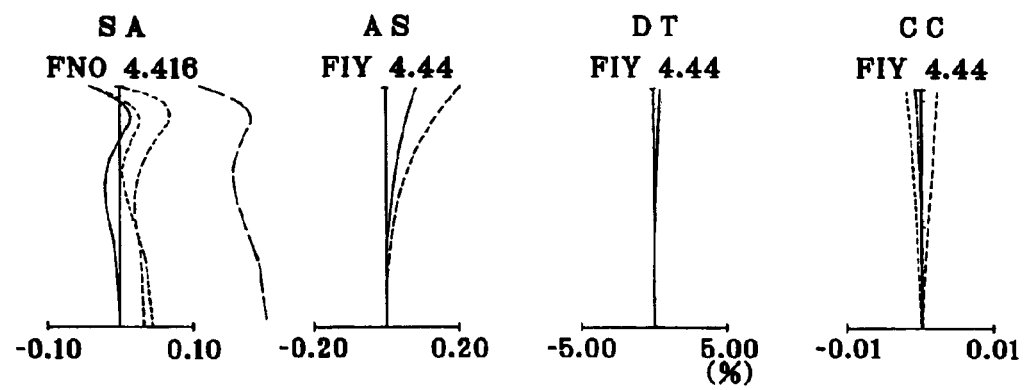
Figure 27A:
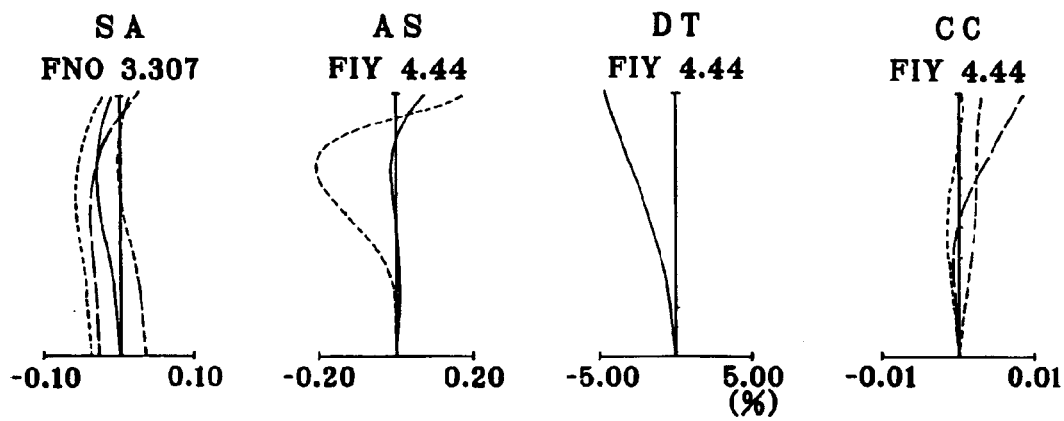
FIGS. 27(a), 27(b) and 27(c) are aberration diagrams for Example 13 upon focused on an object point at infinity.
Figure 27B:
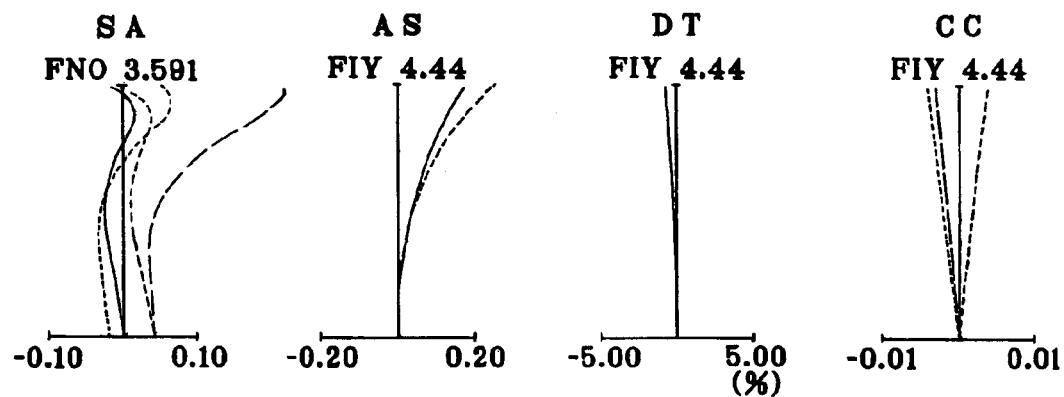
Figure 27C:
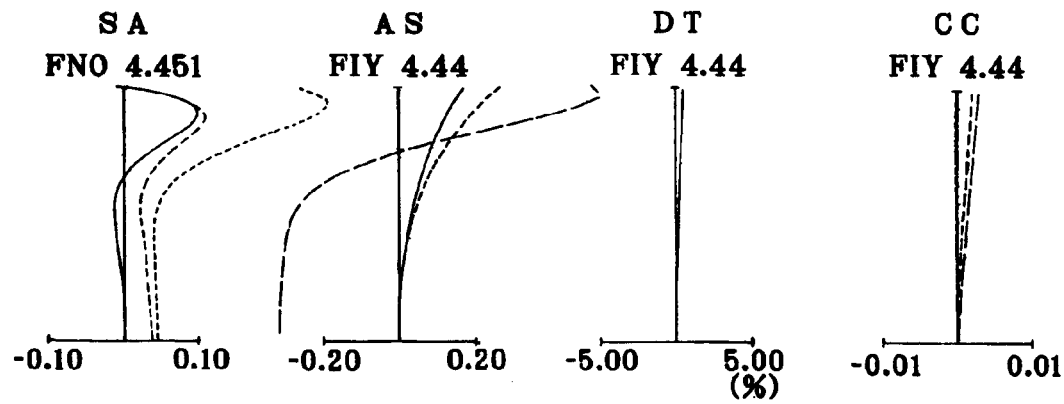
Figure 28A:
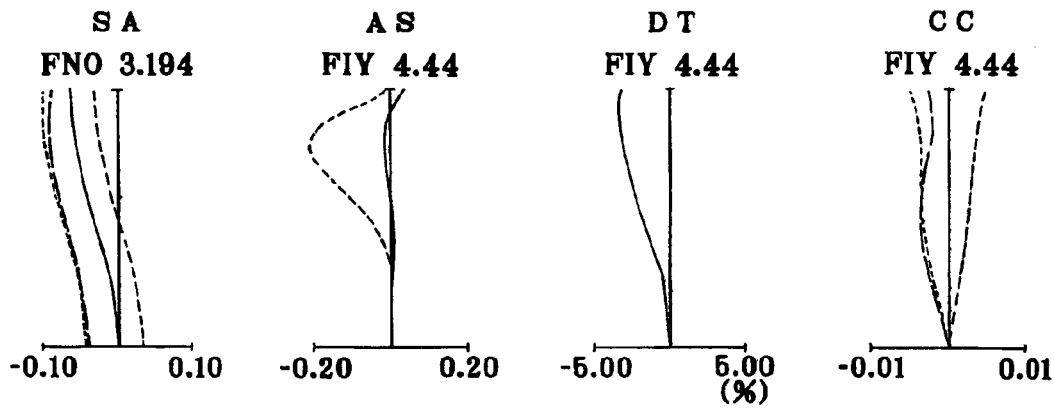
FIGS. 28(a), 28(b) and 28(c) are aberration diagrams for Example 14 upon focused on an object point at infinity.
Figure 28B:
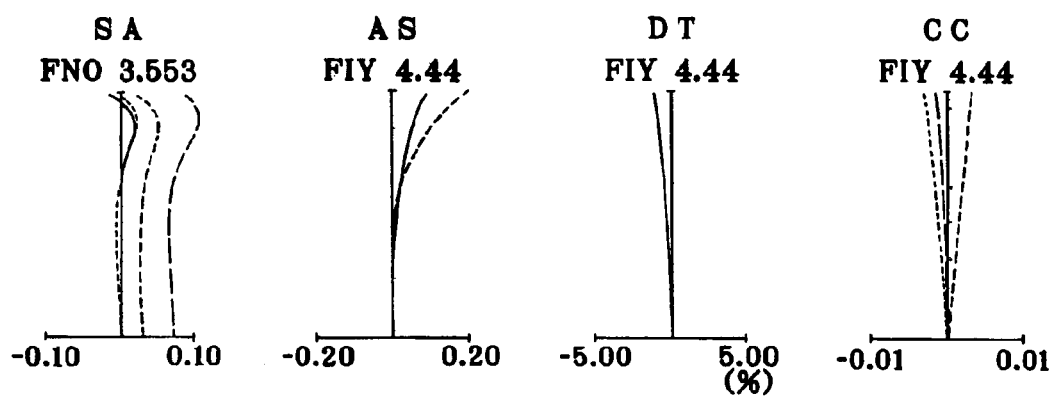
Figure 28C:
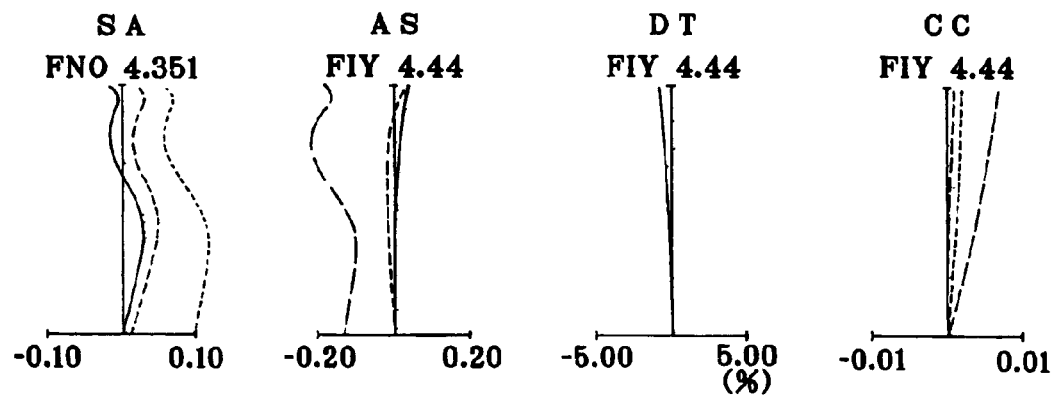

Example 14 is directed to a zoom lens that, as shown in FIG. 14, a first lens group G1 that has negative refracting power and consists of a negative meniscus lens convex on its object side and a positive meniscus lens convex on its object side, a second lens group G2 that has positive refracting power and consists of an aperture stop S, a positive meniscus lens convex on its object side, a doublet made up of a double-convex positive lens and a double-concave negative lens and a positive meniscus lens convex on its object side and a third lens group G3 that has positive refracting power and consists of one positive meniscus lens convex on its image plane side. Upon zooming from the wide-angle end to the telephoto end of the zoom lens, the first lens group G1 moves toward the object side in a concave locus, arriving at a position closer to the image plane side at the telephoto end than at the wide-angle end. The second lens group G2 moves monotonously toward the object side while the third lens group G3 moves toward the image plane side.

Four aspheric surfaces are used; two at both surfaces of the positive meniscus lens in the first lens group G1 and two at both surfaces of the positive meniscus lens located nearest to the object side of the second lens group G2.

The lens on the image plane side of the first lens group G1 is a plastic lens.

The numerical data on each example are given below. Symbols used hereinafter but not hereinbefore have the following meanings:

f: focal length of the lens system,
$F_{NO}$: F-number,
$\omega$: half angle of view,
WE: wide-angle end,
ST: intermediate state,
TE: telephoto end,
$r_1, r_2, \ldots$ : radius of curvature of each lens surface,
$d_1, d_2, \ldots$ : spacing between adjacent lens surfaces,
$n_{d1}, n_{d2}, \ldots$ : d-line refractive index of each lens,
$n_{g1}, n_{g2}, \ldots$ : g-line refractive index of each lens, and
$\nu_{d1}, \nu_{d2}, \ldots$ : Abbe number of each lens.

Here let x be an optical axis on condition that the direction of propagation of light is positive and y be a direction perpendicular to the optical axis. Then, aspheric configuration is given by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4$, $A_6$, $A_8$ and $A_{10}$ are the fourth, sixth, eighth and tenth aspheric coefficients, respectively.

EXAMPLE 1

| | | | | |
|---|---|---|---|---|
| $r_1 = 16.880$ | $d_1 = 1.10$ | $n_{d1} = 1.84666$ | $n_{g1} = 1.89418$ | $\nu_{d1} = 23.78$ |
| $r_2 = 13.182$ | $d_2 = 0.20$ | | | |
| $r_3 = 13.435$ | $d_3 = 3.51$ | $n_{d2} = 1.49700$ | $n_{g2} = 1.50451$ | $\nu_{d2} = 81.54$ |
| $r_4 = 126.489$ | $d_4 = $ (Variable) | | | |
| $r_5 = -17.625$ | $d_5 = 0.90$ | $n_{d3} = 1.78590$ | $n_{g3} = 1.80837$ | $\nu_{d3} = 44.20$ |
| $r_6 = 11.758$ | $d_6 = 2.84$ | $n_{d4} = 1.62004$ | $n_{g4} = 1.64217$ | $\nu_{d4} = 36.26$ |
| $r_7 = -15.495$ | $d_7 = 0.90$ | | | |
| $r_8 = \infty$ (Stop) | $d_8 = 3.55$ | | | |
| $r_9 = \infty$ (Flare Stop) | $d_9 = 3.45$ | | | |
| $r_{10} = -81.821$ (Aspheric) | $d_{10} = 1.71$ | $n_{d5} = 1.52542$ | $n_{g5} = 1.53705$ | $\nu_{d5} = 55.78$ |
| $r_{11} = -48.483$ (Aspheric) | $d_{11} = 2.37$ | | | |
| $r_{12} = 27.481$ | $d_{12} = 3.85$ | $n_{d6} = 1.48749$ | $n_{g6} = 1.49596$ | $\nu_{d6} = 70.23$ |
| $r_{13} = -21.524$ | $d_{13} = $ (Variable) | | | |
| $r_{14} = -11.581$ (Aspheric) | $d_{14} = 2.19$ | $n_{d7} = 1.52542$ | $n_{g7} = 1.53705$ | $\nu_{d7} = 55.78$ |
| $r_{15} = -12.965$ (Aspheric) | $d_{15} = 0.65$ | | | |
| $r_{16} = -12.066$ | $d_{16} = 1.50$ | $n_{d8} = 1.75500$ | $n_{g8} = 1.77296$ | $\nu_{d8} = 52.32$ |
| $r_{17} = 309.603$ | $d_{17} = $ (Variable) | | | |
| $r_{18} = \infty$ | | | | |

(Image Plane)
Aspherical Coefficients
10th surface
K=0.000
$A_4=2.67741\times10^{-4}$
$A_6=8.94559\times10^{-7}$
$A_8=-1.35793\times10^{-8}$
$A_{10}=-6.37372\times10^{-10}$
11th surface
K=0.000
$A_4=2.58526\times10^{-4}$
$A_6=-1.09349\times10^{-6}$
$A_8=7.95652\times10^{-8}$
$A_{10}=-1.49718\times10^{-9}$
14th surface
K=0.000
$A_4=4.06502\times10^{-4}$
$A_6=-7.36202\times10^{-6}$
$A_8=6.46768\times10^{-8}$
$A_{10}=-9.84586\times10^{-11}$
15th surface
K=0.000
$A_4=2.48480\times10^{-4}$
$A_6=-5.57358\times10^{-6}$
$A_8=2.92518\times10^{-8}$
$A_{10}=2.76088\times10^{-11}$ Zooming Data (∞)

|  | WE | ST | TE |
|---|---|---|---|
| f (mm) | 39.341 | 102.006 | 144.956 |
| $F_{NO}$ | 6.06 | 10.20 | 13.36 |
| ω (°) | 28.101 | 11.633 | 8.297 |
| $d_4$ | 3.00 | 13.62 | 15.87 |
| $d_{13}$ | 11.33 | 4.11 | 2.22 |
| $d_{17}$ | 7.81 | 32.24 | 48.50 |

(Image Plane)
Aspherical Coefficients
10th surface
K=0.000
$A_4=2.74110\times10^{-4}$
$A_6=1.39568\times10^{-6}$
$A_8=4.03763\times10^{-8}$
$A_{10}=-2.2392\times10^{-9}$
11th surface
K=0.000
$A_4=2.62578\times10^{-4}$
$A_6=-1.36142\times10^{-8}$
$A_8=8.34257\times10^{-8}$
$A_{10}=-1.93909\times10^{-9}$
14th surface
K=0.000
$A_4=3.50621\times10^{-4}$
$A_6=-5.63426\times10^{-6}$
$A_8=5.37895\times10^{-8}$
$A_{10}=-1.05540\times10^{-10}$
15th surface
K=0.000
$A_4=2.02303\times10^{-4}$
$A_6=-4.55680\times10^{-6}$
$A_8=2.86169\times10^{-8}$
$A_{10}=-1.31936\times10^{-11}$ Zooming Data (∞)

|  | WE | ST | TE |
|---|---|---|---|
| f (mm) | 39.316 | 101.889 | 144.834 |
| $F_{NO}$ | 6.08 | 10.19 | 13.35 |
| ω (°) | 28.183 | 11.655 | 8.31 |
| $d_4$ | 2.84 | 13.62 | 15.87 |
| $d_{13}$ | 11.33 | 4.11 | 2.22 |
| $d_{17}$ | 7.92 | 32.24 | 48.52 |

EXAMPLE 2

| | | | | |
|---|---|---|---|---|
| $r_1$ = 16.918 | $d_1$ = 1.10 | $n_{d1}$ = 1.84666 | $n_{g1}$ = 1.89418 | $\nu_{d1}$ = 23.78 |
| $r_2$ = 13.132 | $d_2$ = 0.20 | | | |
| $r_3$ = 13.355 | $d_3$ = 3.51 | $n_{d2}$ = 1.49700 | $n_{g2}$ = 1.50451 | $\nu_{d2}$ = 81.54 |
| $r_4$ = 132.316 | $d_4$ = (Variable) | | | |
| $r_5$ = −17.623 | $d_5$ = 0.90 | $n_{d3}$ = 1.78590 | $n_{g3}$ = 1.80837 | $\nu_{d3}$ = 44.20 |
| $r_6$ = 11.833 | $d_6$ = 2.84 | | | |
| $r_7$ = −15.558 | $d_7$ = 0.90 | $n_{d4}$ = 1.62004 | $n_{g4}$ = 1.64217 | $\nu_{d4}$ = 36.26 |
| $r_8$ = ∞ (Stop) | $d_8$ = 3.56 | | | |
| $r_9$ = ∞ (Flare Stop) | $d_9$ = 3.45 | | | |
| $r_{10}$ = −81.815 (Aspheric) | $d_{10}$ = 1.71 | $n_{d5}$ = 1.52542 | $n_{g5}$ = 1.53705 | $\nu_{d5}$ = 55.78 |
| $r_{11}$ = −48.532 (Aspheric) | $d_{11}$ = 2.37 | | | |
| $r_{12}$ = 27.445 | $d_{12}$ = 3.85 | $n_{d6}$ = 1.48749 | $n_{g6}$ = 1.49596 | $\nu_{d6}$ = 70.23 |
| $r_{13}$ = −21.433 | $d_{13}$ = (Variable) | | | |
| $r_{14}$ = −11.632 (Aspheric) | $d_{14}$ = 2.19 | $n_{d7}$ = 1.52542 | $n_{g7}$ = 1.53705 | $\nu_{d7}$ = 55.78 |
| $r_{15}$ = −12.926 (Aspheric) | $d_{15}$ = 0.65 | | | |
| $r_{16}$ = −12.196 | $d_{16}$ = 1.50 | $n_{d8}$ = 1.77250 | $n_{g8}$ = 1.79197 | $\nu_{d8}$ = 49.60 |
| $r_{17}$ = 381.564 | $d_{17}$ = (Variable) | | | |
| $r_{18}$ = ∞ | | | | |

EXAMPLE 3

| | | | | |
|---|---|---|---|---|
| $r_1 = -23.270$ | $d_1 = 1.20$ | $n_{d1} = 1.84666$ | $n_{g1} = 1.89418$ | $\nu_{d1} = 23.78$ |
| $r_2 = -30.392$ | $d_2 = 0.20$ | | | |
| $r_3 = 22.651$ | $d_3 = 3.32$ | $n_{d2} = 1.49700$ | $n_{g2} = 1.50451$ | $\nu_{d2} = 81.54$ |
| $r_4 = -111.105$ | $d_4 =$ (Variable) | | | |
| $r_5 = \infty$ (Stop) | $d_5 = 1.61$ | | | |
| $r_6 = -28.916$ | $d_6 = 1.10$ | $n_{d3} = 1.84666$ | $n_{g3} = 1.89418$ | $\nu_{d3} = 23.78$ |
| $r_7 = -1917.404$ | $d_7 = 0.54$ | | | |
| $r_8 = 27.241$ | $d_8 = 3.34$ | $n_{d4} = 1.62588$ | $n_{g4} = 1.64861$ | $\nu_{d4} = 35.70$ |
| $r_9 = -6.497$ | $d_9 = 1.10$ | $n_{d5} = 1.78800$ | $n_{g5} = 1.80888$ | $\nu_{d5} = 47.37$ |
| $r_{10} = 41.867$ | $d_{10} = 0.40$ | | | |
| $r_{11} = 28.000$ (Aspheric) | $d_{11} = 3.47$ | $n_{d6} = 1.58313$ | $n_{g6} = 1.59530$ | $\nu_{d6} = 59.38$ |
| $r_{12} = -10.397$ (Aspheric) | $d_{12} =$ (Variable) | | | |
| $r_{13} = -62.176$ (Aspheric) | $d_{13} = 3.10$ | $n_{d7} = 1.52542$ | $n_{g7} = 1.53705$ | $\nu_{d7} = 55.78$ |
| $r_{14} = -104.442$ (Aspheric) | $d_{14} = 2.54$ | | | |
| $r_{15} = -11.000$ | $d_{15} = 1.50$ | $n_{d8} = 1.77250$ | $n_{g8} = 1.79197$ | $\nu_{d8} = 49.60$ |
| $r_{16} = -644.993$ | $d_{16} =$ (Variable) | | | |
| $r_{17} = \infty$ | | | | |

(Image Plane)
Aspherical Coefficients
11th surface
K=0.000
$A_4=-3.55187\times10^{-5}$
$A_6=1.71517\times10^{-6}$
$A_8=-3.69501\times10^{-8}$
$A_{10}=4.85472\times10^{-9}$
12th surface
K=0.000
$A_4=6.82308\times10^{-5}$
$A_6=2.47951\times10^{-6}$
$A_8=-1.46156\times10^{-7}$
$A_{10}=6.02160\times10^{-9}$
13th surface
K=0.000
$A_4=-3.09657\times10^{-5}$
$A_6=-1.40319\times10^{-6}$
$A_8=-9.80829\times10^{-9}$
$A_{10}=1.77581\times10^{-10}$
14th surface
K=0.000
$A_4=-1.66743\times10^{-4}$
$A_6=-1.34209\times10^{-6}$
$A_8=-5.80797\times10^{-9}$
$A_{10}=-1.58937\times10^{-12}$ Zooming Data ($\infty$)

| | WE | ST | TE |
|---|---|---|---|
| f (mm) | 38.818 | 75.500 | 144.801 |
| $F_{NO}$ | 6.00 | 9.00 | 13.20 |
| $\omega$ (°) | 28.3 | 15.49 | 8.37 |
| $d_4$ | 5.23 | 12.70 | 19.45 |
| $d_{12}$ | 10.24 | 5.28 | 1.50 |
| $d_{16}$ | 8.12 | 24.51 | 51.53 |

EXAMPLE 4

| | | | | |
|---|---|---|---|---|
| $r_1 = -22.735$ | $d_1 = 1.20$ | $n_{d1} = 1.84666$ | $n_{g1} = 1.89418$ | $\nu_{d1} = 23.78$ |
| $r_2 = -29.696$ | $d_2 = 0.20$ | | | |
| $r_3 = 20.526$ | $d_3 = 2.86$ | $n_{d2} = 1.49700$ | $n_{g2} = 1.50451$ | $\nu_{d2} = 81.54$ |
| $r_4 = -160.870$ | $d_4 =$ (Variable) | | | |
| $r_5 = \infty$ (Stop) | $d_5 = 1.20$ | | | |
| $r_6 = -39.947$ | $d_6 = 1.50$ | $n_{d3} = 1.84700$ | $n_{g3} = 1.89398$ | $\nu_{d3} = 24.00$ |
| $r_7 = 90.660$ | $d_7 = 0.85$ | | | |
| $r_8 = 21.490$ | $d_8 = 3.21$ | $n_{d4} = 1.62465$ | $n_{g4} = 1.64762$ | $\nu_{d4} = 35.27$ |
| $r_9 = -7.035$ | $d_9 = 1.30$ | $n_{d5} = 1.78800$ | $n_{g5} = 1.80886$ | $\nu_{d5} = 47.40$ |
| $r_{10} = 58.357$ | $d_{10} = 0.30$ | | | |
| $r_{11} = 31.580$ (Aspheric) | $d_{11} = 4.09$ | $n_{d6} = 1.58313$ | $n_{g6} = 1.59530$ | $\nu_{d6} = 59.38$ |
| $r_{12} = -12.658$ (Aspheric) | $d_{12} =$ (Variable) | | | |
| $r_{13} = -73.554$ (Aspheric) | $d_{13} = 3.30$ | $n_{d7} = 1.52542$ | $n_{g7} = 1.53705$ | $\nu_{d7} = 55.78$ |
| $r_{14} = -140.034$ (Aspheric) | $d_{14} = 2.65$ | | | |
| $r_{15} = -11.000$ | $d_{15} = 1.50$ | $n_{d8} = 1.77250$ | $n_{g8} = 1.79197$ | $\nu_{d8} = 49.60$ |
| $r_{16} = -376.267$ | $d_{16} =$ (Variable) | | | |
| $r_{17} = \infty$ | | | | |

(Image Plane)
Aspherical Coefficients
11th surface
K=0.000
$A_4=9.61776\times10^{-5}$
$A_6=1.23651\times10^{-6}$
$A_8=2.19185\times10^{-7}$
$A_{10}=-2.80117\times10^{-9}$
12th surface K=0.000
$A_4=1.33994\times10^{-4}$
$A_6=2.56838\times10^{-6}$
$A_8=3.23412\times10^{-8}$
$A_{10}=2.45567\times10^{-9}$
13th surface
K=0.000
$A_4=-1.39757\times10^{-4}$
$A_6=-9.84806\times10^{-7}$
$A_8=2.88374\times10^{-8}$
$A_{10}=-1.20626\times10^{-10}$
14th surface
K=0.000
$A_4=-2.86007\times10^{-4}$
$A_6=-6.72151\times10^{-7}$
$A_8=7.73451\times10^{-9}$
$A_{10}=-6.20535\times10^{-11}$
Zooming Data (∞)

|  | WE | ST | TE |
|---|---|---|---|
| f (mm) | 39.300 | 75.499 | 144.897 |
| $F_{NO}$ | 6.21 | 9.14 | 13.22 |
| ω (°) | 28.01 | 15.594 | 8.4 |
| $d_4$ | 3.97 | 10.46 | 17.45 |
| $d_{12}$ | 10.29 | 5.26 | 1.20 |
| $d_{16}$ | 8.00 | 24.74 | 52.20 |

EXAMPLE 5

| $r_1 = -21.913$ | $d_1 = 1.20$ | $n_{d1} = 1.84666$ | $n_{g1} = 1.89418$ | $v_{d1} = 23.78$ |
|---|---|---|---|---|
| $r_2 = -29.024$ | $d_2 = 0.20$ | | | |
| $r_3 = 22.304$ | $d_3 = 3.49$ | $n_{d2} = 1.49700$ | $n_{g2} = 1.50451$ | $v_{d2} = 81.54$ |
| $r_4 = -82.843$ | $d_4 = $ (Variable) | | | |
| $r_5 = \infty$ (Stop) | $d_5 = 1.16$ | | | |
| $r_6 = -35.819$ | $d_6 = 1.10$ | $n_{d3} = 1.84666$ | $n_{g3} = 1.89418$ | $v_{d3} = 23.78$ |
| $r_7 = -205.156$ | $d_7 = 0.55$ | | | |
| $r_8 = 40.180$ | $d_8 = 3.48$ | $n_{d4} = 1.61293$ | $n_{g4} = 1.63434$ | $v_{d4} = 37.00$ |
| $r_9 = -5.998$ | $d_9 = 1.10$ | $n_{d5} = 1.78800$ | $n_{g5} = 1.80888$ | $v_{d5} = 47.37$ |
| $r_{10} = 33.460$ | $d_{10} = 0.44$ | | | |
| $r_{11} = 26.158$ (Aspheric) | $d_{11} = 3.80$ | $n_{d6} = 1.58313$ | $n_{g6} = 1.59530$ | $v_{d6} = 59.38$ |
| $r_{12} = -9.658$ (Aspheric) | $d_{12} = $ (Variable) | | | |
| $r_{13} = -53.278$ (Aspheric) | $d_{13} = 3.30$ | $n_{d7} = 1.52542$ | $n_{g7} = 1.53705$ | $v_{d7} = 55.78$ |
| $r_{14} = -82.182$ (Aspheric) | $d_{14} = 2.50$ | | | |
| $r_{15} = -11.000$ | $d_{15} = 1.50$ | $n_{d8} = 1.77250$ | $n_{g8} = 1.79197$ | $v_{d8} = 49.60$ |
| $r_{16} = 5177.747$ | $d_{16} = $ (Variable) | | | |
| $r_{17} = \infty$ | | | | |

(Image Plane)
Aspherical Coefficients
11th surface
K=0.000
$A_4=-9.45451\times10^{-5}$
$A_6=2.27760\times10^{-6}$
$A_8=-1.17696\times10^{-9}$
$A_{10}=1.93175\times10^{-9}$
12th surface
K=0.000
$A_4=2.00136\times10^{-5}$
$A_6=2.34827\times10^{-6}$
$A_8=-1.32890\times10^{-7}$
$A_{10}=4.70455\times10^{-9}$
13th surface
K=0.000
$A_4=1.68265\times10^{-5}$
$A_6=-4.31675\times10^{-6}$
$A_8=5.16556\times10^{-8}$
$A_{10}=-1.85108\times10^{-10}$
14th surface
K=0.000
$A_4=-1.06547\times10^{-4}$
$A_6=-4.35529\times10^{-6}$
$A_8=4.02358\times10^{-8}$
$A_{10}=-2.04606\times10^{-10}$
Zooming Data (∞)

|  | WE | ST | TE |
|---|---|---|---|
| f (mm) | 38.818 | 75.510 | 144.789 |
| $F_{NO}$ | 5.99 | 8.91 | 12.86 |
| ω (°) | 28.3 | 15.48 | 8.35 |
| $d_4$ | 5.13 | 12.92 | 18.30 |

-continued

|  | WE | ST | TE |
|---|---|---|---|
| $d_{12}$ | 10.28 | 5.20 | 1.63 |
| $d_{16}$ | 8.00 | 23.65 | 51.25 |

EXAMPLE 6

| $r_1 = -19.527$ | $d_1 = 1.20$ | $n_{d1} = 1.84666$ | $n_{g1} = 1.89418$ | $v_{d1} = 23.78$ |
|---|---|---|---|---|
| $r_2 = -25.488$ | $d_2 = 0.20$ | | | |
| $r_3 = 25.352$ | $d_3 = 3.07$ | $n_{d2} = 1.49700$ | $n_{g2} = 1.50451$ | $v_{d2} = 81.54$ |
| $r_4 = -53.720$ | $d_4 = $ (Variable) | | | |

-continued

| | | | | |
|---|---|---|---|---|
| $r_5 = \infty$ (Stop) | $d_5 = 1.20$ | | | |
| $r_6 = -18.800$ | $d_6 = 1.00$ | $n_{d3} = 1.80610$ | $n_{g3} = 1.83117$ | $\nu_{d3} = 40.92$ |
| $r_7 = 8.751$ | $d_7 = 1.99$ | $n_{d4} = 1.62004$ | $n_{g4} = 1.64217$ | $\nu_{d4} = 36.26$ |
| $r_8 = 89.311$ | $d_8 = 0.50$ | | | |
| $r_9 = 10.487$ | $d_9 = 2.80$ | $n_{d5} = 1.54814$ | $n_{g5} = 1.56335$ | $\nu_{d5} = 45.79$ |
| $r_{10} = -38.503$ | $d_{10} = 0.76$ | | | |
| $r_{11} = -136.104$ (Aspheric) | $d_{11} = 2.07$ | $n_{d6} = 1.58313$ | $n_{g6} = 1.59530$ | $\nu_{d6} = 59.38$ |
| $r_{12} = -21.007$ (Aspheric) | $d_{12} =$ (Variable) | | | |
| $r_{13} = -44.573$ (Aspheric) | $d_{13} = 2.50$ | $n_{d7} = 1.52542$ | $n_{g7} = 1.53705$ | $\nu_{d7} = 55.78$ |
| $r_{14} = -57.663$ (Aspheric) | $d_{14} = 2.68$ | | | |
| $r_{15} = -11.167$ | $d_{15} = 1.50$ | $n_{d8} = 1.77250$ | $n_{g8} = 1.79197$ | $\nu_{d8} = 49.60$ |
| $r_{16} = -190.231$ | $d_{16} =$ (Variable) | | | |
| $r_{17} = \infty$ | | | | |

(Image Plane)
Aspherical Coefficients
11th surface
K=0.000
$A_4=2.29392\times10^{-4}$
$A_6=5.36754\times10^{-6}$
$A_8=4.12089\times10^{-7}$
$A_{10}=-7.80776\times10^{-9}$
12th surface
K=0.000
$A_4=4.39654\times10^{-4}$
$A_6=5.73833\times10^{-6}$ Zooming Data ($\infty$)

| | WE | ST | TE |
|---|---|---|---|
| f (mm) | 39.300 | 75.500 | 145.000 |
| $F_{NO}$ | 6.00 | 9.62 | 13.46 |
| $\omega$ (°) | 28 | 15.54 | 8.34 |
| $d_4$ | 5.00 | 12.36 | 22.27 |
| $d_{12}$ | 12.31 | 6.70 | 1.20 |
| $d_{16}$ | 8.01 | 24.82 | 49.06 |

EXAMPLE 7

| | | | | |
|---|---|---|---|---|
| $r_1 = -18.480$ | $d_1 = 1.20$ | $n_{d1} = 1.84666$ | $n_{g1} = 1.89418$ | $\nu_{d1} = 23.78$ |
| $r_2 = -24.497$ | $d_2 = 0.20$ | | | |
| $r_3 = 22.917$ | $d_3 = 4.04$ | $n_{d2} = 1.49700$ | $n_{g2} = 1.50451$ | $\nu_{d2} = 81.54$ |
| $r_4 = -49.504$ | $d_4 =$ (Variable) | | | |
| $r_5 = \infty$ (Stop) | $d_5 = 1.20$ | | | |
| $r_6 = -23.414$ | $d_6 = 1.00$ | $n_{d3} = 1.80610$ | $n_{g3} = 1.83117$ | $\nu_{d3} = 40.92$ |
| $r_7 = 7.144$ | $d_7 = 2.18$ | $n_{d4} = 1.62004$ | $n_{g4} = 1.64217$ | $\nu_{d4} = 36.26$ |
| $r_8 = -45.233$ | $d_8 = 0.50$ | | | |
| $r_9 = 10.841$ (Aspheric) | $d_9 = 2.50$ | $n_{d5} = 1.58313$ | $n_{g5} = 1.59530$ | $\nu_{d5} = 59.38$ |
| $r_{10} = 26.817$ (Aspheric) | $d_{10} = 1.52$ | | | |
| $r_{11} = -42.009$ | $d_{11} = 3.09$ | $n_{d6} = 1.54072$ | $n_{g6} = 1.55521$ | $\nu_{d6} = 47.23$ |
| $r_{12} = -10.509$ | $d_{12} =$ (Variable) | | | |
| $r_{13} = -23.667$ (Aspheric) | $d_{13} = 2.50$ | $n_{d7} = 1.52542$ | $n_{g7} = 1.53705$ | $\nu_{d7} = 55.78$ |
| $r_{14} = -27.641$ (Aspheric) | $d_{14} = 2.50$ | | | |
| $r_{15} = -10.189$ | $d_{15} = 1.50$ | $n_{d8} = 1.78800$ | $n_{g8} = 1.80888$ | $\nu_{d8} = 47.37$ |
| $r_{16} = -167.910$ | $d_{16} =$ (Variable) | | | |
| $r_{17} = \infty$ | | | | |

$A_8=4.82773\times10^{-7}$
$A_{10}=-2.32232\times10^{-9}$
13th surface
K=0.000
$A_4=-4.89087\times10^{-5}$
$A_6=-3.99395\times10^{-6}$
$A_8=7.75429\times10^{-8}$
$A_{10}=-3.04718\times10^{-10}$
14th surface
K=0.000
$A_4=-1.67127\times10^{-4}$
$A_6=-3.42909\times10^{-6}$
$A_8=3.93583\times10^{-8}$
$A_{10}=-8.84275\times10^{-11}$ (Image Plane)
Aspherical Coefficients
9th surface
K=0.000
$A_4=3.38358\times10^{-4}$
$A_6=2.38063\times10^{-6}$
$A_8=-4.04123\times10^{-8}$
$A_{10}=6.37361\times10^{-9}$
10th surface
K=0.000
$A_4=5.61368\times10^{-4}$
$A_6=6.64717\times10^{-6}$
$A_8=-2.28781\times10^{-7}$
$A_{10}=1.53151\times10^{-8}$
13th surface
K=-3.341
$A_4=-9.45199\times10^{-6}$ $A_6=-1.85763\times10^{-6}$
$A_8=3.83692\times10^{-8}$
$A_{10}=-8.96675\times10^{-11}$
14th surface
K=0.000
$A_4=-1.27830\times10^{-4}$
$A_6=-2.88552\times10^{-6}$
$A_8=2.81282\times10^{-8}$
$A_{10}=-7.02507\times10^{-11}$
Zooming Data (∞)

|  | WE | ST | TE |
|---|---|---|---|
| f (mm) | 39.300 | 75.500 | 145.000 |
| $F_{NO}$ | 6.20 | 9.10 | 13.45 |
| ω (°) | 28 | 15.58 | 8.36 |
| $d_4$ | 5.00 | 11.30 | 17.23 |
| $d_{12}$ | 9.68 | 4.98 | 1.20 |
| $d_{16}$ | 8.53 | 24.65 | 51.66 |

EXAMPLE 8

| | | | | |
|---|---|---|---|---|
| $r_1 = -22.112$ | $d_1 = 1.20$ | $n_{d1} = 1.84666$ | $n_{g1} = 1.89418$ | $v_{d1} = 23.78$ |
| $r_2 = -28.788$ | $d_2 = 0.20$ | | | |
| $r_3 = 20.896$ | $d_3 = 3.69$ | $n_{d2} = 1.49700$ | $n_{g2} = 1.50451$ | $v_{d2} = 81.54$ |
| $r_4 = -114.716$ | $d_4 =$ (Variable) | | | |
| $r_5 = \infty$ (Stop) | $d_5 = 1.26$ | | | |
| $r_6 = -22.657$ | $d_6 = 1.00$ | $n_{d3} = 1.80610$ | $n_{g3} = 1.83117$ | $v_{d3} = 40.92$ |
| $r_7 = 16.080$ | $d_7 = 1.83$ | $n_{d4} = 1.56384$ | $n_{g4} = 1.57532$ | $v_{d4} = 60.67$ |
| $r_8 = -75.029$ | $d_8 = 0.30$ | | | |
| $r_9 = 17.476$ | $d_9 = 4.62$ | $n_{d5} = 1.58144$ | $n_{g5} = 1.59973$ | $v_{d5} = 40.75$ |
| $r_{10} = -6.979$ | $d_{10} = 1.30$ | $n_{d6} = 1.77250$ | $n_{g6} = 1.79197$ | $v_{d6} = 49.60$ |
| $r_{11} = -28.094$ | $d_{11} = 0.30$ | | | |
| $r_{12} = -51.912$ (Aspheric) | $d_{12} = 2.00$ | $n_{d7} = 1.58313$ | $n_{g7} = 1.59530$ | $v_{d7} = 59.38$ |
| $r_{13} = -13.146$ (Aspheric) | $d_{13} =$ (Variable) | | | |
| $r_{14} = -126.065$ (Aspheric) | $d_{14} = 3.32$ | $n_{d8} = 1.52542$ | $n_{g8} = 1.53705$ | $v_{d8} = 55.78$ |
| $r_{15} = -635.196$ (Aspheric) | $d_{15} = 2.84$ | | | |
| $r_{16} = -11.000$ | $d_{16} = 1.50$ | $n_{d9} = 1.77250$ | $n_{g9} = 1.79197$ | $v_{d9} = 49.60$ |
| $r_{17} = 758.499$ | $d_{17} =$ (Variable) | | | |
| $r_{18} = \infty$ | | | | |

(Image Plane)
Aspherical Coefficients
12th surface
K=0.000
$A_4=1.56036\times10^{-4}$
$A_6=9.55751\times10^{-6}$
$A_8=1.90051\times10^{-7}$
$A_{10}=-2.51432\times10^{-13}$
13th surface
K=0.000
$A_4=1.73456\times10^{-4}$
$A_6=1.05058\times10^{-5}$
$A_8=-1.61415\times10^{-8}$
$A_{10}=7.62286\times10^{-9}$
14th surface
K=0.000
$A_4=-9.31141\times10^{-5}$
$A_6=-1.96883\times10^{-6}$
$A_8=3.73479\times10^{-8}$
$A_{10}=-1.41308\times10^{-10}$
15th surface
K=0.000
$A_4=-2.24116\times10^{-4}$
$A_6=-2.79833\times10^{-6}$
$A_8=3.35837\times10^{-8}$
$A_{10}=-1.77883\times10^{-10}$ Zooming Data (∞)

|  | WE | ST | TE |
|---|---|---|---|
| f (mm) | 39.283 | 75.456 | 144.797 |
| $F_{NO}$ | 6.00 | 8.80 | 13.00 |
| ω (°) | 28.02 | 15.52 | 8.36 |
| $d_4$ | 4.38 | 12.03 | 17.30 |
| $d_{13}$ | 10.51 | 5.26 | 1.50 |
| $d_{17}$ | 7.70 | 22.73 | 49.86 |

EXAMPLE 9

| | | | | |
|---|---|---|---|---|
| $r_1 = -22.189$ | $d_1 = 1.21$ | $n_{d1} = 1.84666$ | $n_{g1} = 1.89418$ | $v_{d1} = 23.78$ |
| $r_2 = -28.872$ | $d_2 = 0.20$ | | | |
| $r_3 = 19.699$ | $d_3 = 3.46$ | $n_{d2} = 1.49700$ | $n_{g2} = 1.50451$ | $v_{d2} = 81.54$ |
| $r_4 = -162.696$ | $d_4 =$ (Variable) | | | |
| $r_5 = \infty$ (Stop) | $d_5 = 1.13$ | | | |
| $r_6 = -40.586$ | $d_6 = 1.03$ | $n_{d3} = 1.84666$ | $n_{g3} = 1.89418$ | $v_{d3} = 23.78$ |
| $r_7 = 404.938$ | $d_7 = 0.87$ | | | |
| $r_8 = 24.288$ | $d_8 = 3.48$ | $n_{d4} = 1.61293$ | $n_{g4} = 1.63434$ | $v_{d4} = 37.00$ |
| $r_9 = -5.886$ | $d_9 = 1.05$ | $n_{d5} = 1.78800$ | $n_{g5} = 1.80888$ | $v_{d5} = 47.37$ |
| $r_{10} = 19.197$ | $d_{10} = 0.34$ | | | |

-continued

| | | | | |
|---|---|---|---|---|
| $r_{11}$ = 19.093 (Aspheric) | $d_{11}$ = 4.03 | $n_{d6}$ = 1.58313 | $n_{g6}$ = 1.59530 | $\nu_{d6}$ = 59.38 |
| $r_{12}$ = −9.247 (Aspheric) | $d_{12}$ = (Variable) | | | |
| $r_{13}$ = −55.427 (Aspheric) | $d_{13}$ = 3.31 | $n_{d7}$ = 1.52542 | $n_{g7}$ = 1.53705 | $\nu_{d7}$ = 55.78 |
| $r_{14}$ = −88.668 (Aspheric) | $d_{14}$ = 1.98 | | | |
| $r_{15}$ = −10.996 | $d_{15}$ = 1.50 | $n_{d8}$ = 1.74100 | $n_{g8}$ = 1.75850 | $\nu_{d8}$ = 52.64 |
| $r_{16}$ = 174.539 | $d_{16}$ = (Variable) | | | |
| $r_{17}$ = ∞ | | | | |

(Image Plane)
Aspherical Coefficients
11th surface
K=0.000
$A_4$=−1.16096×10$^{-4}$
$A_6$=4.39890×10$^{-6}$
$A_8$=0
$A_{10}$=0
12th surface
K=0.000

Zooming Data (∞)

| | WE | ST | TE |
|---|---|---|---|
| f (mm) | 39.320 | 75.541 | 149.582 |
| $F_{NO}$ | 6.00 | 9.00 | 13.00 |
| ω (°) | 28.11 | 15.65 | 8.11 |
| $d_4$ | 4.38 | 12.58 | 17.59 |
| $d_{12}$ | 10.19 | 5.13 | 1.50 |
| $d_{16}$ | 8.39 | 23.17 | 52.53 |

EXAMPLE 10

| | | | | |
|---|---|---|---|---|
| $r_1$ = −24.318 | $d_1$ = 1.20 | $n_{d1}$ = 1.84666 | $n_{g1}$ = 1.89418 | $\nu_{d1}$ = 23.78 |
| $r_2$ = −32.261 | $d_2$ = 0.20 | | | |
| $r_3$ = 21.713 | $d_3$ = 3.20 | $n_{d2}$ = 1.49700 | $n_{g2}$ = 1.50451 | $\nu_{d2}$ = 81.54 |
| $r_4$ = −131.492 | $d_4$ = (Variable) | | | |
| $r_5$ = ∞ (Stop) | $d_5$ = 1.36 | | | |
| $r_6$ = −25.441 | $d_6$ = 1.00 | $n_{d3}$ = 1.84666 | $n_{g3}$ = 1.89418 | $\nu_{d3}$ = 23.78 |
| $r_7$ = −154.058 | $d_7$ = 0.51 | | | |
| $r_8$ = 27.918 | $d_8$ = 3.39 | $n_{d4}$ = 1.62004 | $n_{g4}$ = 1.64217 | $\nu_{d4}$ = 36.26 |
| $r_9$ = −6.422 | $d_9$ = 1.00 | $n_{d5}$ = 1.78800 | $n_{g5}$ = 1.80888 | $\nu_{d5}$ = 47.37 |
| $r_{10}$ = 41.155 | $d_{10}$ = 0.42 | | | |
| $r_{11}$ = 27.950 (Aspheric) | $d_{11}$ = 3.61 | $n_{d6}$ = 1.58213 | $n_{g6}$ = 1.59430 | $\nu_{d6}$ = 59.28 |
| $r_{12}$ = −10.269 (Aspheric) | $d_{12}$ = (Variable) | | | |
| $r_{13}$ = −66.821 (Aspheric) | $d_{13}$ = 3.13 | $n_{d7}$ = 1.52542 | $n_{g7}$ = 1.53705 | $\nu_{d7}$ = 55.78 |
| $r_{14}$ = −116.419 (Aspheric) | $d_{14}$ = 2.78 | | | |
| $r_{15}$ = −11.002 | $d_{15}$ = 1.50 | $n_{d8}$ = 1.77250 | $n_{g8}$ = 1.79197 | $\nu_{d8}$ = 49.60 |
| $r_{16}$ = −664.086 | $d_{16}$ = (Variable) | | | |
| $r_{17}$ = ∞ | | | | |

(Image Plane)
Aspherical Coefficients
11th surface
K=0.000
$A_4$=−4.10910×10$^{-5}$
$A_6$=5.35910×10$^{-6}$
$A_8$=−1.03810×10$^{-7}$
$A_{10}$=4.91150×10$^{-9}$
12th surface
K=0.000
$A_4$=6.66670×10$^{-5}$
$A_6$=4.71570×10$^{-6}$
$A_8$=−1.66820×10$^{-7}$
$A_{10}$=6.61640×10$^{-9}$
13th surface
K=0.000
$A_4$=−1.61190×10$^{-5}$
$A_6$=−3.00570×10$^{-6}$
$A_8$=4.69600×10$^{-8}$
$A_{10}$=−2.13690×10$^{-10}$
14th surface
K=0.000
$A_4$=−1.39990×10$^{-4}$ $A_4$=−5.32787×10$^{-6}$
$A_6$=4.60212×10$^{-6}$
$A_8$=−1.77226×10$^{-7}$
$A_{10}$=5.08633×10$^{-9}$
13th surface
K=0.000
$A_4$=−9.17149×10$^{-5}$
$A_6$=−1.89922×10$^{-6}$
$A_8$=4.63745×10$^{-8}$
$A_{10}$=−3.42772×10$^{-10}$
14th surface
K=0.000
$A_4$=−2.22227×10$^{-4}$
$A_6$=−3.89612×10$^{-6}$
$A_8$=5.86071×10$^{-8}$
$A_{10}$=−4.01718×10$^{-10}$ $A_6 = -3.66890 \times 10^{-6}$
$A_8 = 4.46010 \times 10^{-8}$
$A_{10} = -2.53540 \times 10^{-10}$ Zooming Data (∞)

|  | WE | ST | TE |
|---|---|---|---|
| f (mm) | 38.819 | 75.502 | 144.764 |
| $F_{NO}$ | 5.24 | 8.40 | 13.81 |
| ω (°) | 28.355 | 15.49 | 8.354 |
| $d_4$ | 5.48 | 13.55 | 18.80 |
| $d_{12}$ | 10.13 | 5.00 | 1.50 |
| $d_{16}$ | 8.00 | 23.86 | 52.27 |

EXAMPLE 11

| $r_1 = -21.913$ | $d_1 = 1.20$ | $n_{d1} = 1.84666$ | $n_{g1} = 1.89418$ | $\nu_{d1} = 23.78$ |
|---|---|---|---|---|
| $r_2 = -29.024$ | $d_2 = 0.20$ | | | |
| $r_3 = 22.870$ | $d_3 = 3.49$ | $n_{d2} = 1.49700$ | $n_{g2} = 1.50451$ | $\nu_{d2} = 81.54$ |
| $r_4 = -82.843$ | $d_4 =$ (Variable) | | | |
| $r_5 = \infty$ (Stop) | $d_5 = 1.16$ | | | |
| $r_6 = -37.750$ | $d_6 = 1.10$ | $n_{d3} = 1.84666$ | $n_{g3} = 1.89418$ | $\nu_{d3} = 23.78$ |
| $r_7 = -205.201$ | $d_7 = 0.55$ | | | |
| $r_8 = 44.797$ | $d_8 = 3.48$ | $n_{d4} = 1.61293$ | $n_{g4} = 1.63434$ | $\nu_{d4} = 37.00$ |
| $r_9 = -6.203$ | $d_9 = 1.10$ | $n_{d5} = 1.78800$ | $n_{g5} = 1.80888$ | $\nu_{d5} = 47.37$ |
| $r_{10} = 35.802$ | $d_{10} = 0.44$ | | | |
| $r_{11} = 26.158$ (Aspheric) | $d_{11} = 3.80$ | $n_{d6} = 1.58313$ | $n_{g6} = 1.59530$ | $\nu_{d6} = 59.38$ |
| $r_{12} = -9.995$ (Aspheric) | $d_{12} =$ (Variable) | | | |
| $r_{13} = -76.181$ (Aspheric) | $d_{13} = 3.30$ | $n_{d7} = 1.52542$ | $n_{g7} = 1.53705$ | $\nu_{d7} = 55.78$ |
| $r_{14} = -120.546$ (Aspheric) | $d_{14} = 2.50$ | | | |
| $r_{15} = -11.000$ | $d_{15} = 1.50$ | $n_{d8} = 1.77250$ | $n_{g8} = 1.79197$ | $\nu_{d8} = 49.60$ |
| $r_{16} = 5177.747$ | $d_{16} =$ (Variable) | | | |
| $r_{17} = \infty$ | | | | |

(Image Plane)

Aspherical Coefficients

11th surface
$K = 0.000$
$A_4 = -5.66080 \times 10^{-5}$
$A_6 = -3.01173 \times 10^{-7}$
$A_8 = 6.30927 \times 10^{-8}$
$A_{10} = 6.95563 \times 10^{-10}$ 12th surface
$K = 0.000$
$A_4 = 4.39188 \times 10^{-5}$
$A_6 = 8.28632 \times 10^{-7}$
$A_8 = -8.75173 \times 10^{-8}$
$A_{10} = 3.51044 \times 10^{-9}$ 13th surface
$K = 0.000$
$A_4 = -1.46697 \times 10^{-5}$
$A_6 = -3.48678 \times 10^{-6}$
$A_8 = 3.48370 \times 10^{-8}$
$A_{10} = -8.44257 \times 10^{-11}$ 14th surface
$K = 0.000$
$A_4 = -1.53898 \times 10^{-4}$
$A_6 = -3.13208 \times 10^{-6}$
$A_8 = 2.30720 \times 10^{-8}$
$A_{10} = -1.23645 \times 10^{-10}$ Zooming Data (∞)

|  | WE | ST | TE |
|---|---|---|---|
| f (mm) | 38.818 | 75.500 | 144.750 |
| $dF_{NO}$ | 6.00 | 9.00 | 13.24 |
| ω (°) | 28.315 | 15.568 | 8.377 |
| $d_4$ | 5.13 | 13.02 | 18.78 |
| $d_{12}$ | 10.46 | 5.31 | 1.63 |
| $d_{16}$ | 8.00 | 23.86 | 51.47 |

EXAMPLE 12

| $r_1 = 50.262$ | $d_1 = 1.20$ | $n_{d1} = 1.55892$ | $n_{g1} = 1.56879$ | $\nu_{d1} = 69.73$ |
|---|---|---|---|---|
| $r_2 = 7.500$ | $d_2 = 3.80$ | | | |
| $r_3 = 27.082$ (Aspheric) | $d_3 = 2.40$ | $n_{d2} = 1.79425$ | $n_{g2} = 1.83557$ | $\nu_{d2} = 25.52$ |
| $r_4 = 55.618$ (Aspheric) | $d_4 =$ (Variable) | | | |
| $r_5 = \infty$ (Stop) | $d_5 = 0.80$ | | | |
| $r_6 = 9.206$ (Aspheric) | $d_6 = 2.00$ | $n_{d3} = 1.74165$ | $n_{g3} = 1.75907$ | $\nu_{d3} = 52.92$ |
| $r_7 = -531.547$ (Aspheric) | $d_7 = 0.10$ | | | |
| $r_8 = 14.641$ | $d_8 = 2.40$ | $n_{d4} = 1.78800$ | $n_{g4} = 1.80886$ | $\nu_{d4} = 47.40$ |
| $r_9 = -43.113$ | $d_9 = 2.91$ | $n_{d5} = 1.78529$ | $n_{g5} = 1.82564$ | $\nu_{d5} = 25.82$ |
| $r_{10} = 5.017$ | $d_{10} = 1.30$ | | | |
| $r_{11} = 10.613$ | $d_{11} = 1.50$ | $n_{d6} = 1.84274$ | $n_{g6} = 1.88777$ | $\nu_{d6} = 24.83$ |
| $r_{12} = 17.744$ | $d_{12} =$ (Variable) | | | |
| $r_{13} = 38.620$ | $d_{13} = 2.00$ | $n_{d7} = 1.78800$ | $n_{g7} = 1.80886$ | $\nu_{d7} = 47.40$ |
| $r_{14} = -40.119$ | $d_{14} =$ (Variable) | | | |
| $r_{15} = \infty$ | $d_{15} = 0.96$ | $n_{d8} = 1.54771$ | $n_{g8} = 1.55843$ | $\nu_{d8} = 62.84$ |
| $r_{16} = \infty$ | $d_{16} = 0.60$ | | | |
| $r_{17} = \infty$ | $d_{17} = 0.50$ | $n_{d9} = 1.51633$ | $n_{g9} = 1.52621$ | $\nu_{d9} = 64.14$ |
| $r_{18} = \infty$ | $d_{18} = 0.46$ | | | |
| $r_{19} = \infty$ | | | | |

(Image Plane)

Aspherical Coefficients

3rd surface
$K = -5.242$
$A_4 = -6.97212 \times 10^{-6}$
$A_6 = 2.17028 \times 10^{-7}$
$A_8 = 1.94316 \times 10^{-8}$
$A_{10} = 1.42689 \times 10^{-9}$ 4th surface
$K = -0.024$
$A_4 = -1.49890 \times 10^{-4}$
$A_6 = -1.92065 \times 10^{-6}$
$A_8 = 9.51222 \times 10^{-8}$
$A_{10} = 3.03389 \times 10^{-10}$ 6th surface
$K = -0.201$
$A_4 = 1.23734 \times 10^{-5}$
$A_6 = -3.03905 \times 10^{-6}$ $A_8=0$
$A_{10}=0$
7th surface
K=0.000
$A_4=1.25305\times10^{-4}$
$A_6=-3.28018\times10^{-6}$
$A_8=-7.98499\times10^{-9}$
$A_{10}=0$
Zooming Data ($\infty$)

|        | WE    | ST    | TE     |
|--------|-------|-------|--------|
| f (mm) | 7.557 | 14.930| 24.907 |
| $F_{NO}$ | 2.72 | 3.46 | 4.42 |
| $\omega$ (°) | 29.97 | 16.62 | 10.068 |
| $d_4$  | 21.45 | 8.08  | 2.20   |
| $d_{12}$ | 2.05 | 9.47 | 19.15 |
| $d_{14}$ | 4.73 | 4.00 | 2.75  |

EXAMPLE 13

$r_1 = 72.196$   $d_1 = 1.20$   $n_{d1} = 1.72647$   $n_{g1} = 1.74287$   $\nu_{d1} = 54.94$
$r_2 = 7.900$    $d_2 = 3.23$
$r_3 = 32.210$   $d_3 = 2.40$   $n_{d2} = 1.84700$   $n_{g2} = 1.89398$   $\nu_{d2} = 24.00$
(Aspheric)
$r_4 = 345.667$  $d_4 =$
(Aspheric)       (Variable)
$r_5 = \infty$   $d_5 = 0.80$
(Stop)
$r_6 = 9.306$    $d_6 = 2.00$   $n_{d3} = 1.77902$   $n_{g3} = 1.79921$   $\nu_{d3} = 48.33$
(Aspheric)
$r_7 = 207.814$  $d_7 = 0.10$
(Aspheric)
$r_8 = 15.087$   $d_8 = 2.40$   $n_{d4} = 1.79437$   $n_{g4} = 1.81803$   $\nu_{d4} = 42.61$
$r_9 = -9.822$   $d_9 = 2.91$   $n_{d5} = 1.72737$   $n_{g5} = 1.76147$   $\nu_{d5} = 28.16$
$r_{10} = 4.710$ $d_{10} = 1.30$
$r_{11} = 8.637$ $d_{11} = 1.50$ $n_{d6} = 1.79880$   $n_{g6} = 1.82440$   $\nu_{d6} = 39.86$
$r_{12} = 12.918$ $d_{12} =$
                  (Variable)
$r_{13} = 41.673$ $d_{13} = 2.00$ $n_{d7} = 1.80825$ $n_{g7} = 1.83796$ $\nu_{d7} = 35.09$
$r_{14} = -64.206$ $d_{14} =$
                  (Variable)
$r_{15} = \infty$ $d_{15} = 0.96$ $n_{d8} = 1.54771$ $n_{g8} = 1.55843$ $\nu_{d8} = 62.84$
$r_{16} = \infty$ $d_{16} = 0.60$
$r_{17} = \infty$ $d_{17} = 0.50$ $n_{d9} = 1.51633$ $n_{g9} = 1.52621$ $\nu_{d9} = 64.14$
$r_{18} = \infty$ $d_{18} = 0.50$
$r_{19} = \infty$ (Image Plane)
Aspherical Coefficients
3rd surface
K=-13.992
$A_4=-3.65766\times10^{-5}$
$A_6=2.62458\times10^{-7}$
$A_8=3.33132\times10^{-8}$
$A_{10}=2.43049\times10^{-9}$
4th surface
K=3089.485
$A_4=-1.96439\times10^{-4}$
$A_6=-2.86122\times10^{-6}$
$A_8=1.63720\times10^{-7}$
$A_{10}=5.06912\times10^{-10}$
6th surface
K=-0.131
$A_4=3.45366\times10^{-5}$
$A_6=-3.02117\times10^{-6}$
$A_8=0$
$A_{10}=0$
7th surface
K=0.000
$A_4=1.96643\times10^{-4}$
$A_6=-2.38883\times10^{-6}$
$A_8=-3.81744\times10^{-8}$
$A_{10}=0$
Zooming Data ($\infty$)

|        | WE    | ST    | TE     |
|--------|-------|-------|--------|
| f (mm) | 7.949 | 15.000| 23.849 |
| $F_{NO}$ | 3.31 | 3.59 | 4.45 |
| $\omega$ (°) | 30.32 | 16.59 | 10.5 |
| $d_4$  | 19.52 | 6.94  | 2.20   |
| $d_{12}$ | 3.22 | 9.33 | 18.17 |
| $d_{14}$ | 3.83 | 4.00 | 2.75  |

EXAMPLE 14

$r_1 = 82.606$   $d_1 = 1.20$   $n_{d1} = 1.60762$   $n_{g1} = 1.61939$   $\nu_{d1} = 63.76$
$r_2 = 7.900$    $d_2 = 3.34$
$r_3 = 30.296$   $d_3 = 2.40$   $n_{d2} = 1.58423$   $n_{g2} = 1.60949$   $\nu_{d2} = 30.49$
(Aspheric)
$r_4 = 273.072$  $d_4 =$
(Aspheric)       (Variable)
$r_5 = \infty$   $d_5 = 0.80$
(Stop)
$r_6 = 9.472$    $d_6 = 2.00$   $n_{d3} = 1.75881$   $n_{g3} = 1.77750$   $\nu_{d3} = 50.65$
(Aspheric)
$r_7 = 300.944$  $d_7 = 0.10$
(Aspheric)
$r_8 = 14.801$   $d_8 = 2.40$   $n_{d4} = 1.78800$   $n_{g4} = 1.80886$   $\nu_{d4} = 47.40$
$r_9 = -22.681$  $d_9 = 2.88$   $n_{d5} = 1.71140$   $n_{g5} = 1.74377$   $\nu_{d5} = 28.95$
$r_{10} = 4.827$ $d_{10} = 1.30$
$r_{11} = 10.058$ $d_{11} = 1.50$ $n_{d6} = 1.72900$ $n_{g6} = 1.74550$ $\nu_{d6} = 54.80$
$r_{12} = 18.866$ $d_{12} =$
                  (Variable)
$r_{13} = -114.527$ $d_{13} = 2.00$ $n_{d7} = 1.74637$ $n_{g7} = 1.76414$ $\nu_{d7} = 52.26$
$r_{14} = -18.783$ $d_{14} =$
                  (Variable)
$r_{15} = \infty$ $d_{15} = 0.96$ $n_{d8} = 1.54771$ $n_{g8} = 1.55843$ $\nu_{d8} = 62.84$
$r_{16} = \infty$ $d_{16} = 0.60$
$r_{17} = \infty$ $d_{17} = 0.50$ $n_{d9} = 1.51633$ $n_{g9} = 1.52621$ $\nu_{d9} = 64.14$
$r_{18} = \infty$ $d_{18} = 0.48$
$r_{19} = \infty$ (Image Plane)
Aspherical Coefficients
3rd surface
K=-13.972
$A_4=-7.21162\times10^{-5}$
$A_6=-4.84391\times10^{-6}$
$A_8=1.75836\times10^{-7}$
$A_{10}=1.94666\times10^{-9}$
4th surface
K=1884.188
$A_4=-2.75290\times10^{-4}$
$A_6=-7.90310\times10^{-6}$
$A_8=3.09273\times10^{-7}$
$A_{10}=-5.54978\times10^{-11}$ 6th surface
K=0.014
$A_4=1.17229\times10^{-4}$
$A_6=-9.88926\times10^{-6}$
$A_8=0$
$A_{10}=0$
7th surface
K=0.000
$A_4=3.03311\times10^{-4}$
$A_6=-1.40106\times10^{-5}$
$A_8=8.25907\times10^{-8}$
$A_{10}=0$
Zooming Data (∞)

|          | WE     | ST     | TE     |
|----------|--------|--------|--------|
| f (mm)   | 7.959  | 15.018 | 23.850 |
| $F_{NO}$ | 3.19   | 3.55   | 4.35   |
| ω (°)    | 30.0   | 16.64  | 10.63  |
| $d_4$    | 19.64  | 7.54   | 2.20   |
| $d_{12}$ | 1.43   | 9.56   | 17.93  |
| $d_{14}$ | 5.56   | 4.00   | 2.75   |

FIGS. 15–28 are aberration diagrams for Example 1 to 14 upon focused at infinity, with (a), (b) and (c) indicative of aberrations at the wide-angle end, in the intermediate state and at the telephoto end, and "SA", "AS", "DT" and "CC" representative of spherical aberrations, astigmatism, distortion and chromatic aberration of magnification, respectively. In these figures, the designation "F1Y" stands for an image height.

Set out below are the values of conditions (1) to (12) and the zoom ratios in the respective examples.

| | Example | | | | | | |
|---|---|---|---|---|---|---|---|
| | 1 | 2 | 3 | 4 | 5 | 6 | 7 |
| (1) | 0.084 | 0.112 | 0.134 | 0.128 | 0.147 | 0.130 | 0.139 |
| (2) | 2.20 | 2.20 | 2.20 | 2.13 | 2.15 | 2.24 | 2.17 |

-continued

| | Example | | | | | | |
|---|---|---|---|---|---|---|---|
| | 1 | 2 | 3 | 4 | 5 | 6 | 7 |
| (3) % | 2.823 | 2.5372 | 3.498 | 3.5 | 3.49 | 3.5 | 3.5 |
| (4) | 32.53 | 37.95 | 22.22 | 21.91 | 22.75 | 27.62 | 31.17 |
| (5) | 0.657 | 0.658 | 0.662 | 0.656 | 0.656 | 0.648 | 0.648 |
| (6) | 0.340 | 0.335 | 0.232 | 0.275 | 0.255 | 0.213 | 0.233 |
| (7) | 0.087 | 0.089 | 0.019 | 0.022 | 0.022 | 0.029 | 0.044 |
| (8) mm | 21.6 | 21.6 | 21.633 | 21.633 | 21.633 | 21.63 | 21.63 |
| (9) | 6.71 | 6.71 | 6.69 | 6.70 | 6.69 | 6.70 | 6.70 |
| (10) | 3.39 | 3.40 | 1.22 | 1.24 | 1.32 | 0.93 | 1.00 |
| (11) | 1.786 | 1.786 | 1.788 | 1.788 | 1.788 | 1.806 | 1.806 |
| (12) | 44.20 | 44.20 | 47.37 | 47.40 | 47.37 | 40.92 | 40.92 |
| Zoom Ratio | 3.68 | 3.68 | 3.73 | 3.69 | 3.73 | 3.69 | 3.69 |

| | Example | | | | | | |
|---|---|---|---|---|---|---|---|
| | 8 | 9 | 10 | 11 | 12 | 13 | 14 |
| (1) | 0.136 | 0.149 | 0.154 | 0.144 | 0.045 | 0.047 | 0.068 |
| (2) | 2.17 | 2.17 | 2.64 | 2.21 | 2.03 | 1.35 | 1.36 |
| (3) % | 3.48 | 2.97 | 3.26 | 3.42 | -2.67 | -4.08 | -3.47 |
| (4) | 22.79 | 22.52 | 22.58 | 30.06 | — | — | — |
| (5) | 0.649 | 0.636 | 0.662 | 0.661 | 1.89 | 1.91 | 1.905 |
| (6) | 0.227 | 0.274 | 0.208 | 0.235 | 0.240 | 0.243 | 0.192 |
| (7) | 0.014 | 0.025 | 0.018 | 0.018 | 0.034 | 0.027 | 0.026 |
| (8) mm | 21.633 | 21.633 | 21.633 | 21.63 | 4.44 | 4.44 | 4.44 |
| (9) | 6.69 | 6.92 | 6.69 | 6.69 | 5.61 | 5.42 | 5.37 |
| (10) | 1.17 | 1.67 | 1.13 | 1.32 | — | — | — |
| (11) | 1.806 1.773 | 1.788 | 1.788 | 1.788 | — | — | — |
| (12) | 40.92 49.60 | 47.37 | 47.37 | 47.37 | — | — | — |
| Zoom Ratio | 3.68 | 3.80 | 3.73 | 3.73 | 3.15 | 3.00 | 3.00 |

Enumerated below are the values of parameters $\delta_g$, IH, TeleFno, WideFno, $\Delta Z_{max}$, $\Delta Z_{half}$, $Y_{max}$, $d_1$, $D_{air}$, $L_t$, $f_t$, $f_{asp}$ and $f_N$ as well as difference $\Delta$ between the real lens diameter and the effective diameter of light rays as used for the calculations of $\Delta Z_{max}$, etc.

| | Example | | | | | | |
|---|---|---|---|---|---|---|---|
| | 1 | 2 | 3 | 4 | 5 | 6 | 7 |
| $\delta_g$ | 1.814 | 2.419 | 2.899 | 2.769 | 3.180 | 2.812 | 3.007 |
| I H | 21.6 | 21.6 | 21.633 | 21.633 | 21.633 | 21.63 | 21.63 |
| TeleFno | 13.36 | 13.35 | 13.2 | 13.22 | 12.86 | 13.46 | 13.45 |
| WideFno | 6.06 | 6.08 | 6 | 6.21 | 6 | 6 | 6.2 |
| $\Delta Z_{max}$ | 4.102 | 4.036 | 2.324 | 2.768 | 2.496 | 2.138 | 2.289 |
| $\Delta Z_{half}$ | 0.83 | 0.845 | 0.171 | 0.217 | 0.197 | 0.255 | 0.362 |
| $Y_{max}$ | 9.493 | 9.493 | 8.898 | 9.314 | 9.005 | 8.853 | 8.286 |
| $d_1$ | 2.189 | 21.89 | 3.103 | 3.297 | 3.3 | 2.5 | 2.5 |
| $D_{air}$ | 0.646 | 0.646 | 2.543 | 2.651 | 2.496 | 2.682 | 2.5 |
| $L_t$ | 95.31 | 95.32 | 95.9 | 95 | 95 | 94 | 94 |
| $f_t$ | 144.96 | 144.83 | 144.8 | 144.9 | 144.79 | 145 | 145 |
| $f_{asp}$ | -453.75 | -529.36 | -299.998 | -300 | -300.11 | -400 | -400 |
| $f_N$ | -13.95 | -13.949 | -13.503 | -13.693 | -13.192 | -14.481 | -12.83 |
| Δ | 0 | 0 | 0 | 0.29 | -0.08 | 0 | 0 |

| | Example | | | | | | |
|---|---|---|---|---|---|---|---|
| | 8 | 9 | 10 | 11 | 12 | 13 | 14 |
| $\delta_g$ | 2.942 | 3.223 | 3.331 | 3.115 | 0.200 | 0.209 | 0.302 |
| I H | 21.633 | 21.633 | 21.633 | 21.633 | 4.44 | 4.44 | 4.44 |
| TeleFno | 13 | 13 | 13.8 | 13.24 | 4.41 | 4.45 | 4.35 |
| WideFno | 6 | 6 | 5.245 | 6 | 2.72 | 3.31 | 3.19 |
| $\Delta Z_{max}$ | 2.159 | 2.633 | 1.988 | 2.225 | 2.075 | 1.971 | 1.523 |

-continued

| | | | | | | | |
|---|---|---|---|---|---|---|---|
| $\Delta Z_{half}$ | 0.124 | 0.216 | 0.157 | 0.158 | 0.259 | 0.195 | 0.179 |
| $Y_{max}$ | 8.965 | 8.832 | 8.81 | 8.81 | 7.56 | 7.3 | 7 |
| $d_1$ | 3.32 | 3.307 | 3.13 | 3.3 | — | — | — |
| $D_{air}$ | 2.836 | 1.983 | 2.777 | 2.496 | — | — | — |
| $L_T$ | 94.012 | 95.2 | 95.86 | 95.7 | 47.02 | 45.519 | 45.424 |
| $f_t$ | 144.78 | 149.582 | 144.76 | 144.75 | 24.91 | 23.849 | 23.85 |
| $f_{asp}$ | −300 | −291.373 | −305.15 | −404.31 | — | — | — |
| $f_N$ | −13.16 | −12.938 | −13.51 | −13.451 | — | — | — |
| $\Delta$ | 0 | 0 | — | −0.1 | 0.66 | 0.5 | 0 |

In the present disclosure, the maximum image height IH at the image plane is defined as a half of the diagonal length L of the (substantially rectangular) effective image pickup area of an image pickup device. When film is used as an image pickup recording medium, the means for defining the image pickup area is a field frame located just in front thereof, and when a CCD or other electronic image pickup device is used as the image pickup recording medium, that means is the electronic image pickup device itself, which includes an image pickup area that may be used for the reproduction of phototaken images.

Figure 29:
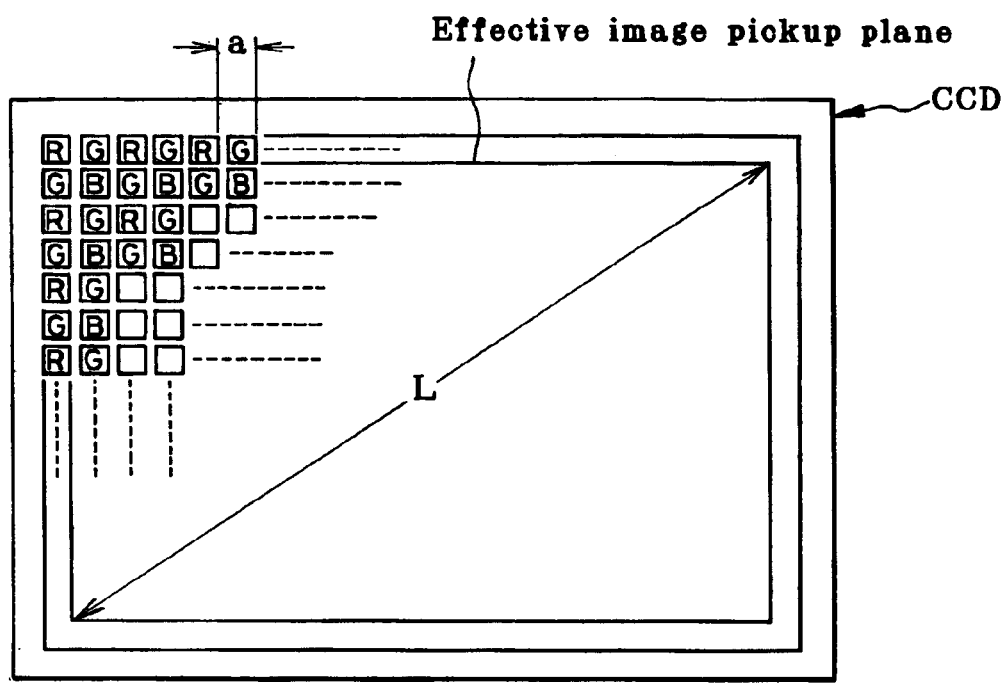
FIG. 29 is illustrative of the diagonal length L of an effective image pickup surface that defines the maximum image height IH upon phototaking with an image pickup device.

Here the diagonal length L of the effective image pickup plane (effective image pickup area) of the electronic image pickup device and the pixel spacing a are explained. FIG. 29 is illustrative of one exemplary pixel array for the electronic image pickup device, wherein R (red), G (green) and B (blue) pixels are mosaically arranged at the pixel spacing a. The "effective image pickup plane" used herein is understood to mean a certain area in the photoelectric conversion surface on an image pickup device used for the reproduction of a phototaken image (on a personal computer or by a printer). The effective image pickup plane shown is set at an area narrower than the total photoelectric conversion surface on the image pickup device, depending on the performance of the optical system used (an image circle that can be ensured by the performance of the optical system). The diagonal length L of an effective image pickup plane is thus defined by that of the effective image pickup plane. Although the image pickup range used for image reproduction may be variable, it is noted that when the image-formation lens system of the invention is used on an image pickup apparatus having such functions, the diagonal length L of its effective image pickup plane varies. In that case, the diagonal length L of the effective image pickup plane according to the present invention is defined by the maximum value in the widest possible range for L (definition of the maximum image height IH).

Figure 30:
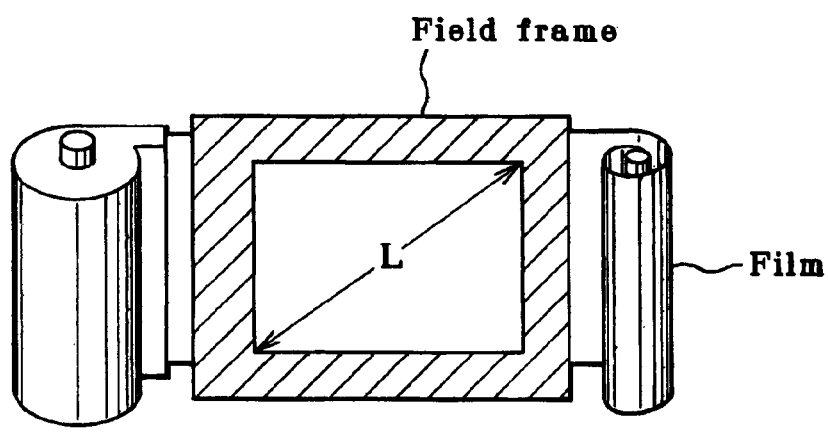
FIG. 30 is illustrative of the diagonal length L of an effective image pickup surface that defines the maximum image height IH upon phototaking using a phototaking film.

FIG. 30 is illustrative of the diagonal length of an effective image pickup plane when phototaking film is used in place of the image pickup device. When images are formed on that film, its effective phototaking area is determined by an aperture in the field frame located just in front of the film. The field frame may again be differently configured. In this case, too, the diagonal length L of the effective image pickup plane for defining the maximum image height IH herein should be given by the maximum value in the widest possible range for L.

The electronic imaging system of the invention constructed as described above may be applied to phototaking systems where object images formed through an image-formation lens system comprising a zoom lens are received at image pickup devices such as CCDs or silver-halide films, inter alia, compact cameras, digital cameras or video cameras as well as PCs and telephone sets which are typical information processors, in particular, easy-to-carry cellular phones. Given below are some such embodiments.

Figure 31A:
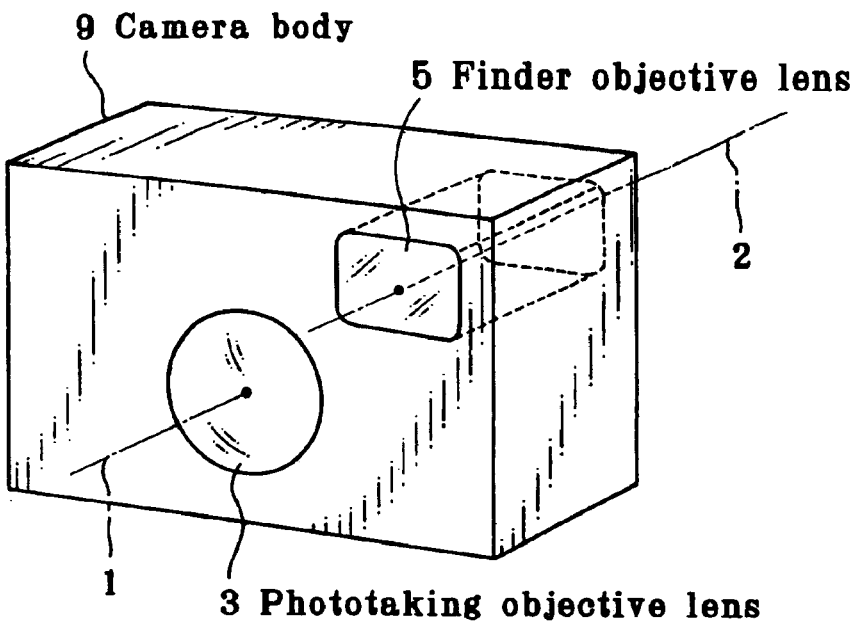
FIGS. 31(a) and 31(b) are illustrative of a compact camera to which the image-formation lens system of the invention may be applied.
Figure 31B:
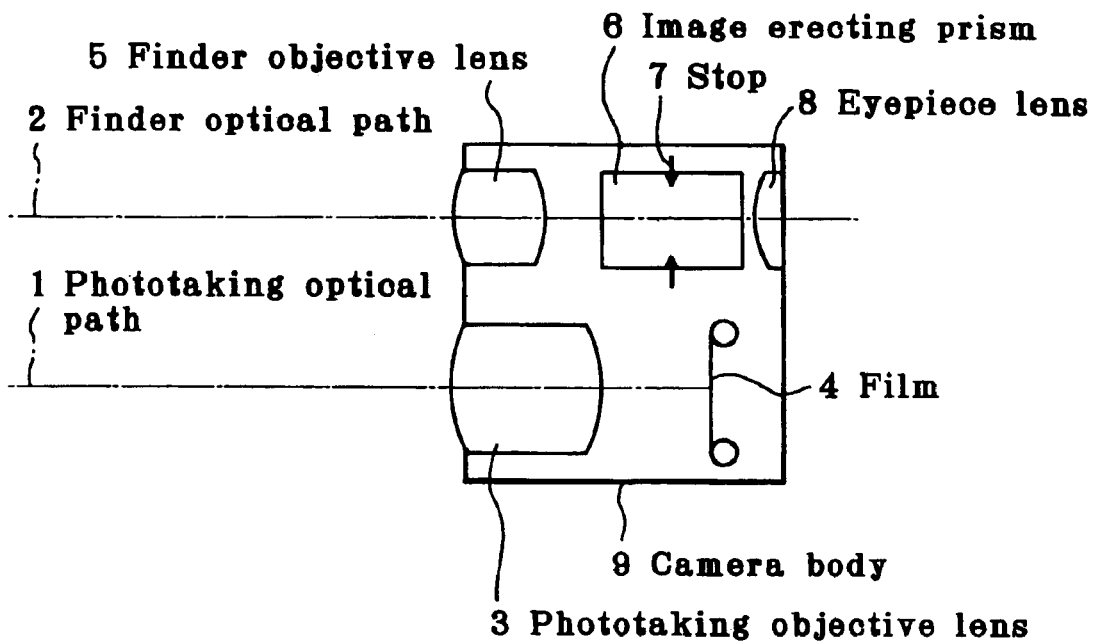

One typical construction of the compact camera is shown in the perspective view of FIG. 31(a) and the optical path diagram of FIG. 31(b). The image-formation lens system of the invention may be used as a phototaking objective lens 3 for the compact camera of such construction. In FIGS. 31(a) and 31(b), reference numeral 9 stands for a camera body, 1 a phototaking optical path, and 2 a finder optical path. The phototaking optical path 1 lies parallel with the finder optical path 2, and an object image is observed through a finder comprising a finder objective lens 5, an image erecting prism 6, a stop 7 and an eyepiece lens 8, and is formed on film 4 via the phototaking objective lens 3. The image-formation lens system of the invention may also be used as the photo-taking objective lens for digital cameras using a CCD or other electronic image pickup device in place of film.

Figure 32:
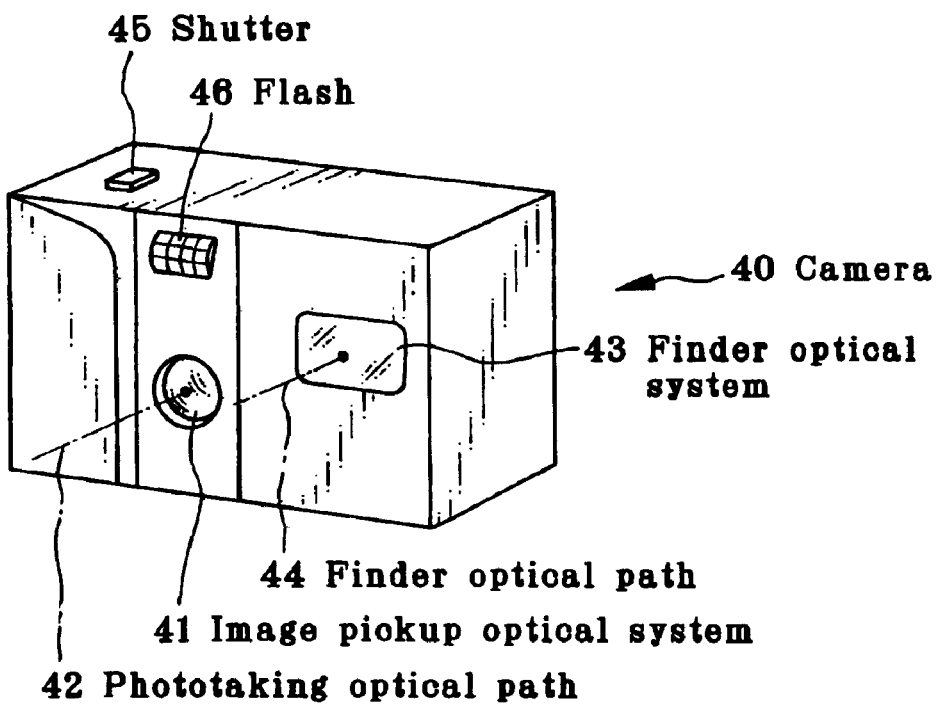
FIG. 32 is a front perspective of the outward appearance of a digital camera in which the image-formation lens system of the invention is built.
Figure 33:
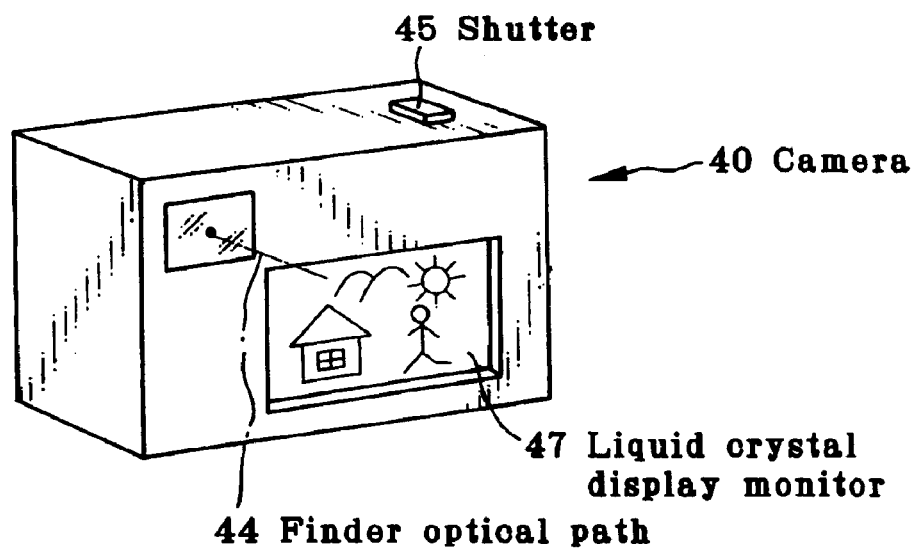
FIG. 33 is a rear perspective of the digital camera of FIG. 32.
Figure 34:
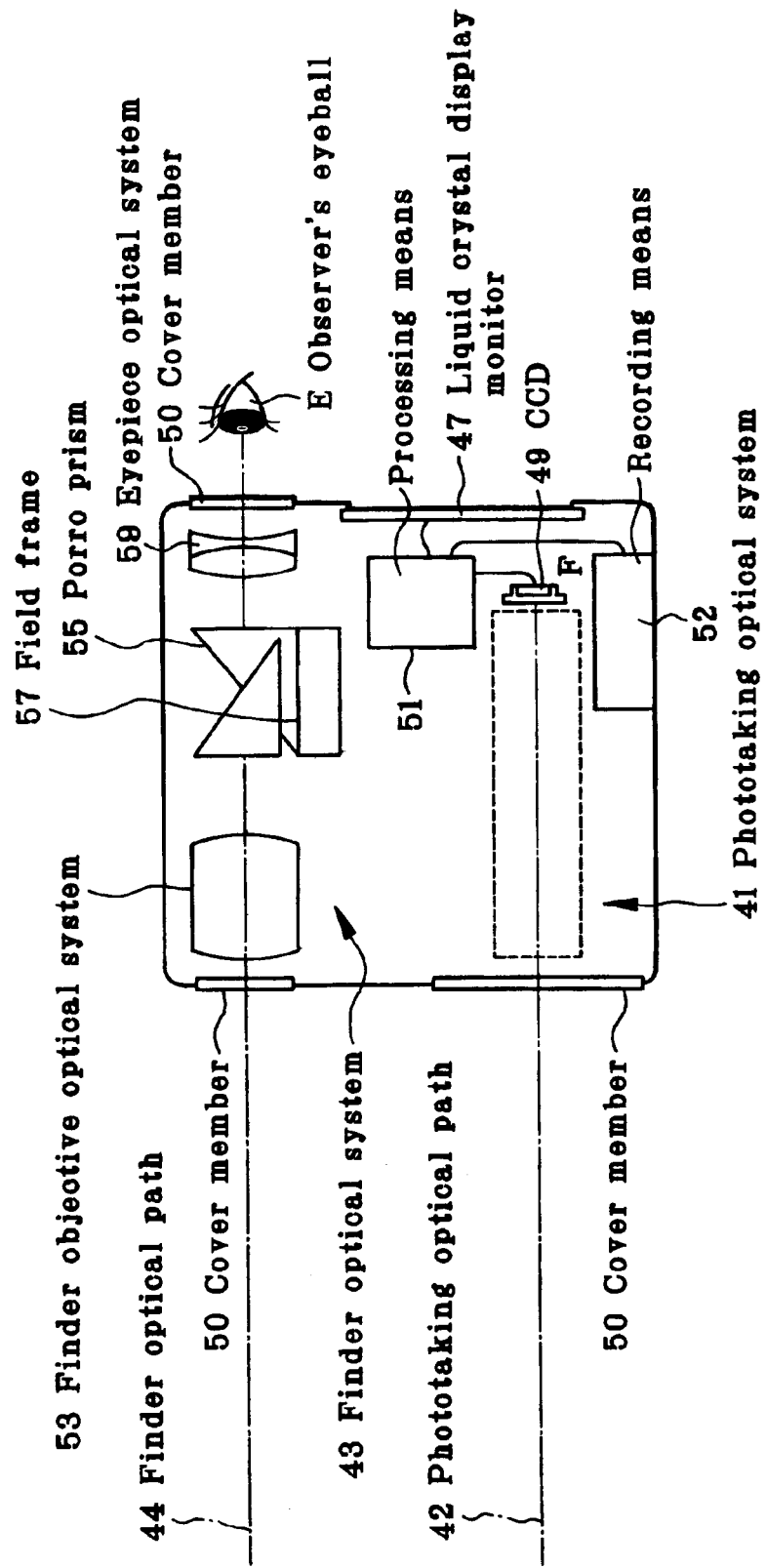
FIG. 34 is a sectional view of the digital camera of FIG. 32.

FIGS. 32, 33 and 34 are conceptual illustrations of a phototaking optical system 41 for digital cameras, in which the image-formation zoom lens of the invention is built. FIG. 32 is a front perspective view of the outward appearance of a digital camera 40, and FIG. 33 is a rear perspective view of the same. FIG. 34 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal display monitor 47 and so on. As the shutter 45 mounted on the upper portion of the camera 40 is pressed down, phototaking takes place through the phototaking optical system 41 comprising the zoom lens of the invention, for instance, the zoom lens according to Example 12. An object image formed by the phototaking optical system 41 is formed on the image pickup plane of a CCD 49 via an optical low-pass filter LF having a near-infrared cut coat thereon. The object image received at CCD 49 is shown as an electronic image on the liquid crystal display monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver halide camera using a silver halide film in place of CCD 49.

Moreover, a finder objective optical system 53 is located on the finder optical path 44. An object image formed by the finder objective optical system 53 is in turn formed on the field frame 57 of a Porro prism 55 that is an image erecting member. In the rear of the Porro prism 55 there is located an eyepiece optical system 59 for guiding an erected image into the eyeball E of an observer. It is here noted that cover members 50 are provided on the entrance sides of the phototaking optical system 41 and the finder objective optical system 53 as well as on the exit side of the eyepiece optical system 59.

With the thus constructed digital camera 40, it is possible to achieve high performance and cost reductions, because the phototaking optical system 41 is constructed of a fast zoom lens having a high zoom ratio at the wide-angle end with satisfactory aberrations and a back focus large enough to receive a filter, etc. therein.

In the embodiment of FIG. 34, plane-parallel plates are used as the cover members 50; however, it is acceptable to use powered lenses.

In the digital camera of FIG. 34, the phototaking optical path 42 is arranged in parallel with the finder optical path 44. In a TTL wherein a finder optical path-splitting prism is interposed between the image pickup plane of the zoom lens and the phototaking optical system 41, the finder objective optical system 53 and Porro prism 55 are removed, and instead a penta prism is located to guide an object image through the phototaking optical system 41 to the eyeball E of the observer.

Figure 35:
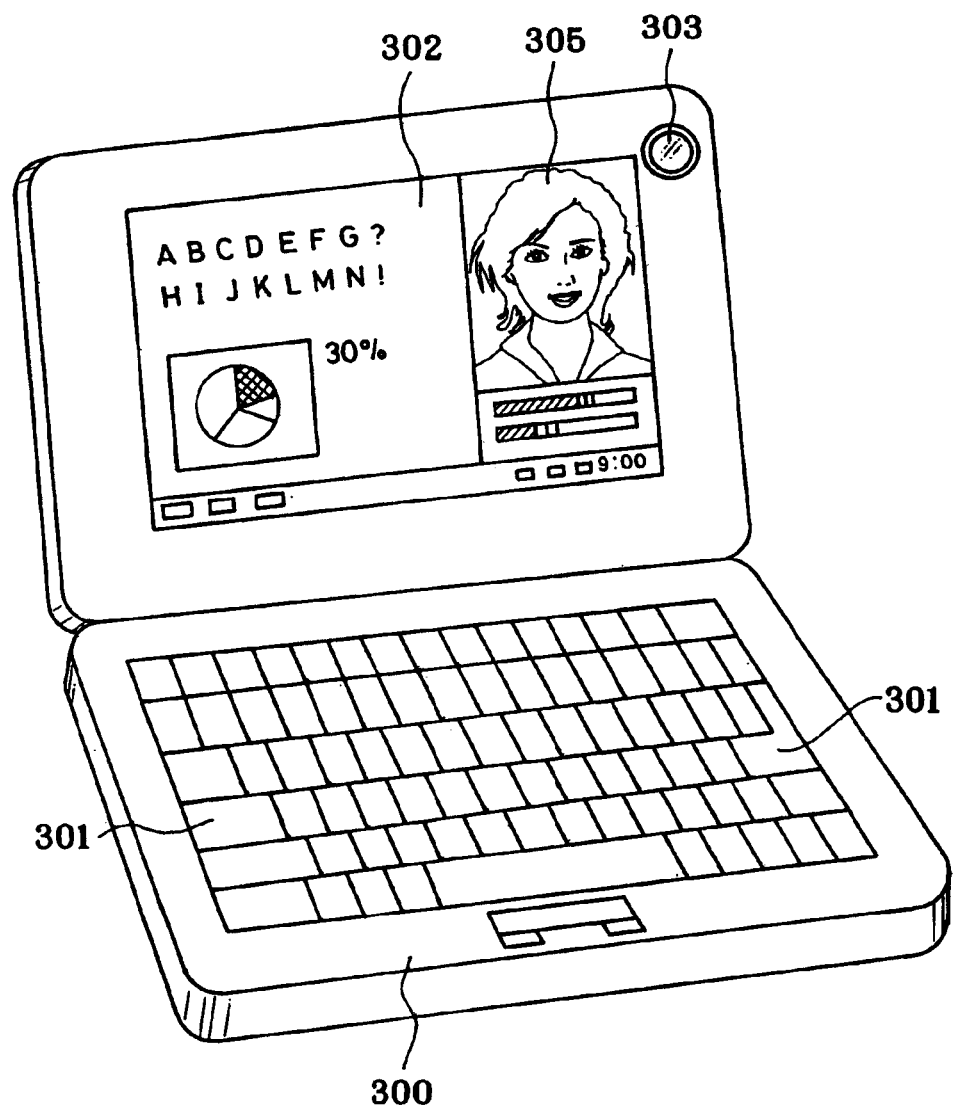
FIG. 35 is a front perspective view of an uncovered personal computer in which the image-formation lens system of the present invention is built as an objective optical system.
Figure 36:
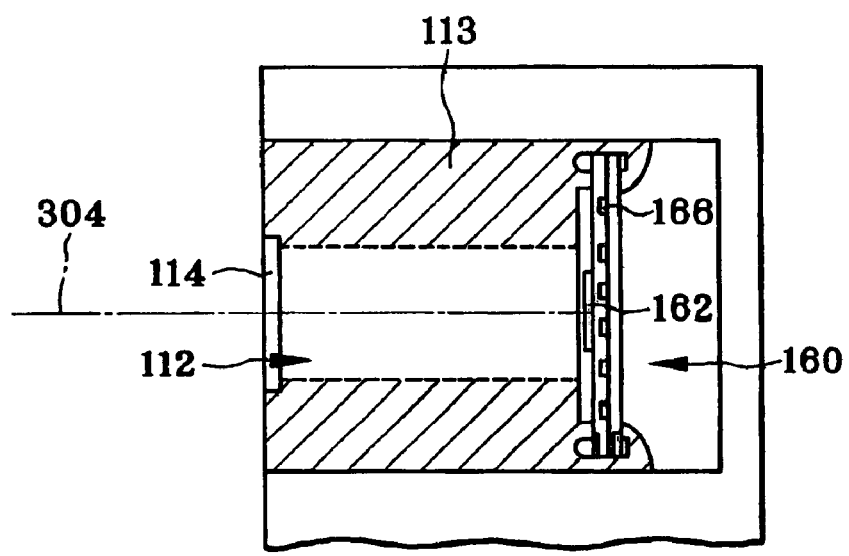
FIG. 36 is a sectional view of a phototaking optical system for a personal computer.
Figure 37:
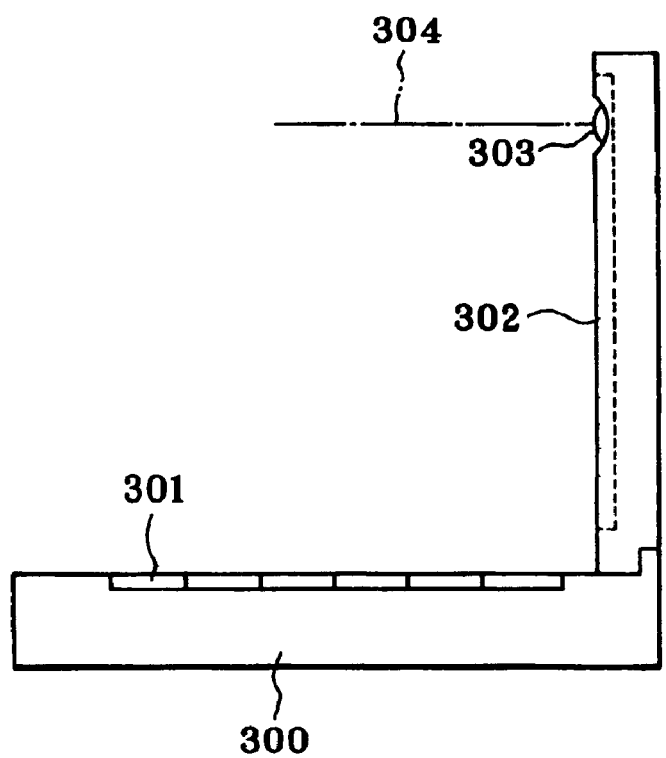
FIG. 37 is a side view of the state of FIG. 35.

FIGS. 35, 36 and 37 are illustrative of a personal computer that is one example of the information processor in which the image-formation lens system of the present invention is built as an objective optical system. FIG. 35 is a front perspective view of a personal computer 300 that is in an uncovered state, FIG. 36 is a sectional view of a phototaking optical system 303 in the personal computer 300, and FIG. 37 is a side view of the state of FIG. 35. As shown in FIGS. 35, 36 and 37, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the upper right portion of the monitor 302, it may be located somewhere around the monitor 302 or keyboard 301.

This phototaking optical system 303 comprises on a phototaking optical path 304 an objective lens 112 comprising the zoom lens according to the present invention, as shown roughly, and an image pickup device chip 162 for receiving an image. These members are built in the personal computer 300.

Here an optical low-pass filter is additionally applied onto the image pickup device chip 162 to form an integral imaging unit 160, which can be fitted into the rear end of a lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112. It is here noted that driving mechanisms for the zoom lens, etc. contained in the lens barrel 113 are not shown.

An object image received at the image pickup device chip 162 is entered via a terminal 166 into the processing means of the personal computer 300, and displayed as an electronic image on the monitor 302. As an example, an image 305 taken of the operator is shown in FIG. 35. This image 305 may be displayed on a personal computer on the other end via suitable processing means and the Internet or telephone line.

Figure 38A:
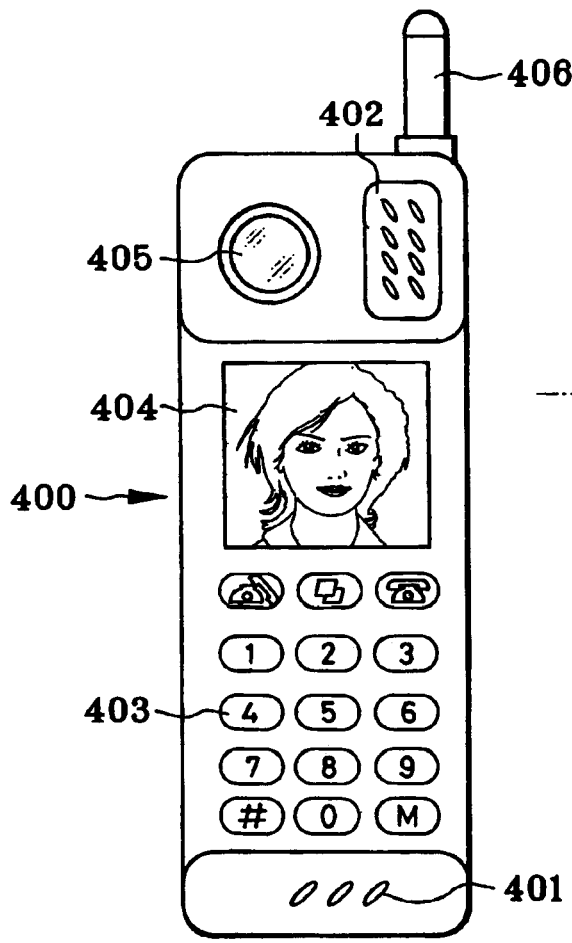
FIGS. 38(a) and 38(b) are a front and a side view of a cellular phone in which the image-formation lens system of the invention is built as an objective optical system.
Figure 38B:
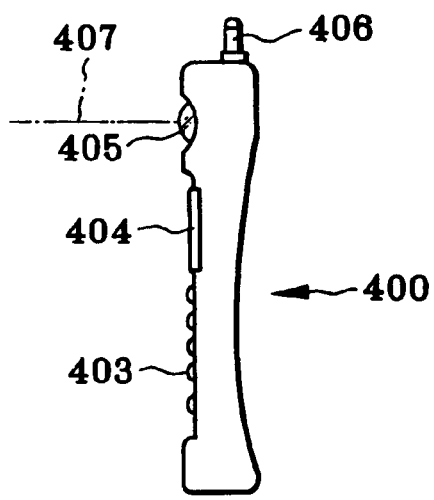
Figure 38C:
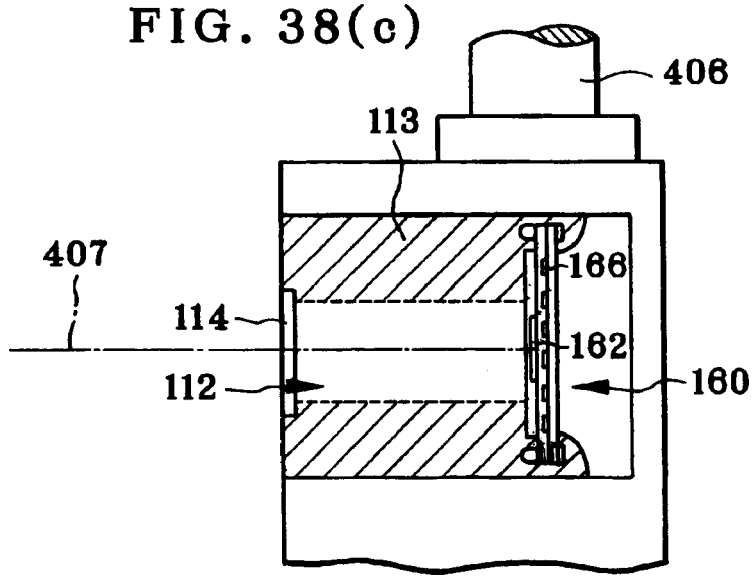
FIG. 38(c) is a sectional view of a phototaking optical system for the same.

FIGS. 38(a), 38(b) and 38(c) are illustrative of a telephone set that is one example of the information processor in which the image-formation lens system of the present invention is built in the form of a phototaking optical system, especially a convenient-to-carry cellular phone. FIG. 38(a) and FIG. 38(b) are a front and a side views of a cellular phone 400, respectively, and FIG. 38(c) is a sectional view of a phototaking optical system 405. As shown in FIGS. 38(a), 38(b) and 38(c), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a phototaking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises on a phototaking optical path 407 an objective lens 112 comprising the zoom lens according to the present invention, as roughly shown, and an image pickup device chip 162 for receiving an object image. These are built in the cellular phone 400.

Here an optical low-pass filter LF is additionally applied onto the image pickup device chip 162 to form an integral imaging unit 160, which can be fitted into the rear end of a lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112. It is here noted that driving mechanisms for the zoom lens, etc. contained in the lens barrel 113 are not shown.

An object image received at the image pickup device chip 162 is entered via a terminal 166 into processing means (not shown), so that the object image can be displayed as an electronic image on the monitor 404 and/or a monitor at the other end. To send images to the other end, the processing means also include a signal processing function for converting information about the object image received at the image pickup device chip 162 into transmittable signals, thereby sending the image to the person at the other end.

Thus, the present invention can provide an image-formation lens system well-balanced among cost reductions, size reductions and performance improvements, and an imaging system incorporating the same.

What we claim is:

1. An imaging system comprising an image-formation lens system and a means located on the image side thereof for defining an image pickup area, wherein:

said image-formation lens system is a zoom lens system comprising at least three lens groups including a lens group of positive power and a lens group of negative power, wherein zooming is carried out by varying a spacing between adjacent lens groups, and said zoom lens system comprises a total of up to 8 lenses, and satisfies the following conditions:

$$0.07 < \delta_g/IH < 0.23 \tag{1}$$

$$1.8 < TeleFno/WideFno < 3 \tag{2}$$

$$-8\% < DTL_W < 8\% \tag{3}$$

where $\delta_g$ is a difference between rear focal positions at d- and g-lines of said zoom lens system at a telephoto end, IH is a maximum image height at an image plane, WideFno and TeleFno are F-numbers at d-line of said zoom lens system at wide-angle end and telephoto end, respectively, and DTLw is an amount of d-line distortion at an angle of view of 28.00 at the wide-angle end.

2. The imaging system according to claim 1, wherein said maximum image height IH at the image plane satisfies the following condition:

$$20\ mm<IH<25\ mm \tag{8}$$

3. The imaging system according to claim 1, wherein at least one of said lens groups having negative power consists of a plurality of negative lenses whose power turns negative on an optical axis, wherein at least one of said plurality of negative lenses is an aspheric lens whose power turns from negative to positive farther off a center thereof, and at least one negative lens included in said plurality of negative lenses and different from said aspheric lens maintains negative power all the way from a center to a periphery thereof.

4. The imaging system according to claim 3, wherein said aspheric lens satisfies following condition:

$$10<f_{asp}/f_N<100 \tag{4}$$

where $f_{asp}$ is a focal length of the aspheric lens on the optical axis, and $f_N$ is the focal length on the optical axis of the lens group of negative power including the aspheric lens.

5. The imaging system according to claim 3, wherein said negative power lens group including an aspheric lens is a lens group located nearest to the image side thereof, and consists of two negative lenses on an optical axis.

6. The imaging system according to claim 5, wherein one of said two negative lenses in a plastic aspheric lens having a d-line refracting index of up to 1.6 and the other is a glass lens having a d-line refractive index of at least 1.6.

7. The imaging system according to claim 1, wherein said image-formation lens system is a three-group zoom lens comprising, in order from an object side thereof, a lens group of positive power, a lens group of positive power and a lens group of negative power wherein zooming is performed by varying the spacing between adjacent lens groups, and satisfies the following condition:

$$0.55<Lt/ft<0.715 \tag{5}$$

where $L_t$ is a real distance at the telephoto end of the image-formation lens system from a plane located nearest the object side to the image plane, and ft is the composite focal length at the telephoto end of the image-formation lens system.

8. The imaging system according to claim 7, wherein said second lens group is configured at a surface located nearest to the object side in such a way as to be concave on the object side, and comprises a doublet that consists of a positive lens and a negative lens and satisfies the following conditions:

$$1.85>n_d>1.7 \tag{11}$$

$$6.0>v_d>40 \tag{12}$$

where $n_d$ and $v_d$ are a d-line refractive index and an Abbe number of the negative lens in the doublet, respectively.

9. The imaging system according to claim 7, wherein in said first lens group or said third lens group there is located a flare stop that is similar in shape to the image plane and differs in length in long and short side directions, thereby cutting off at least a part of harmful light beams in the long and short side directions.

10. The imaging system according to claim 1, wherein:
said image-formation lens system comprises, in order from an object side thereof, a first lens group having positive power, a second lens group having positive power and a third lens group having negative power, wherein zooming from a wide-angle end to a telephoto end thereof is performed with a zoom ratio of at least 3.3 by allowing a spacing between the first lens group and the second lens group to become wide and a spacing between the second lens group and the third lens group to become narrow.

11. The imaging system according to claim 10, wherein said second lens group is configured at a surface located nearest to the object side in such a way as to be concave on the object side, and comprises a doublet that consists of a positive lens and a negative lens and satisfies the following conditions:

$$1.85>n_d>1.7 \tag{12}$$

$$60>v_d>40 \tag{12}$$

where nd and $V_d$ are a d-line refractive index and an Abbe number of the negative lens in the doublet, respectively.

12. The imaging system according to claim 10, wherein in said first lens group or said third lens group there is located a flare stop that is similar in shape to the image plane and differs in length in long and short side directions, thereby cutting off at least a part of harmful light beams in the long and short side directions.

13. An image-formation lens system, which comprises, in order from an object side thereof, a first lens group having positive power, a second lens group having positive power and a third lens group having negative power, wherein zooming from a wide-angle end to a telephoto end of the image-formation lens system is performed by allowing a spacing between the first lens group and the second lens group to become wide and a spacing between the second lens group and the third lens group to become narrow, and the third lens group consists of two negative lenses having negative power on an optical axis and satisfies the following conditions (10) and (5):

$$0.8<d_1/D_{air}<2.0 \tag{10}$$

$$0.55<L_t/f_t<0.715 \tag{5}$$

where $d_1$ is a thickness on the optical axis of an object side-negative lens in the third lens group of pair is an air gap between the two negative lenses in the third lens group, $L_t$ is a real distance of the image-formation lens system from a surface located nearest to the object side to an image plane as measured at the telephoto end, and $f_t$ is a composite focal length of the image-formation lens system at the telephoto end.

14. The image-formation lens system according to claim 13, wherein said second lens group is configured at a surface located nearest to the object side in such a way as to be concave on the object side, and comprises a doublet that consists of a positive lens and a negative 5 lens and satisfies the following conditions:

$$1.85>n_d>1.7 \tag{11}$$

$$60>v_d>40 \tag{12}$$

where $n_d$ and $V_d$ are a d-line refractive index and an Abbe number of the negative lens in the doublet, respectively.

15. The image-formation lens system according to claim 13, which is a three-group zoom lens wherein said first lens group, said second lens group and said third lens group move in such a way as to vary a spacing between adjacent lens groups.

* * * * *

UNITED STATES PATENT AND TRADEMARK OFFICE
CERTIFICATE OF CORRECTION

PATENT NO. : 6,934,091 B2  
APPLICATION NO. : 10/704654  
DATED : August 23, 2005  
INVENTOR(S) : Toshio Takahashi et al.

It is certified that error appears in the above-identified patent and that said Letters Patent is hereby corrected as shown below:

| Column | Line | |
|---|---|---|
| 6 | 17 | Change "$0.0322 \ \Delta Z_{half}/Y_{max} \geq 0$" to -- $0.3 \ \Delta Z_{half}/Y_{max} \geq 0$ --. |
| 6 | 49 | Change "$8.522 \ f_t/IH > 5.8$" to -- $8.5 \ f_t/IH > 5.8$ --. |
| 9 | 45 | Change "$0.82l \ d_l/D_{air} < 2.0$" to -- $0.8 < d_l/D_{air} < 2.0$ --. |
| 9 | 46 | Change "$0.552l \ L_t/f_t < 0.715$" to -- $0.55 < L_t/f_t < 0.715$ --. |
| 39 | 26 | Change "spacing a" to --spacing a--. |
| 39 | 29 | Change "spacing a" to --spacing a--. |
| 44 | 13 | Change "(12)" to --(11)--. |

Signed and Sealed this

Twenty-ninth Day of August, 2006

JON W. DUDAS  
*Director of the United States Patent and Trademark Office*